United States Patent
Becker et al.

(10) Patent No.: US 11,408,728 B2
(45) Date of Patent: Aug. 9, 2022

(54) REGISTRATION OF THREE-DIMENSIONAL COORDINATES MEASURED ON INTERIOR AND EXTERIOR PORTIONS OF AN OBJECT

(71) Applicant: FARO Technologies, Inc., Lake Mary, FL (US)

(72) Inventors: Bernd-Dietmar Becker, Ludwigsburg (DE); Robert E. Bridges, Kennett Square, PA (US); Ariane Stiebeiner, Stuttgart (DE); Rolf Heidemann, Stuttgart (DE); Matthias Wolke, Korntal-Münchingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 17/082,708

(22) Filed: Oct. 28, 2020

(65) Prior Publication Data

US 2021/0041222 A1  Feb. 11, 2021

Related U.S. Application Data

(63) Continuation of application No. 16/131,537, filed on Sep. 14, 2018, now Pat. No. 10,883,819, which is a continuation of application No. 15/880,878, filed on Jan. 26, 2018, now Pat. No. 10,126,116, which is a continuation of application No. 15/358,218, filed on Nov. 22, 2016, now Pat. No. 9,909,855.

(60) Provisional application No. 62/272,766, filed on Dec. 30, 2015, provisional application No. 62/272,744, filed on Dec. 30, 2015, provisional application No. 62/272,761, filed on Dec. 30, 2015, provisional application No. 62/272,749, filed on Dec. 30, 2015, provisional application No. 62/272,757, filed on Dec. 30, 2015.

(51) Int. Cl.

| | |
|---|---|
| *G06T 7/33* | (2017.01) |
| *G06T 7/579* | (2017.01) |
| *G01B 11/00* | (2006.01) |
| *G01B 21/04* | (2006.01) |
| *G01S 17/42* | (2006.01) |
| *G01S 17/66* | (2006.01) |
| *G01B 5/004* | (2006.01) |
| *G01S 17/89* | (2020.01) |
| *G01S 17/48* | (2006.01) |
| *G01S 7/48* | (2006.01) |
| *G01S 17/86* | (2020.01) |
| *G06T 7/73* | (2017.01) |
| *G01B 11/25* | (2006.01) |
| *G01S 3/786* | (2006.01) |

(52) U.S. Cl.
CPC ............ *G01B 11/002* (2013.01); *G01B 5/004* (2013.01); *G01B 11/25* (2013.01); *G01B 21/042* (2013.01); *G01S 3/786* (2013.01); *G01S 7/4808* (2013.01); *G01S 17/42* (2013.01); *G01S 17/48* (2013.01); *G01S 17/66* (2013.01); *G01S 17/86* (2020.01); *G01S 17/89* (2013.01); *G06T 7/33* (2017.01); *G06T 7/579* (2017.01); *G06T 7/73* (2017.01); *H05K 999/99* (2013.01); *G06T 2207/10004* (2013.01)

(58) Field of Classification Search
CPC .. G06T 7/30; G06T 7/33; G06T 7/521; G06T 7/55; G06T 7/579; G06T 7/73; G01B 5/004; G01B 5/008; G01B 11/002; G01B 11/005; G01B 11/25; G01B 21/04; G01S 17/42; G01S 17/46
See application file for complete search history.

(56) References Cited

U.S. PATENT DOCUMENTS

| | | | |
|---|---|---|---|
| 9,909,855 B2 | 3/2018 | Becker et al. | |
| 10,126,116 B2 | 11/2018 | Becker et al. | |
| 10,883,819 B2 * | 1/2021 | Becker et al. | ....... H05K 999/99 |
| 2012/0114181 A1 | 5/2012 | Borthwick et al. | |
| 2013/0293684 A1 | 11/2013 | Becker et al. | |
| 2014/0028805 A1 | 1/2014 | Tohme | |
| 2015/0015701 A1 | 1/2015 | Yu | |
| 2015/0223725 A1 | 8/2015 | Engel et al. | |
| 2016/0033643 A1 | 2/2016 | Zweigle et al. | |
| 2016/0093099 A1 | 3/2016 | Bridges | |
| 2018/0149469 A1 | 5/2018 | Becker et al. | |
| 2019/0017806 A1 | 1/2019 | Becker et al. | |

FOREIGN PATENT DOCUMENTS

| | | |
|---|---|---|
| EP | 2298215 A1 | 3/2011 |
| WO | 2012049438 A1 | 4/2012 |

OTHER PUBLICATIONS

International Search Report and Written Opinion for International Application No. PCT/US2016/063235 dated May 4, 2017; 20 pgs.

\* cited by examiner

*Primary Examiner* — Andrew W Johns
(74) *Attorney, Agent, or Firm* — Cantor Colburn LLP

(57) ABSTRACT

A dimensional measuring device includes an overview camera and a triangulation scanner. A six-DOF tracking device tracks the dimensional measuring device as the triangulation scanner measures three-dimensional (3D) coordinates on an exterior of the object. Cardinal points identified by the overview camera are used to register in a common frame of reference 3D coordinates measured by the triangulation scanner on the interior and exterior of the object.

15 Claims, 73 Drawing Sheets

RIGHT SIDE VIEW

FRONT VIEW

TOP VIEW

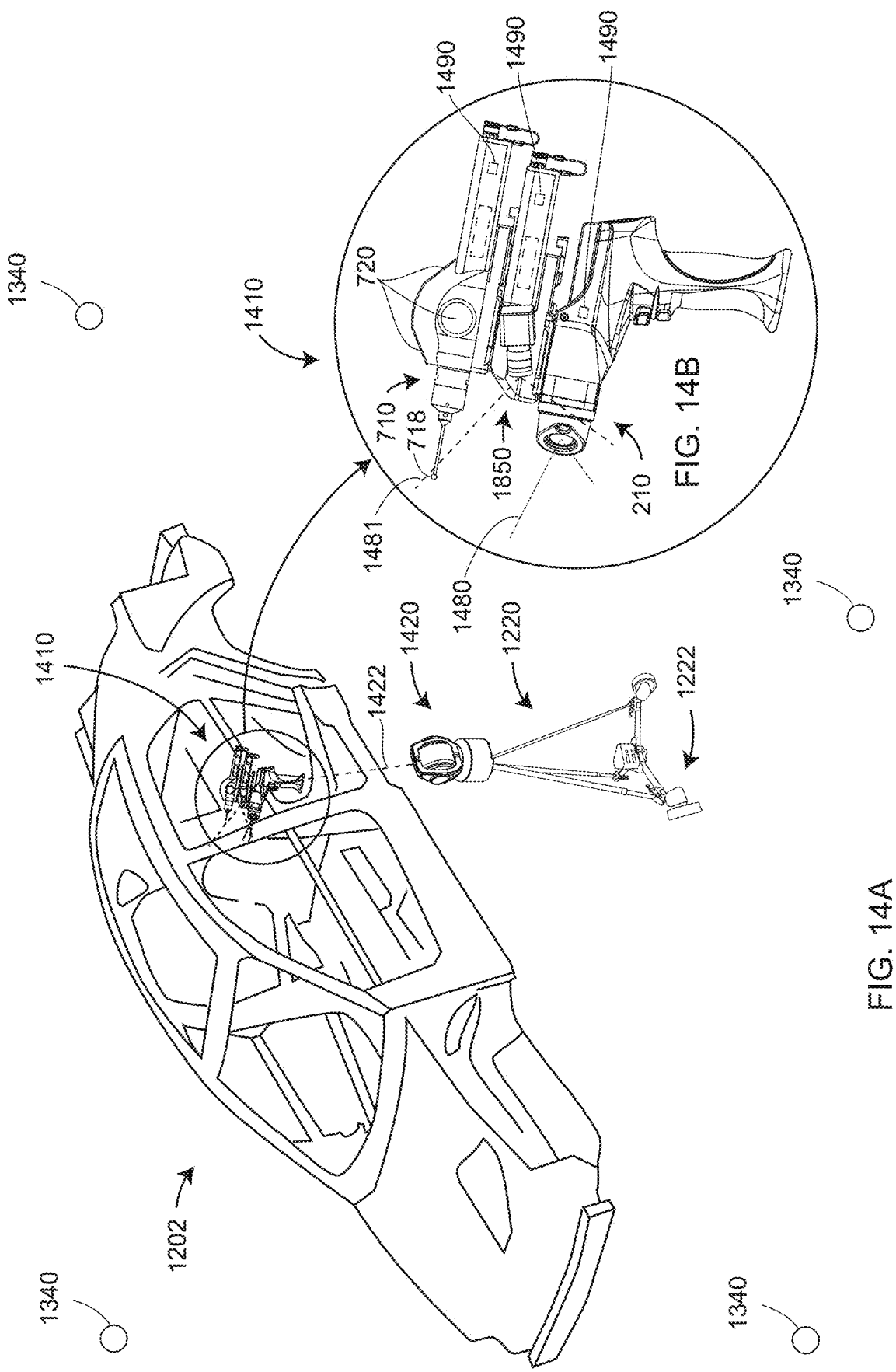

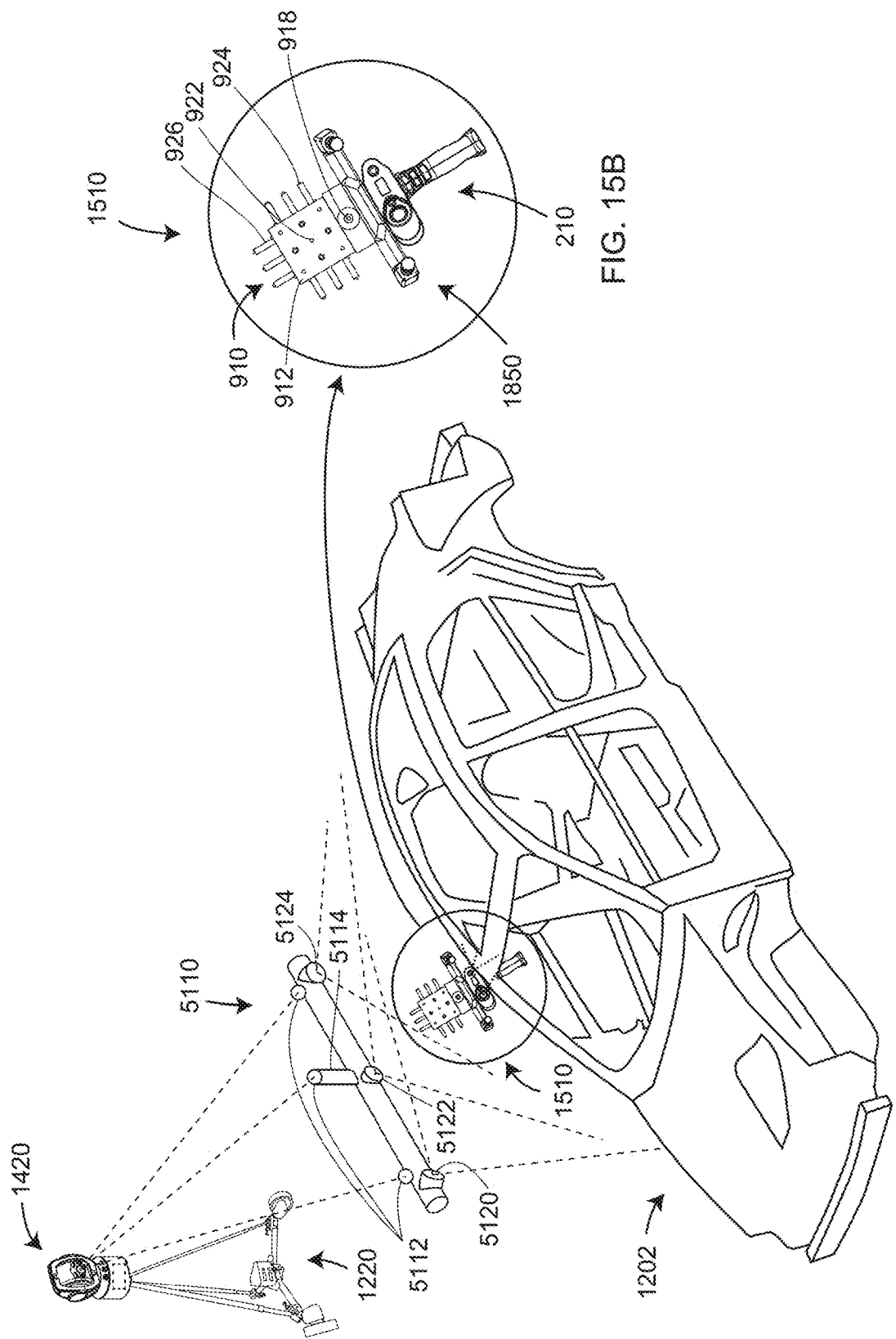

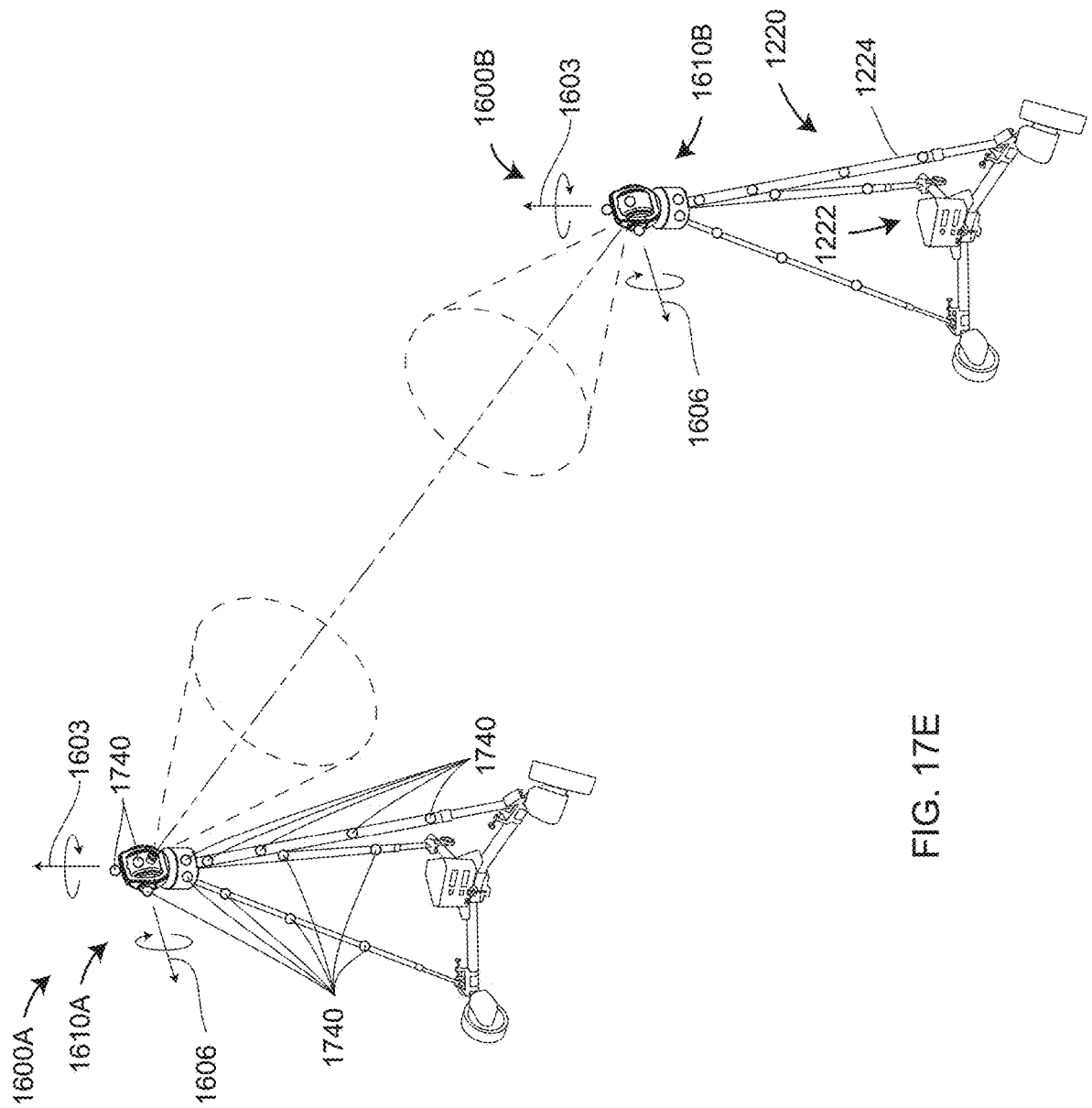

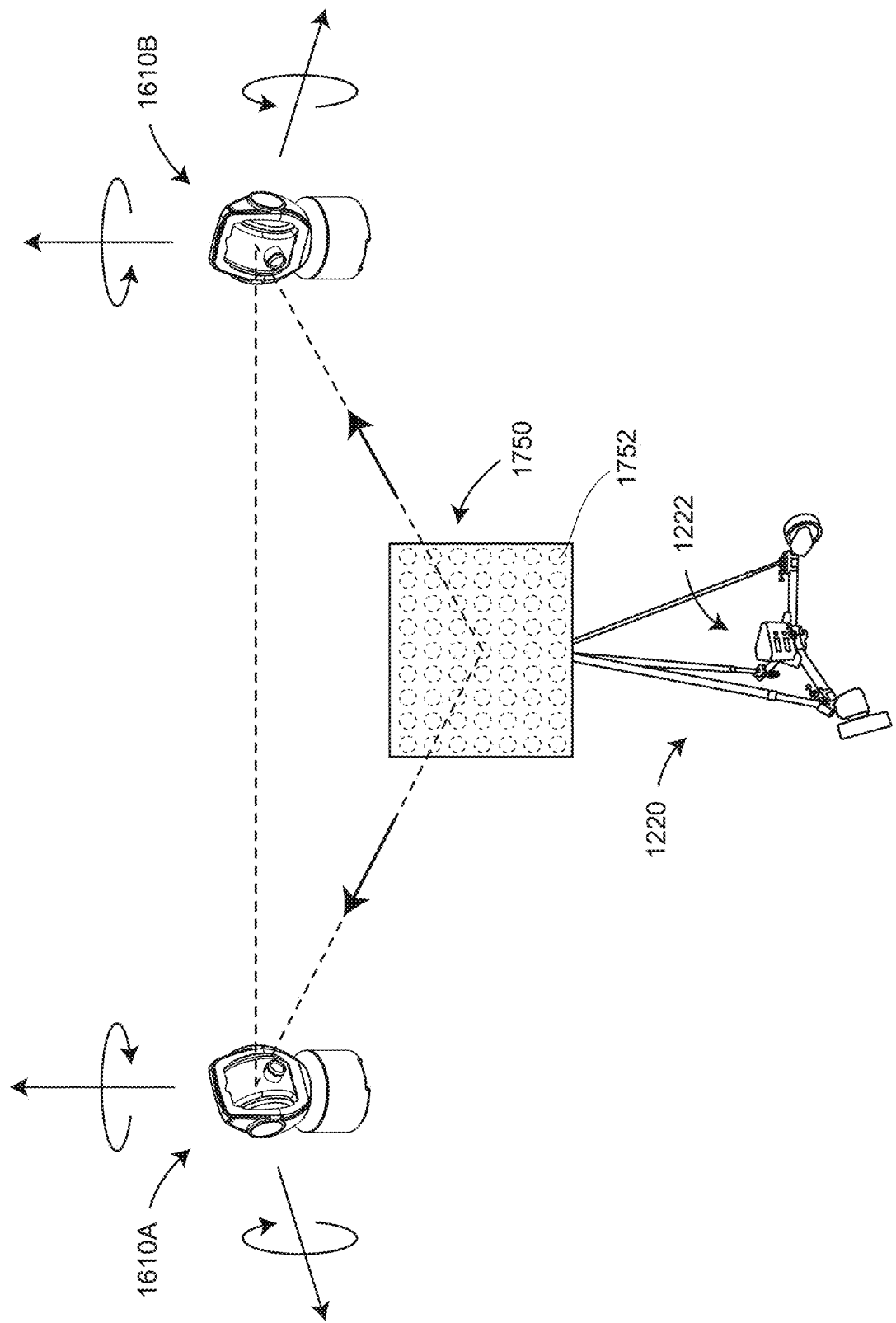

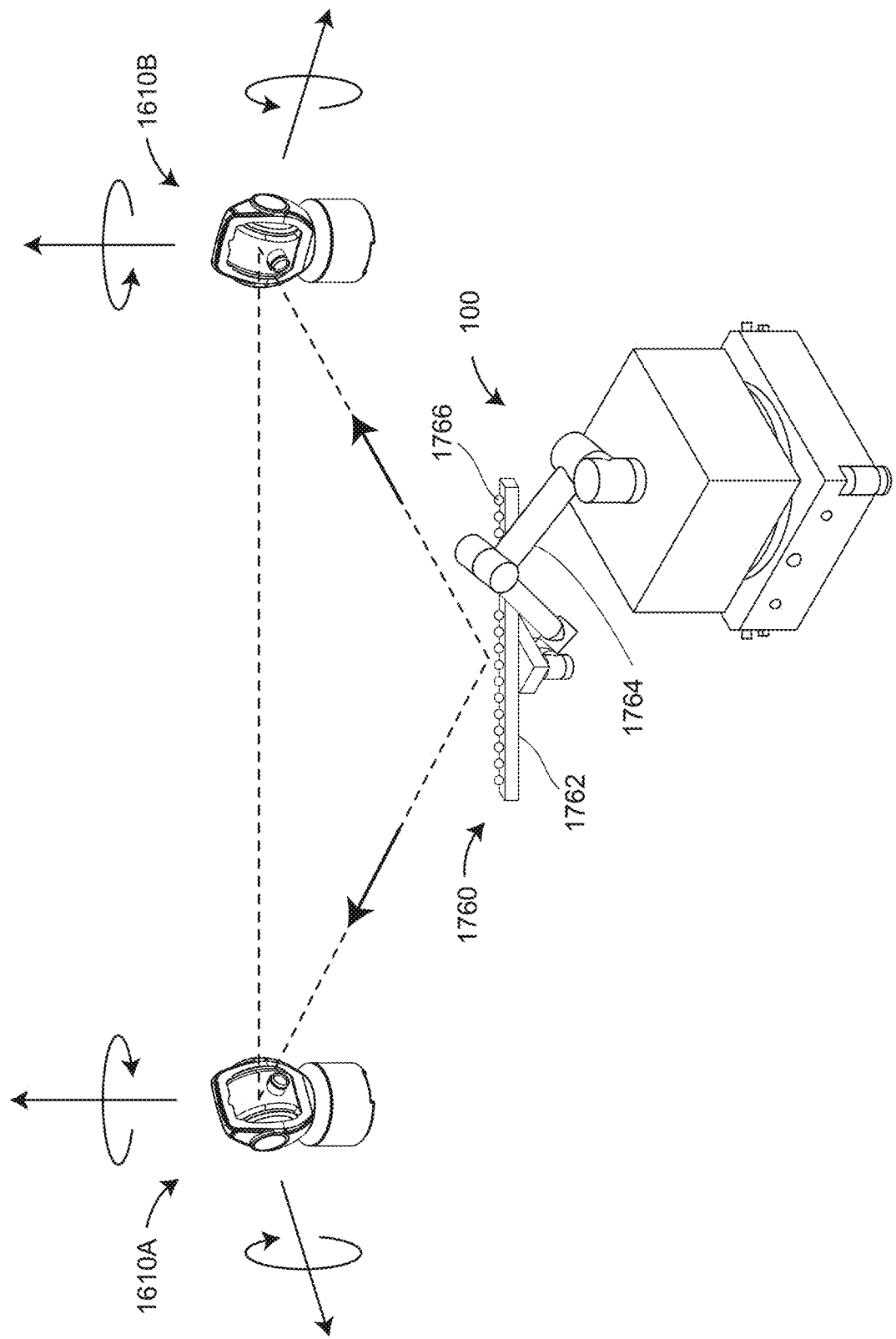

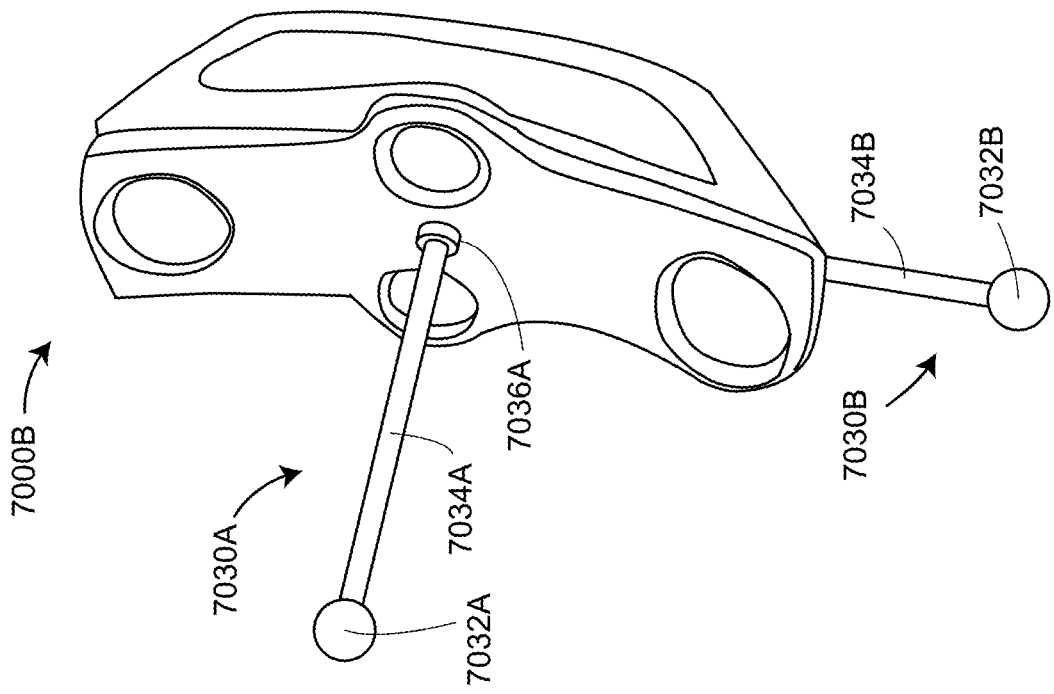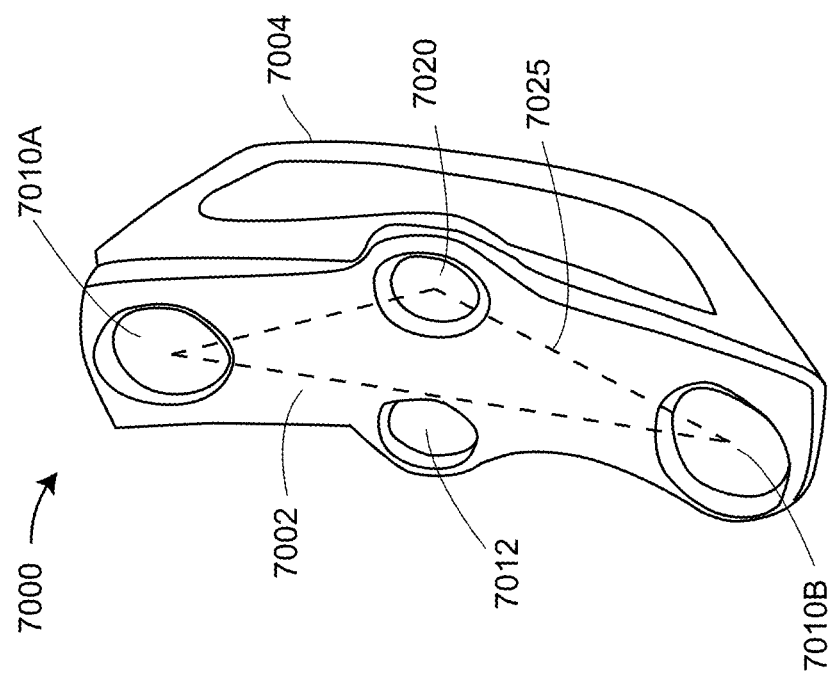

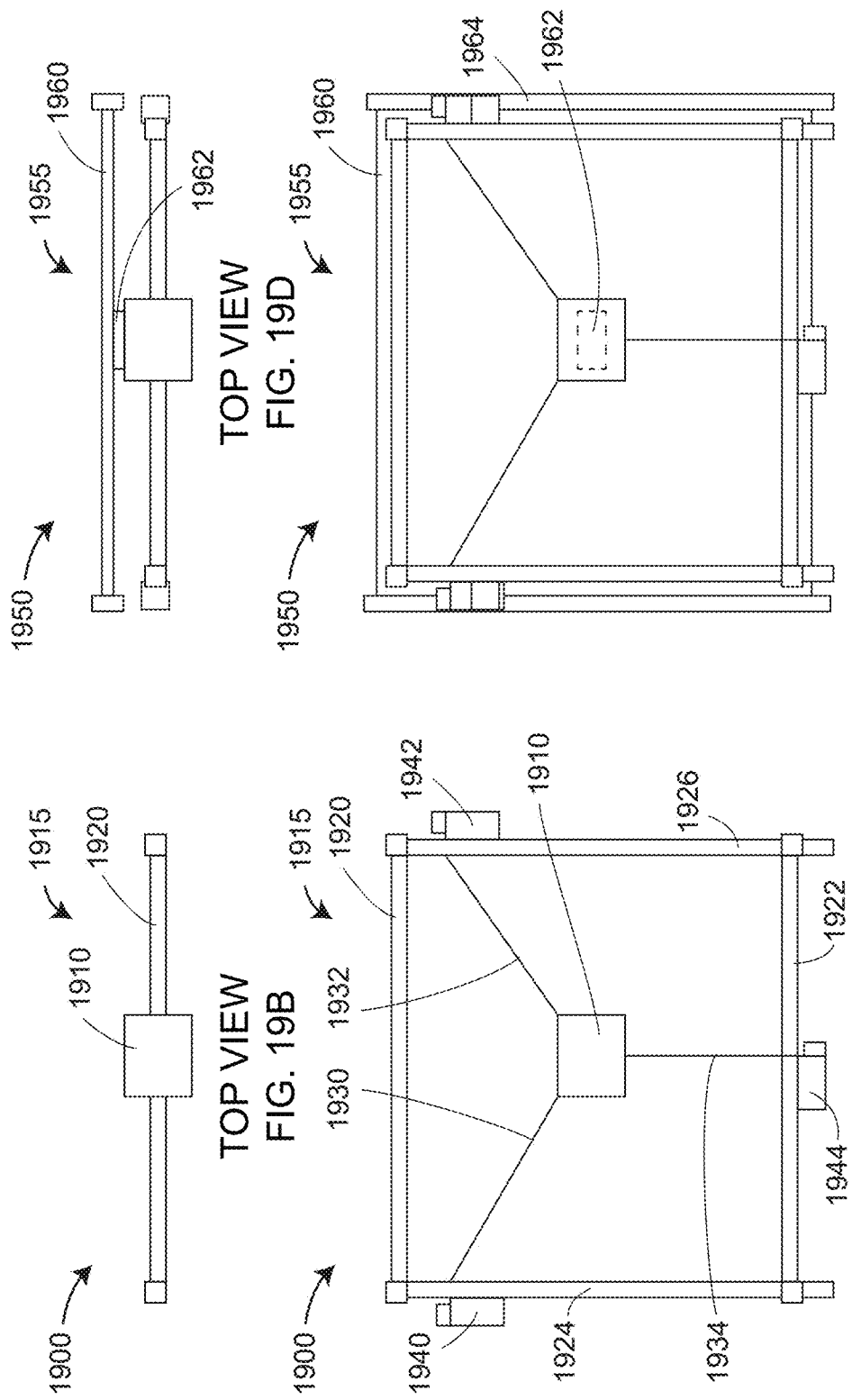

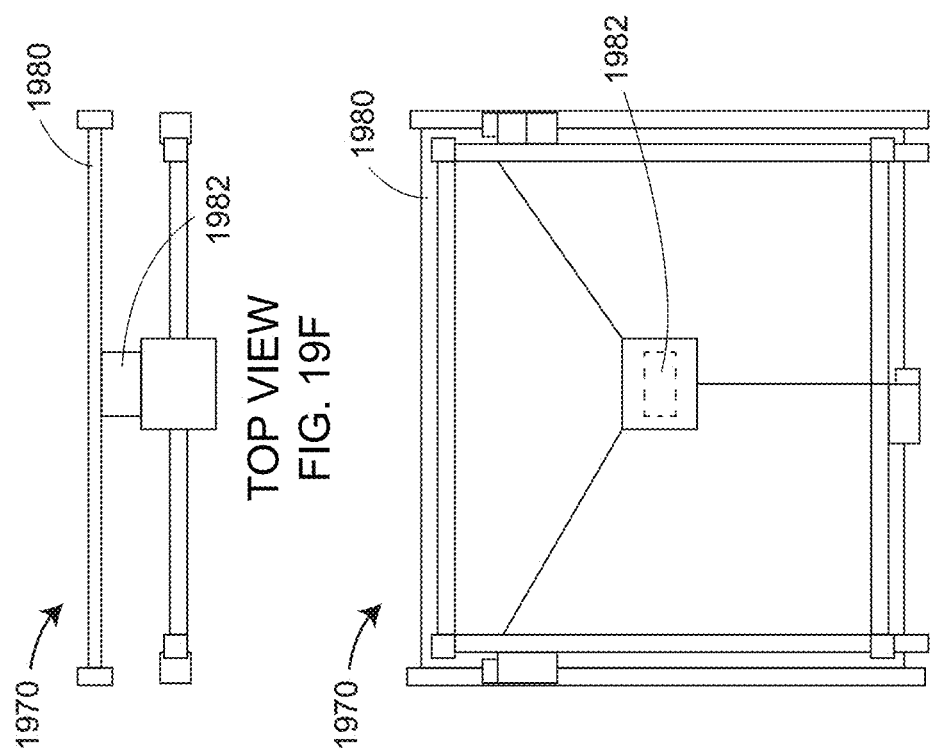

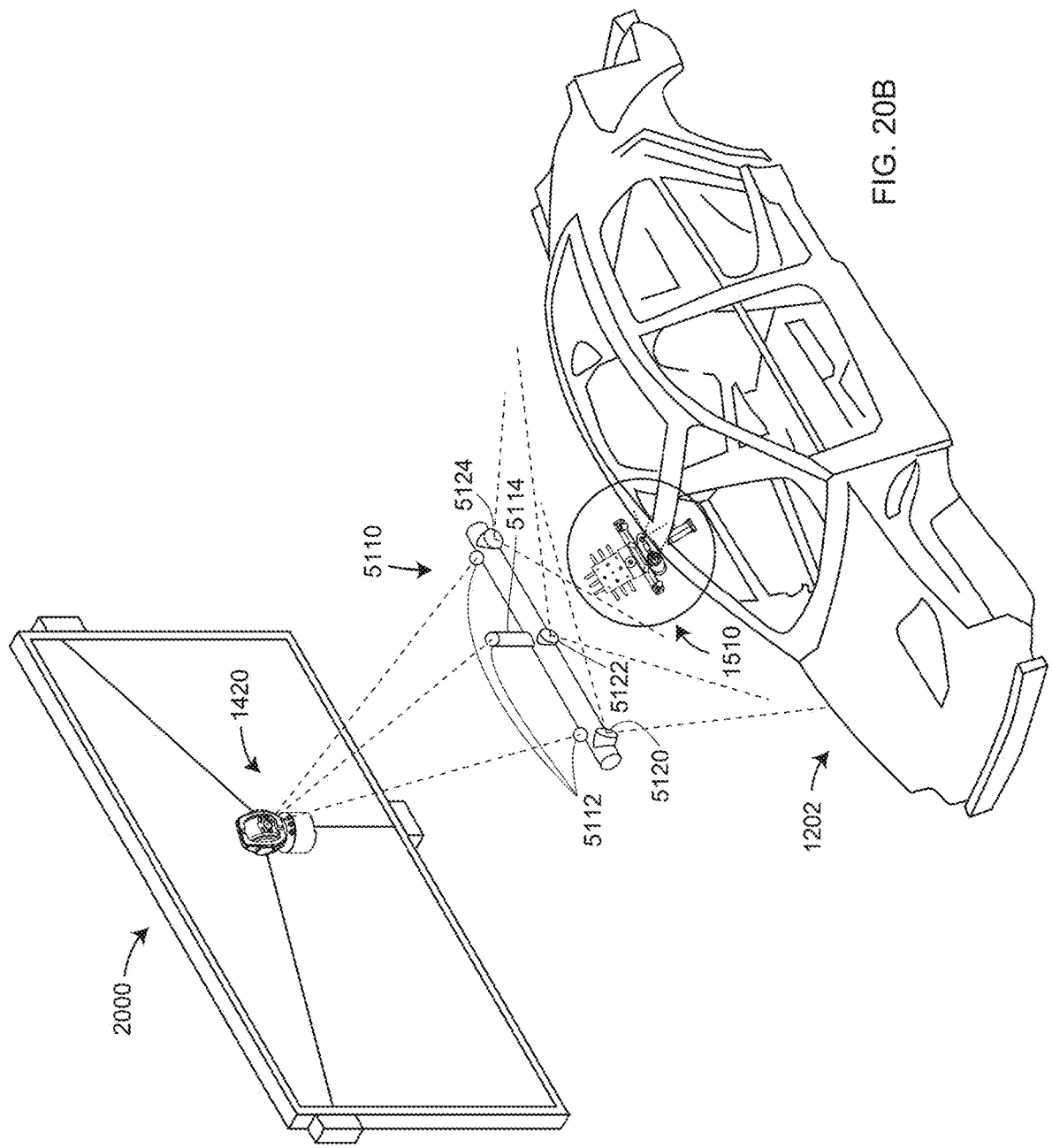

REGISTRATION OF THREE-DIMENSIONAL COORDINATES MEASURED ON INTERIOR AND EXTERIOR PORTIONS OF AN OBJECT

CROSS-REFERENCE TO RELATED APPLICATIONS

The present application is a Continuation Application of U.S. patent application Ser. No. 16/131,537 filed Sep. 14, 2018, which is a Continuation Application of U.S. patent application Ser. No. 15/880,878, now U.S. Pat. No. 10,126,116, which is a Continuation Application of U.S. patent application Ser. No. 15/358,218 filed Nov. 22, 2016, now U.S. Pat. No. 9,909,855, which claims the benefit of U.S. Provisional Application Ser. No. 62/272,744 filed on Dec. 30, 2015, and of U.S. Provisional Application Ser. No. 62/272,749 filed on Dec. 30, 2015, and of U.S. Provisional Application Ser. No. 62/272,757 filed on Dec. 30, 2015, and of U.S. Provisional Application Ser. No. 62/272,761 filed on Dec. 30, 2015, and of U.S. Provisional Application Ser. No. 62/272,766 filed on Dec. 30, 2015, the contents of all of which are incorporated by reference herein in their entirety.

FIELD OF THE INVENTION

The present disclosure relates to methods for registering three-dimensional (3D) coordinates measured on interior and exterior portions of one or more objects. The present disclosure also relates to methods for registering two objects where one of the objects is obscured by the other object.

BACKGROUND

Today dimensional measurements may be made by handheld measuring instruments that are not automated or by fixed instruments that are automated. Examples of such handheld instruments include triangulation scanners such as structured light scanners. Another example of a handheld instrument is a laser tracker having an operator that carries around a spherically mounted retroreflector (SMR) to determine 3D coordinates of points in contact with the SMR. An example of an instrument that can be automated but is fixed in place is a Cartesian CMM. Another example of an automated instrument fixed in place is a robot that holds a measurement device such as a triangulation scanner, also referred to as a 3D imager. In some cases, 3D measuring devices combine tactile measuring capability with non-contact scanning capability.

A difficulty commonly encountered in making 3D measurements of complex objects is that, in some cases, the 3D measuring instruments such as scanners are registered using an external 3D coordinate measuring device such as a laser tracker, which provides a direct registration to a global environment, while in other cases the 3D measuring instruments do not have connection to a device providing a direct registration to a global environment. There is a need today for coordinating registration of 3D data collected in these different cases. One example of such a need is in measuring an internal feature such as a hole with a tactile probe when there is no method for directly registering the tactile probe with an external 3D measuring device. Yet another opportunity is to devise measuring devices having added capability in making 3D measurements in interior and exterior regions of an object under test.

While existing 3D measuring devices such as scanners are suitable for their intended purposes, what is needed is a device having improved ability to combine globally registered and locally registered 3D measurement data.

SUMMARY

In accordance with one or more embodiments, a method for measuring three-dimensional (3D) coordinates is provided. The method includes: determining with a six-DOF tracking system a first position and a first orientation of a dimensional measuring device, the dimensional measuring device configured to determine 3D coordinates of the object surface in a device frame of reference; determining a first 3D coordinates of at least one first point on the object with the dimensional measuring device; determining with the six-DOF tracking system a second position and a second orientation of the dimensional measuring device; capturing with an overview camera a first overview image of a first portion of the object and determining a first 2D coordinates of a first cardinal point in the first overview image, the overview camera being associated with dimensional measuring device; determining, with the dimensional measuring device in the second position and second orientation, a second 3D coordinates of at least one second point on the object with the dimensional measuring device; moving the dimensional measuring device to a third position and third orientation, wherein the third position and third orientation cannot be determined by the six-DOF tracking system; capturing with the overview camera a second overview image of a second portion of the object and determining a second 2D coordinates of the first cardinal point in the second overview image and a third 3D coordinates of a second cardinal point in the second overview image, the second cardinal point further being viewable in the first overview image; determining, with the dimensional measuring device in the third position and third orientation, a third 3D coordinates of at least one third point on the object with the dimensional measuring device; and transforming the first 3D coordinates, the second 3D coordinates and the third 3D coordinates into a system frame of reference based at least in part on the first 2D coordinates of the first cardinal point, the second 2D coordinates of the first cardinal point, and the second 2D coordinates of the second cardinal point.

These and other advantages and features will become more apparent from the following description taken in conjunction with the drawings.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 14A shows the laser tracker tracking a 3D measurement device that is measuring 3D points on an exterior of an object according to an embodiment;

FIG. 14B is a close up side view of the 3D measurement device according to an embodiment;

FIG. 15A shows a laser tracker measuring retroreflectors on a camera bar to establish the pose of the camera bar in a global frame of reference while the camera bar tracks a 3D measurement device that includes light marks according to an embodiment;

FIG. 15B shows a close up view of the 3D measurement device according to an embodiment;

FIGS. 17E-G show methods of determining the relative pose of two rotating camera assemblies according to embodiments;

FIG. 18A shows a handheld area scanner having two cameras and a projector in a triangular configuration according to an embodiment;

FIG. 18B shows an area scanner having two tactile probes according to an embodiment;

FIGS. 19A, 19B shows a cable robot being used to position and coordinate measuring device according to an embodiment;

FIGS. 19C-F show the cable robot further constrained in position through the use of an electromagnet and a vacuum attachment, respectively, according to an embodiment;

FIG. 20B shows the cable robot being used to position a laser tracker that determines the pose of a camera bar, which in turn determines the pose of a 3D measurement device that includes light marks according to an embodiment.

Figure 1A:
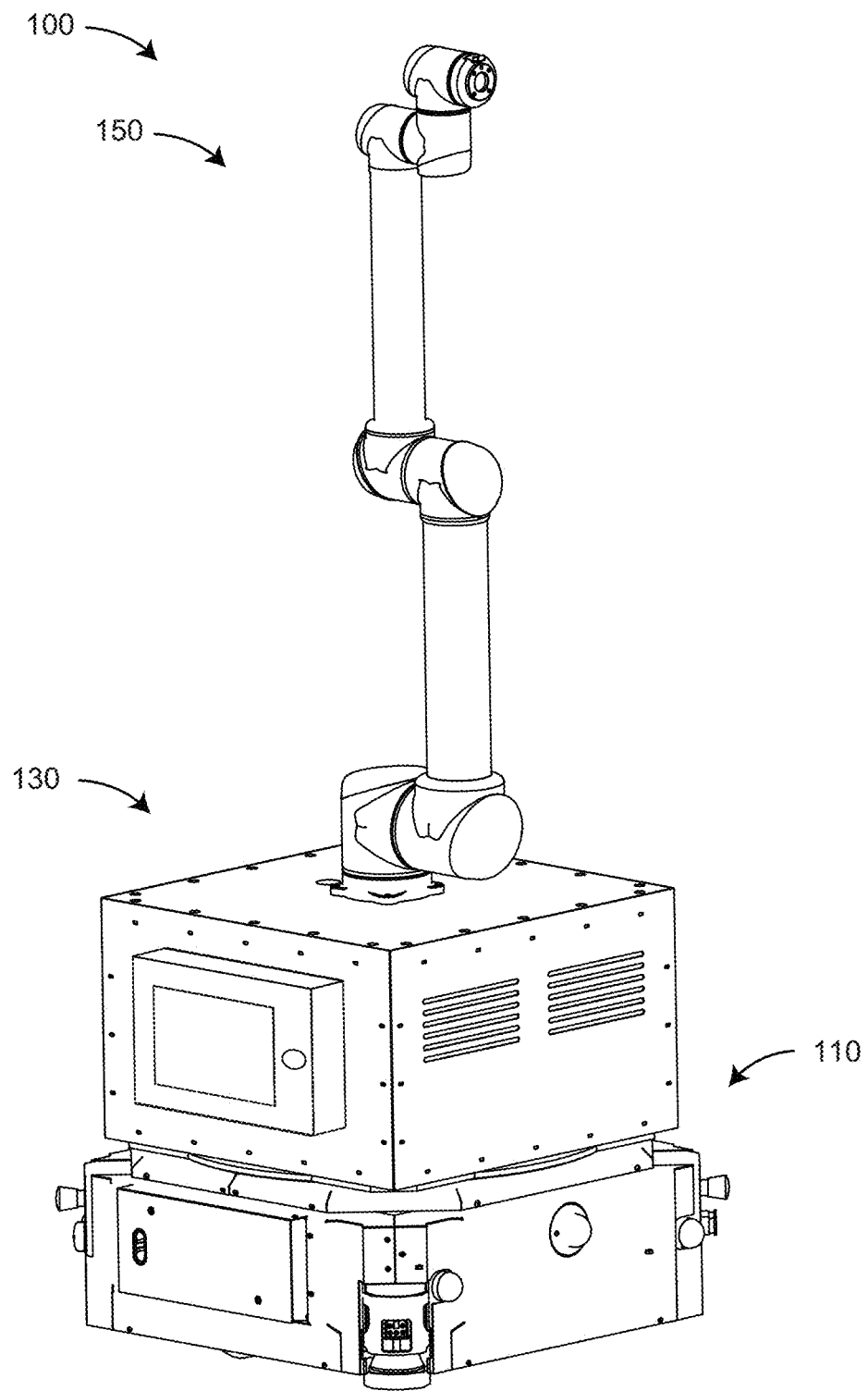
FIGS. 1A-1D are perspective, left-side, front-side, and top views of a mobile platform according to an embodiment.
Figure 1B:
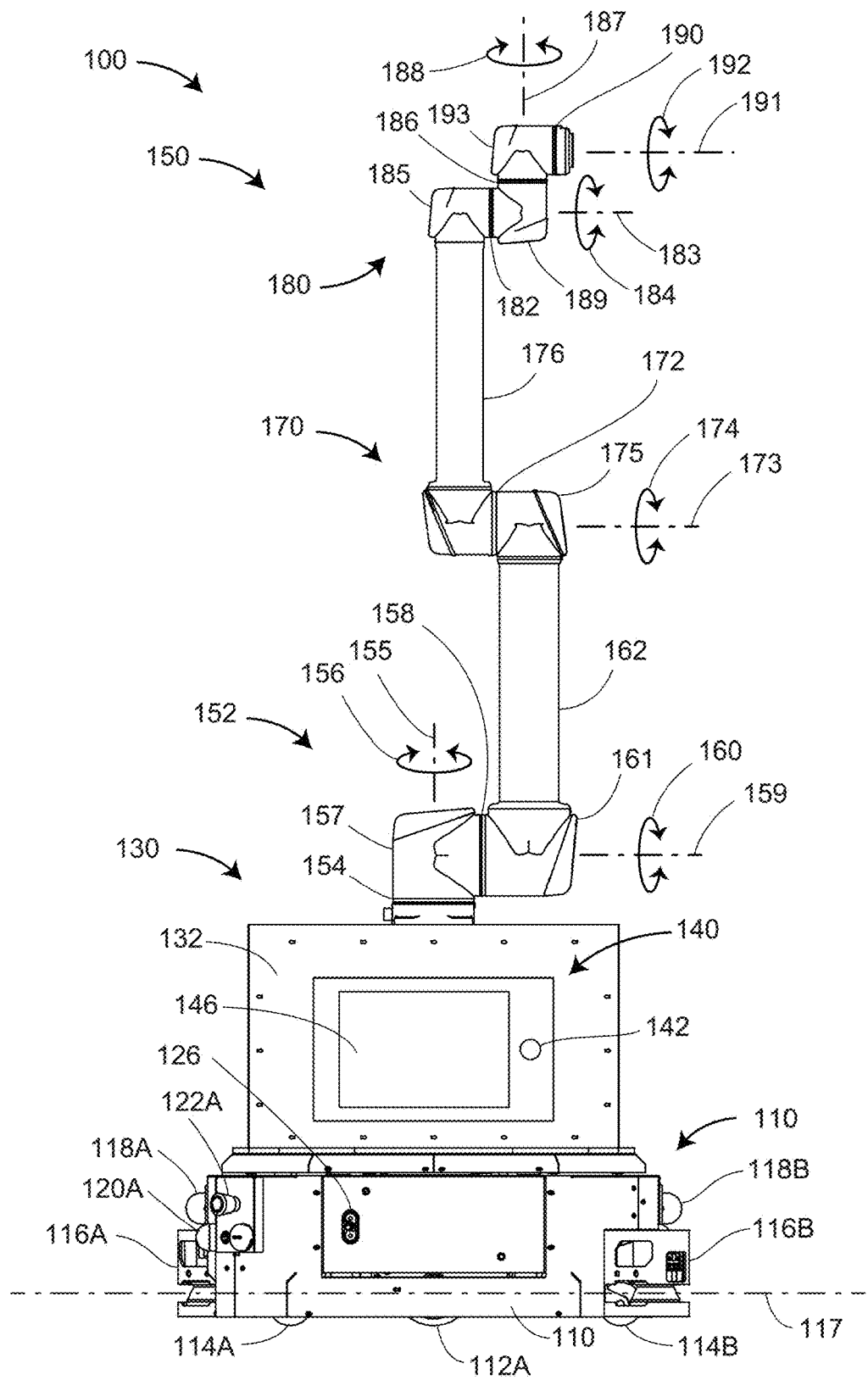
Figure 1C:
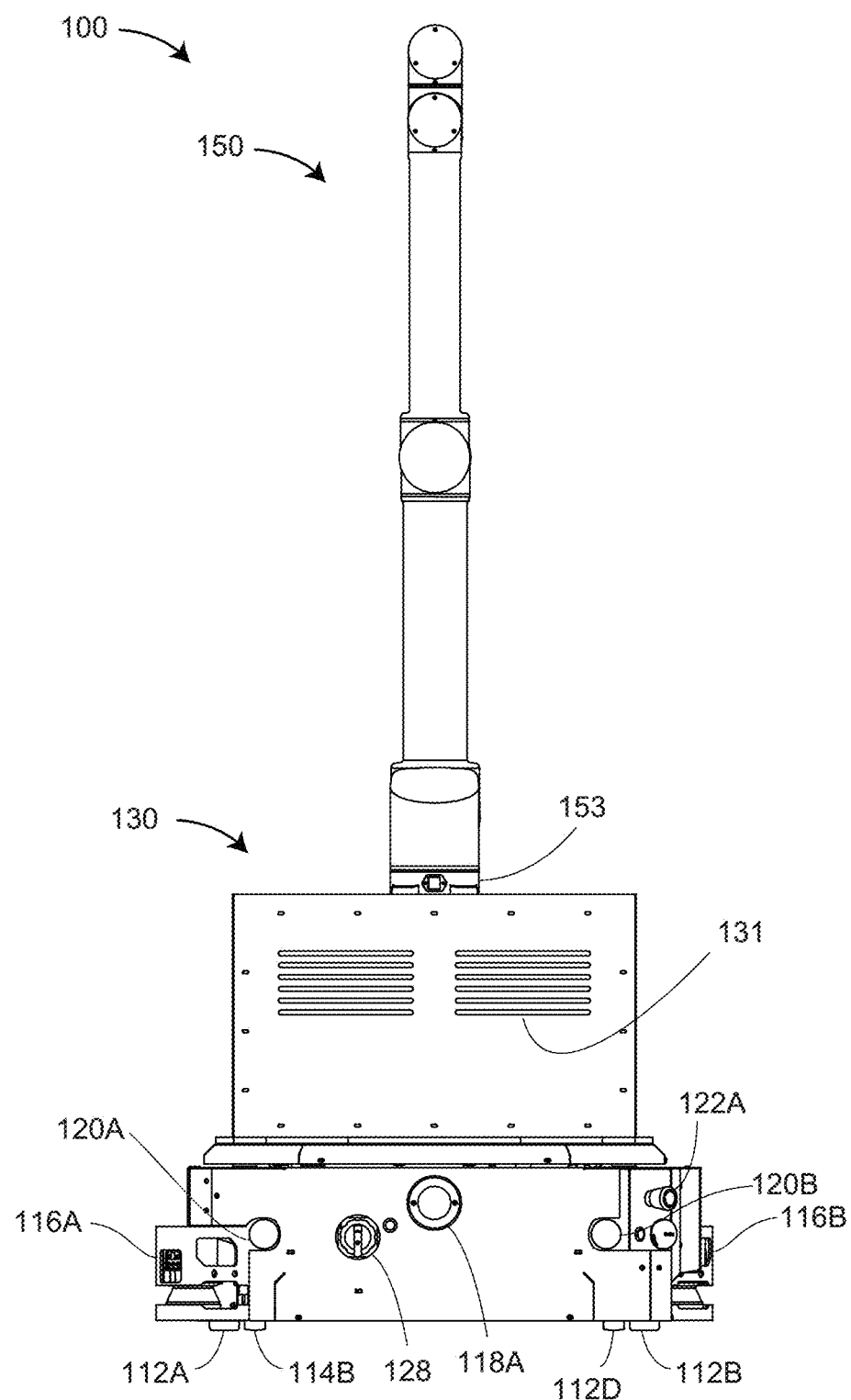
Figure 1D:
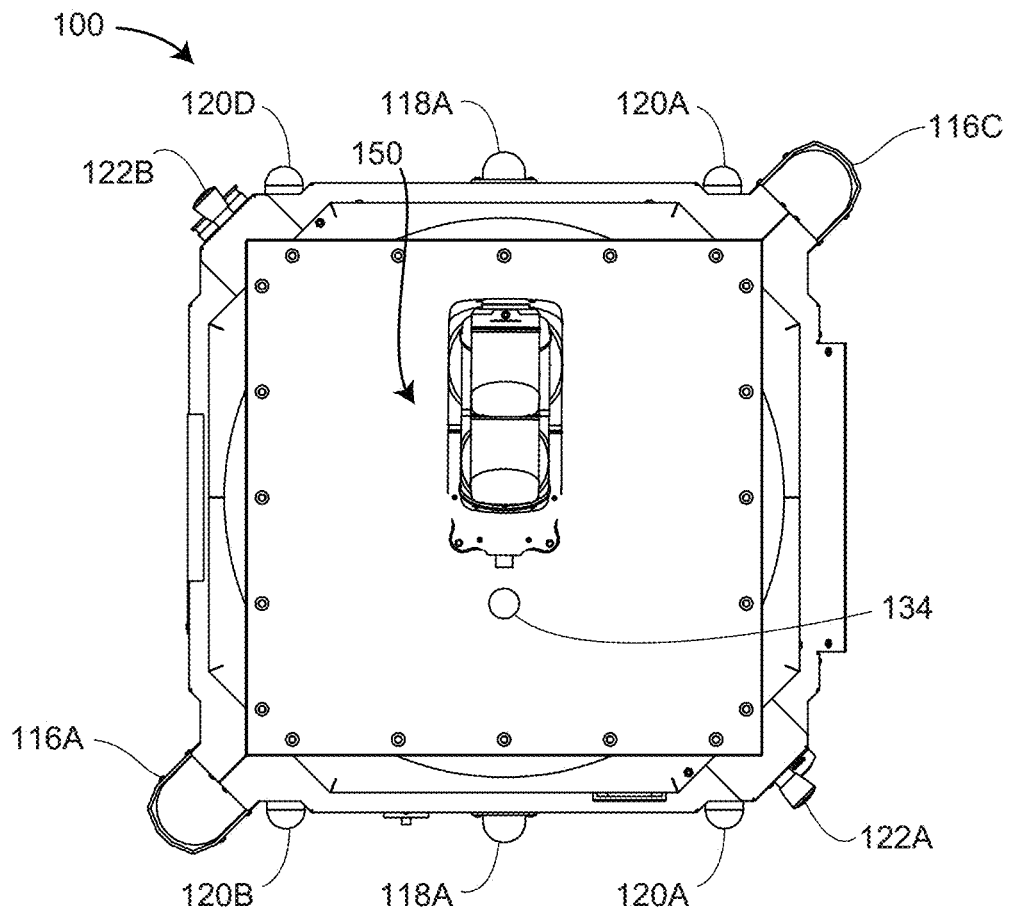

The detailed description explains embodiments of the invention, together with advantages and features, by way of example with reference to the drawings.

DETAILED DESCRIPTION

FIGS. 1A-1D illustrate perspective, left, front, and top views, respectively, of a mobile measurement platform 100, which includes a mobile base assembly 110, an arm electronics assembly 130, and a robotic articulated arm 150. Many different types of wheels may be used to drive the mobile measurement platform 100. In an embodiment, two active wheels are used to propel the mobile measurement platform 100, while one or more additional wheels are used to provide balance to the structure. In other embodiments, additional active wheels may be used. Types of wheels that may be used include simple wheels, omni-wheels, and Mecanum wheels. In an embodiment, wheels 112A, 112B are simple active wheels, and wheels 114A, 114B, 114C, and 114D are simple, passive, free-turning wheels. In an embodiment, active wheels 112A, 112B operate independently and may rotate forward, rotate backward, and hold in place. If both wheels turn together at the same rate, the mobile robot platform 100 is propelled forward or backward according to the direction of wheel rotation. If the left wheel 112B is held in place while the right wheel propels the platform forward, the mobile robot platform 100 will turn about the left wheel 112B in a counterclockwise direction as seen from the top view. If the left wheel 112B turns relatively slowly while the right wheel 112A turns relatively quickly, the effect will be turn the robot in a counterclockwise direction (as seen from the top view) but in an arc. By adjusting the rotation rates and directions of the wheels 112A, 112B, the mobile measurement platform 100 may be directed to follow any desired path.

In an embodiment, the mobile measurement platform 100, including the robotic articulated arm 150, is considered a human-friendly robotic device, which is a type of robotic device that can work safely around people. In an embodiment, the speed of the mobile platform is limited to one meter/second, which by German law is maximum speed for autonomous vehicles in a factory environment that includes people. In addition, the mobile measurement platform 100 includes an obstacle detection and avoidance system. In an embodiment, obstacle detection is provided by two two-dimensional (2D) scanners 116A, 116B. In an embodiment, the 2D scanners are SICK model S300 Professional safety laser scanner. These scanners emit a horizontal plane of light that measures distance and angle for each angle in a horizontal plane 117 over an angular range of 270 degrees. Because the 2D laser scanners 116A, 116B are in diagonally opposite corners of the mobile base assembly 110, the scanner obtains dimensional information on potential obstacles over the full 360 degrees. In an embodiment, the horizontal plane 117 is close to the floor, which is the region in which obstacles are best detected. If an obstacle is detected, a signal is sent to processors in the system that causes the mobile platform to stop movement. In addition, a person may press an emergency stop button 122A to stop movement of the mobile platform. In an embodiment, ultrasound sensors may be provided for obstacle avoidance when glass or other transparent surfaces are present. In an embodiment, the mobile base assembly 110 includes an on-off switch 128. It also includes indicator lights 118A, 118B, 120A, 120B, 120C, and 120D.

In an embodiment, the robotic articulated arm 150 is safely used around people. In an embodiment, the robotic articulated arm 150 is a Universal Robots model UR10. In other embodiments, the robotic articulated arm is one provided by Kuka Robotics, ABB Robotics, FANUC Corporation, or another robot manufacturer. The robotic articulated arm 150 includes a shoulder 152, an elbow 170, and a wrist 180, in correspondence to human anatomy. In an embodiment the robotic articulated arm 150 includes six joint 154, 158, 172, 182, 186, 190 configured to rotate about axes 155, 159, 173, 183, 187, 191, respectively, bidirectionally by angular movements 156, 160, 174, 184, 188, 192, respectively.

In an embodiment, the arm electronics assembly 130 includes an arm electronics housing 132. In an embodiment, the robotic articulated arm 150 is mounted on a top surface of the arm electronics housing 132 of the robotic articulated arm 150 through an arm base element 153. In an embodiment, cables internal to the robotic arm assembly 150 are routed out of the arm base element 153 through a hole 134 into the arm electronics assembly 130. Inside the assembly 130, the cables from the robotic articulated arm 150 are routed to control box and teach pendant electronics 250, as shown in FIG. 2B.

In an embodiment, the robotic articulated arm is attached at a first end to the top surface of the arm electronics housing 132 and at a second end to an end effector that includes a 3D measurement device, as discussed further herein below. Between the first and second end are a plurality of connected arm segments 162, 176. Each joint assembly 157, 161, 175, 185, 189, 193 includes a motor and an angle measuring device, typically an angular encoder.

The robotic articulated arm includes a collection of joints. Each joint has a corresponding axis of rotation. Each joint is coupled to an associated arm segment or to the end effector, where there is no intervening arm segment between the joint and the associated arm segment. Some of the joints are swivel joints having a swivel axis as the corresponding axis of rotation. Each of the swivel joints is configured to produce rotation of the associated arm segment or end effector about the swivel axis. Other joints are hinge joints having a hinge axis as the corresponding axis of rotation, each of the plurality of hinge joints being configured to produce rotation of the associated arm segment or end effector in a direction perpendicular to the hinge axis. In the example of FIG. 2B, the swivel joints are 154, 186, and 190, and the corresponding swivel axes are 155, 187, and 191. The hinge joints are 158, 172, and 182, and the corresponding hinge axes are 159, 173, and 183.

The physical hardware for the teach pendant 140 is connected to the control box through a cable. In an embodiment, the teach pendant hardware 140 is fixedly attached to the arm electronics assembly 130. In another embodiment, the teach pendant 140 may be removed from the side of the arm electronics assembly and held in the hand of an operator. The teach pendant is used to teach the robotic arm assembly 150 how to perform prescribed movements. In an embodiment, the teach pendant 140 includes a touch screen display 146 and an emergency stop button 142 for the robotic articulated arm. A user may press the emergency stop button to cause the robotic articulated arm to stop movement. The arm electronics assembly 130 may include fans that cooperate with vents 131 to provide cooling.

In an embodiment, the complete movements of the mobile measurement platform 100 are controlled by one or more processors in the system. The one or more processors may be any of the processors shown in elements 220 in FIG. 2B, including computer processors 270 available in a network. The one or more processors may also include processors beyond those in the elements 220. In an embodiment, all of the movements of the mobile measurement platform, including movements of the wheels, the robotic articulated arm, and end effector measurement devices are performed autonomously. In other embodiments, an operator may train the robotic articulated arm 150 to perform desired movements using the teach pendant 140.

Figure 2A:
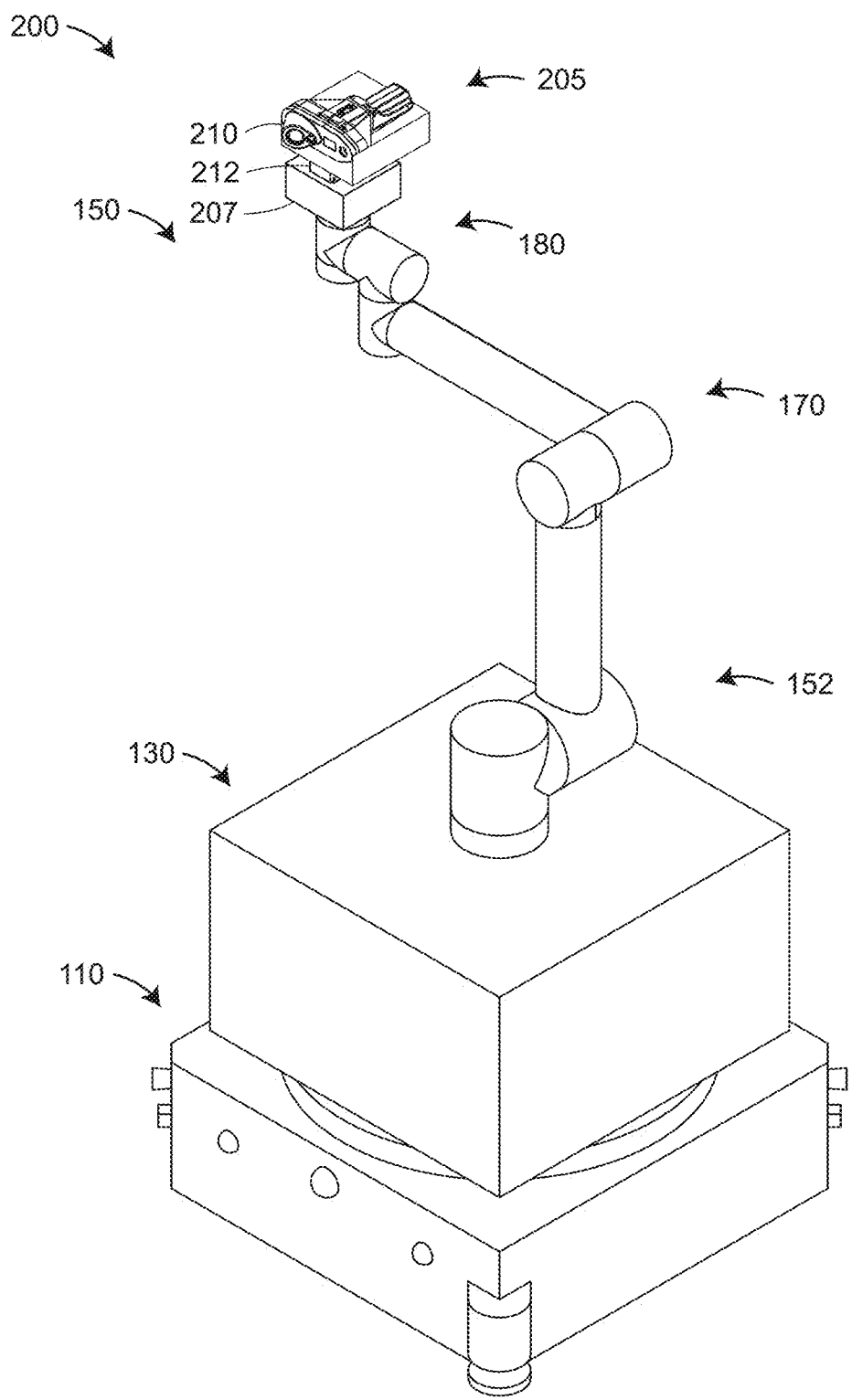
FIG. 2A is an orthographic view of a mobile platform that includes a triangulation scanner according to an embodiment.
Figure 2B:
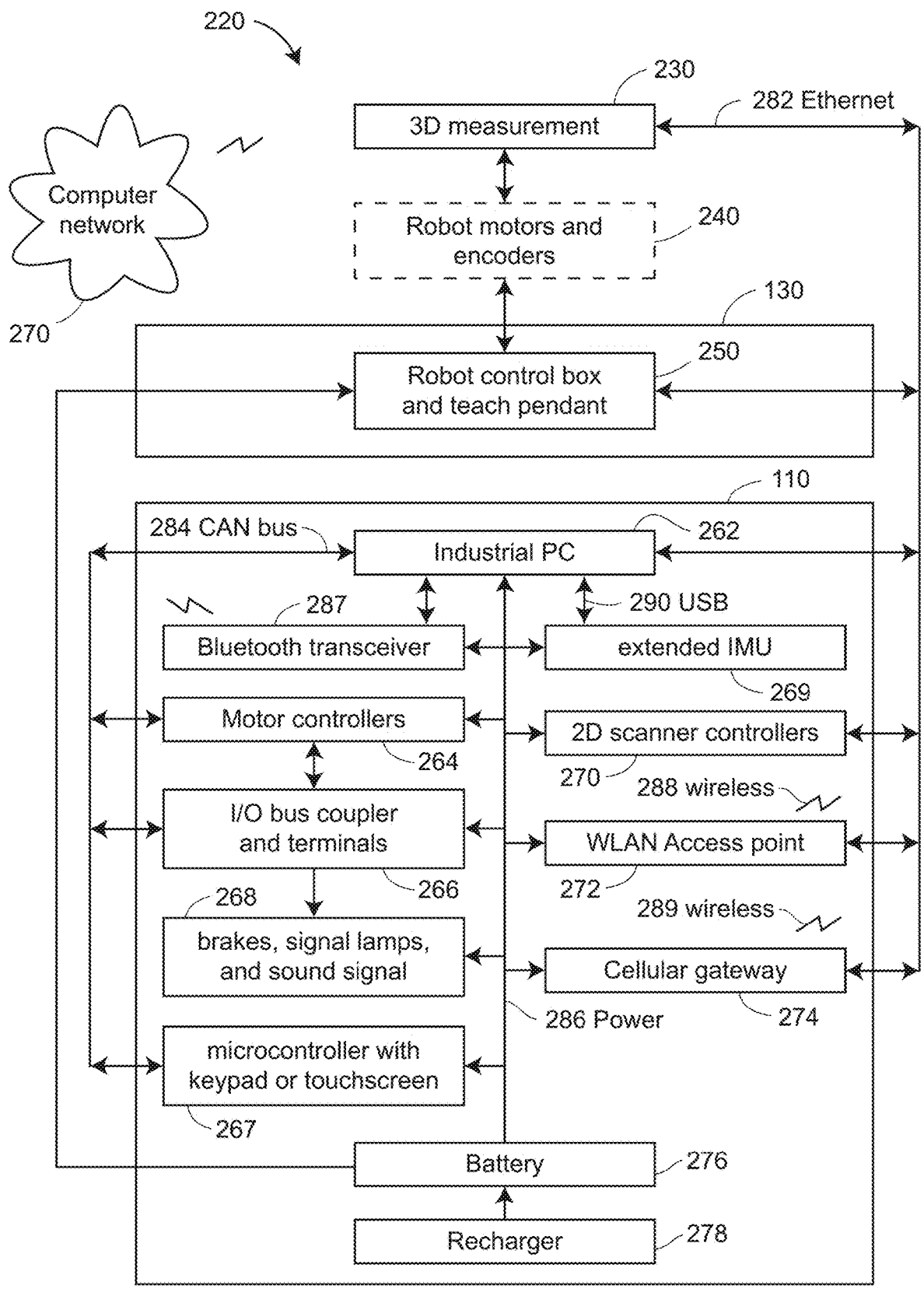
FIG. 2B is a block diagram of an electrical and computing system according to an embodiment.
Figure 2C:
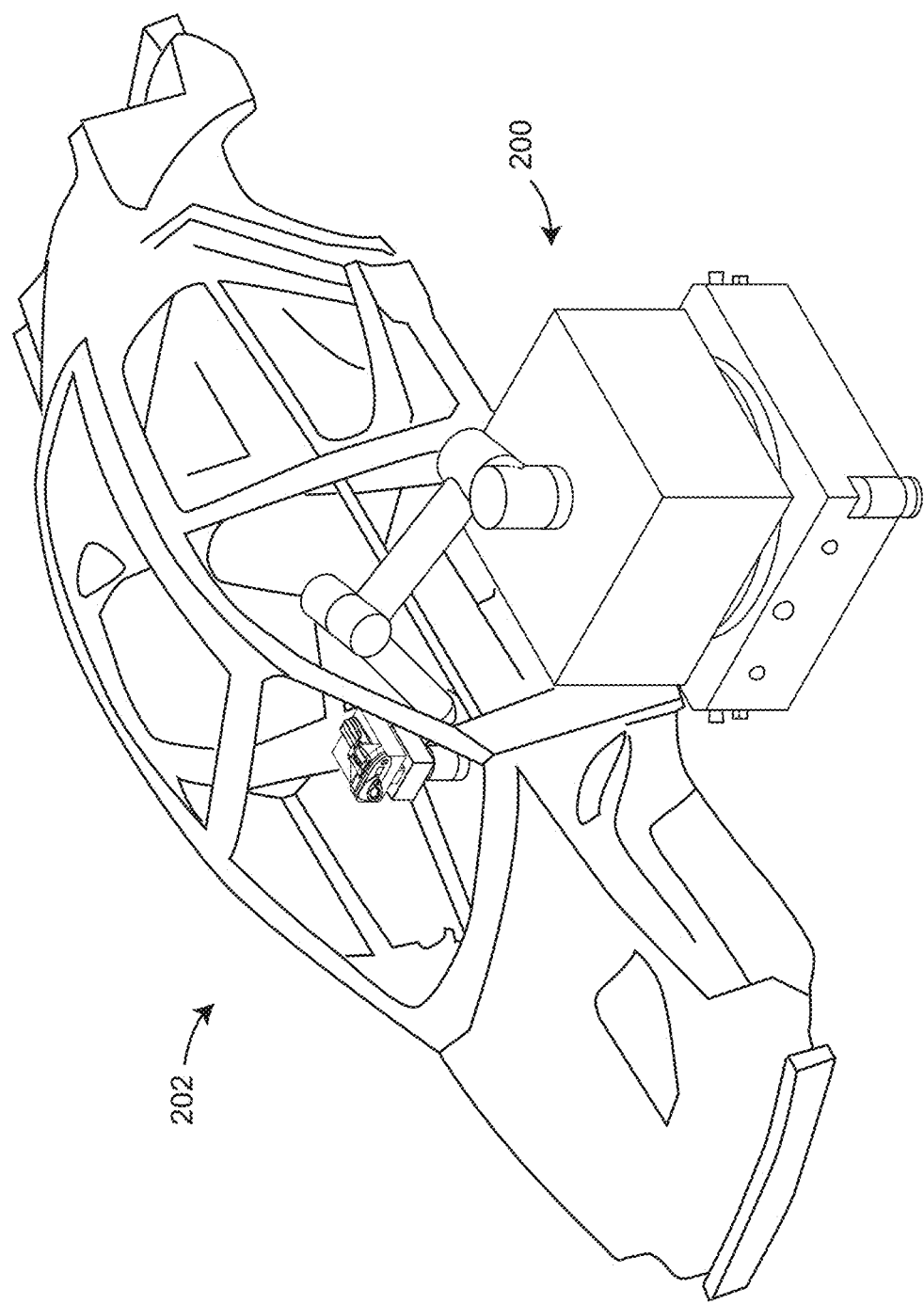
FIG. 2C illustrates, in a perspective view, a mobile platform that includes a scanner measuring an interior of an automobile body-in-white (BIW) according to an embodiment.

FIG. 2A is an isometric view of a complete mobile measurement platform 200, which is the same as the mobile measurement platform 100 except that an end effector 205 has been added, including an electronics interface box 207 and a triangulation scanner 210. In an embodiment, the triangulation scanner 210 is detachably connected to the electronics box 207 through a connector 212. The motors of the robotic articulated arm 150 have turned the arm segments and end effector to orientations that are different than those of FIGS. 1A-1D. The shoulder 152 is positioned the same as before, but the elbow has been rotated about a hinge axis by 90 degrees and the wrist rotated about a swivel axis by 90 degrees. In making 3D measurements of objects having relatively complicated geometry, for example, the interior of an automobile Body-in-White (BiW) as shown in FIG. 2C. To perform a wide range of 3D measurements, the measurement platform 200 in most cases needs to provide a plurality of swivel and hinge joints. For example, the rotation of a hinge joint and a swivel joint are essential in FIG. 2C to access the region to be measured.

FIG. 2B is a block diagram of the electrical and computing system 220 of the complete mobile measurement platform 200. The mobile base assembly 110 includes an industrial PC (IPC) 262. In an embodiment, the IPC is a Beckhoff C6920-0050 Control Cabinet that includes an Intel® Core™ i7 processor. Other electrical devices in the electrical and computing system 220 include two motor controllers 264, input/output (I/O) bus couplers and terminals 266, microcontroller 268, extended inertial measurement unit (IMU) 269, two 2D scanner controllers 270, wireless local area network (WLAN) access point 272, cellular gateway 274, battery 276, and recharger 278. The IPC exchanges digital information with motor controller 264 over a Controller Area Network (CAN) bus 284. In an embodiment, the motor controller includes an H-bridge that enables the wheels to be turned forward or backward. The motor controller 264 also sends data from the angular encoders to the IPC 262. An angular encoder tied to each wheel axle provides relatively accurate odometry readings. In an embodiment, each wheel is attached to a sealed unit that includes a motor and an encoder.

In an embodiment, a battery 276 provides 24 volts to multiple devices in the system, as indicated in FIG. 2B. A recharger 278 is accessed through the mains adapter 126 in FIG. 1B. In another embodiment, a separate battery provides power to the robot control box and teach pendant 250 in the arm electronics assembly 130.

The I/O bus coupler cooperates with bus terminals to send and receive digital data. In an embodiment, the I/O bus coupler is a Beckhoff BK5150 CANopen bus coupler that cooperates with Beckhoff KL1408 digital input terminals and Beckhoff KL2408 digital output terminals. The digital input and digital output terminals are 8 channel terminals that operate on 24 volts. In an embodiment, digital output signals are sent to the brakes, signals lamps, and sound maker over digital output channels.

In an embodiment, a microcontroller 268 is provided as a watchdog for use in monitoring digital traffic in the system and troubleshooting problems. In an embodiment, the microcontroller is integrated with a touchscreen or keypad for use by an operator.

In an embodiment, an extended IMU 269 is provided that includes a magnetometer to provide heading information as well as accelerometers and gyroscopes found in traditional IMUs. In addition, the IMU may include a pressure sensor to provide elevation information. In an embodiment, a processor located within extended IMU unit fuses the information obtained from the various sensors, for example, using a Kalman filter or other similar mathematical methods, to improve accuracy of position and orientation information over time. In an embodiment, the extended IMU 269 communicates with the IPC 262 over a Universal Serial Bus (USB) communication link. In an embodiment, the extended IMU is the x-IMU manufactured by x-io Technologies.

The IPC 262 communicates with several devices over Ethernet 282, including the 3D measurement device robot control box and teach pendant 250, 2D scanner controllers 270, WLAN access point 272, and cellular gateway 274. The 2D scanner controllers provide the interface for the IPC to send control signals to the 2D scanners 116A, 116B and receive back distance information for a collection of horizontal angles.

The WLAN access point 272 allows wireless devices such as smart phones, tablets, or laptop computers to connect via communication channel 288 to a wired network of the mobile measurement platform 200 using the IEEE 802.11 standard (WiFi) or a related standard. Wireless communication is also possible over the IEEE 802.15.1 (Bluetooth) standard using a Bluetooth transceiver 287. In an embodiment, devices such as cellular phones may establish wireless communication over cellular communication channels such as 3G/4G LTE. In an embodiment, a communication channel 274 is established using a cellular gateway 274. In an embodiment, the cellular gateway is a Sierra Wireless model GX400.

In some embodiments, signals are sent from the 3D measurement device directly to the IPC 262, either over a wired or wireless network. In an embodiment, a cable is tacked to the robotic articulated arm 150 at a few positions and then routed through the hole 134 to the IPC 262. Some robots provide the possibility of routing some signals directly through the robot arm. In an embodiment, signals are routed from the 3D measurement device electronics 230 to a real-time bus, which might be EtherCAT, SERCOS III, PROFINET, POWERLINK, or EtherNet/IP, for example. Such a real-time bus may attach to dozens or hundreds of other devices in an automation network.

Figure 3A:
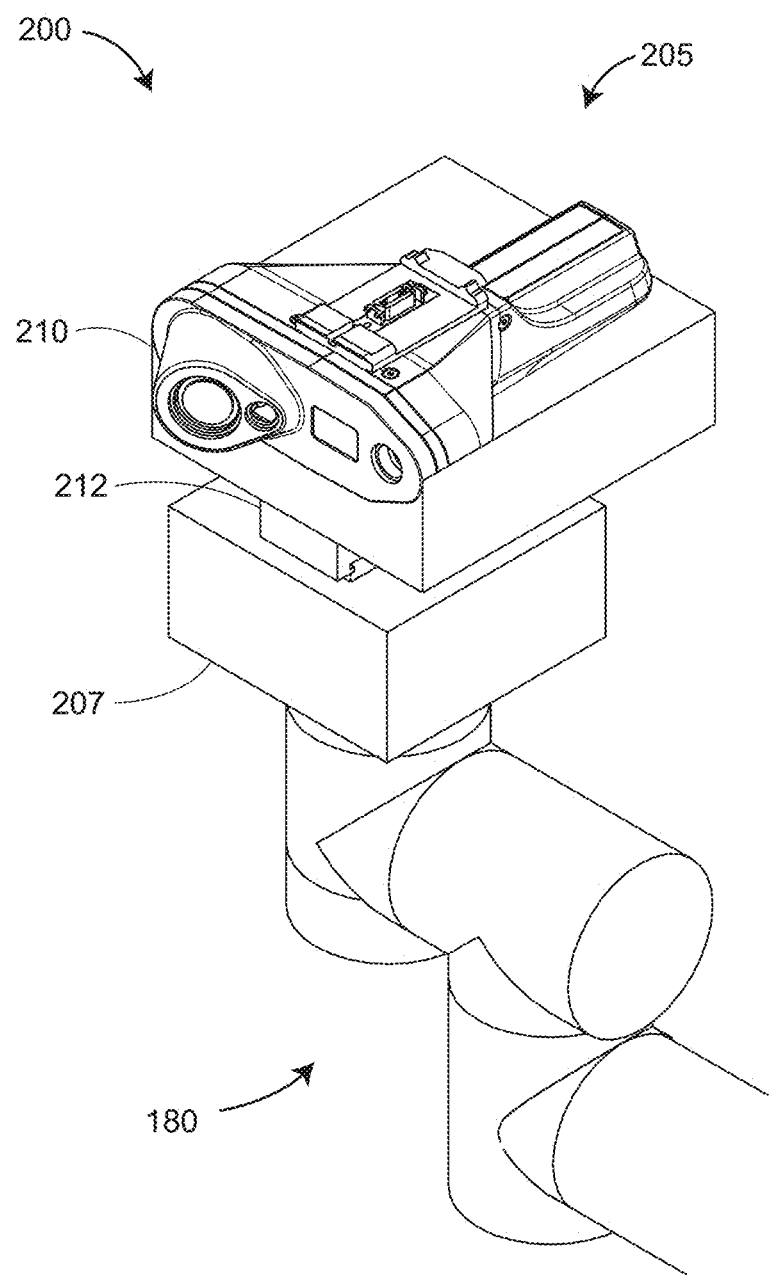
FIG. 3A is a close-up view of a portion of an end effector that holds a triangulation scanner according to an embodiment.
Figure 3B:
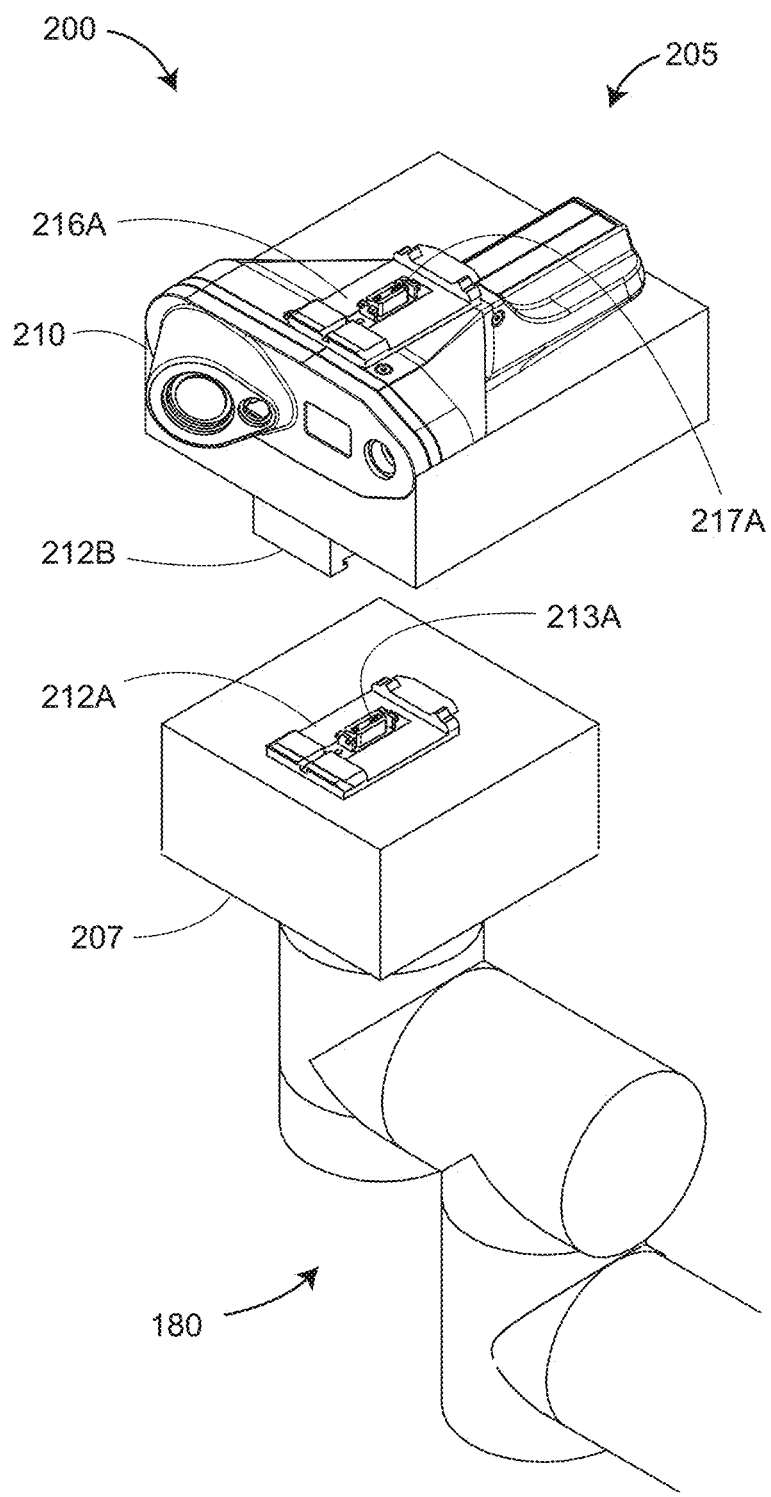
FIG. 3B is an exploded isometric view of an electronics box and triangulation scanner on an end effector of a robotic articulated arm on the mobile platform according to an embodiment.
Figure 3C:
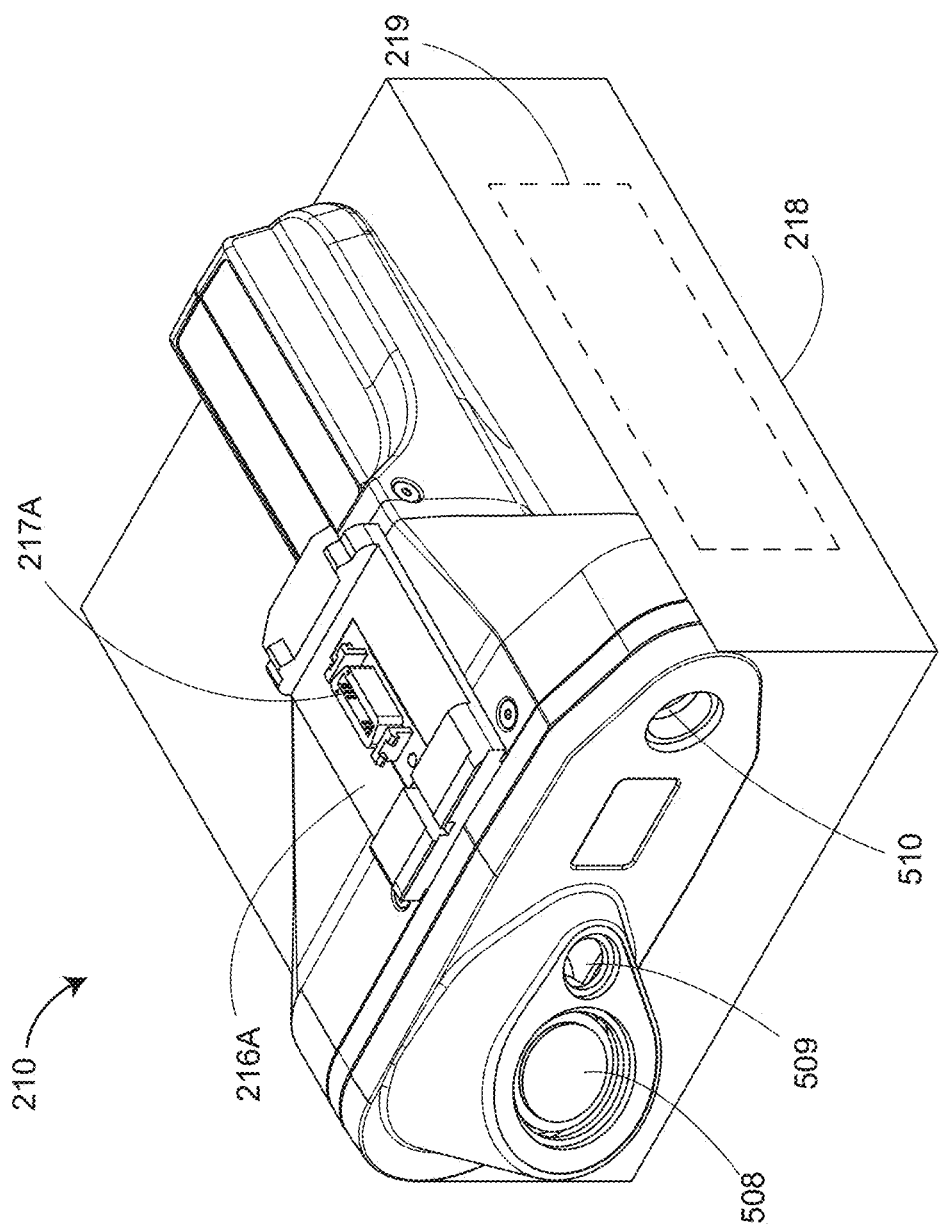
FIG. 3C is a close up view of the triangulation scanner according to an embodiment.

FIGS. 3A-3C show a portion of a mobile measurement system 200 having an end effector 205 that includes a triangulation scanner 210 attached to electronics box 207 through a connector 212. The end effector 205 is attached to wrist elements 180 of the robotic articulated arm 150. The triangulation scanner 210 includes a camera 508 and a projector 510. In an exemplary embodiment, the projector 510 uses a light source that generates a straight line projected onto an object surface or a pattern of light projected over an area. The light source may be a laser, a superluminescent diode (SLD), an incandescent light, a light emitting diode (LED), for example. The projected light may be visible or invisible, but visible light may be more convenient in some cases. The camera 508 includes a lens and an imaging sensor. The imaging sensor is a photosensitive array that may be a charge-coupled device (CCD) two-dimensional (2D) area sensor or a complementary metal-oxide-semiconductor (CMOS) 2D area sensor, for example, or it may be some other type of device. Each imaging sensor may comprise a 2D array (i.e., rows, columns) of a plurality of light sensing picture elements (pixels). Each pixel typically contains at least one photodetector that converts light into an electric charge stored within the pixel wells, and read out as a voltage value. Voltage values are converted into digital values by an analog-to-digital converter (ADC). Typically for a CMOS sensor chip, the ADC is contained within the sensor chip. Typically for a CCD sensor chip, the ADC is included outside the sensor chip on a circuit board.

The projector 510 and camera 508 are electrically coupled to an electrical circuit 219 disposed within the enclosure 218. The electrical circuit 219 may include one or more microprocessors, digital signal processors, memory, and other types of signal conditioning and/or storage circuits.

The marker light source 509 emits a beam of light that intersects the beam of light from the projector 510. The position at which the two beams intersect provides an indication to the user of the optimum distance from the scanner 500 to the object under test. In an embodiment, a camera on the end effector 205 is provided to assist in identifying the optimum distance from the object surface under investigation. In another embodiment, the system uses other information in its inspection procedure, as discussed further herein below, to move the triangulation scanner 510 to an optimum distance from the object surface.

Figure 4:
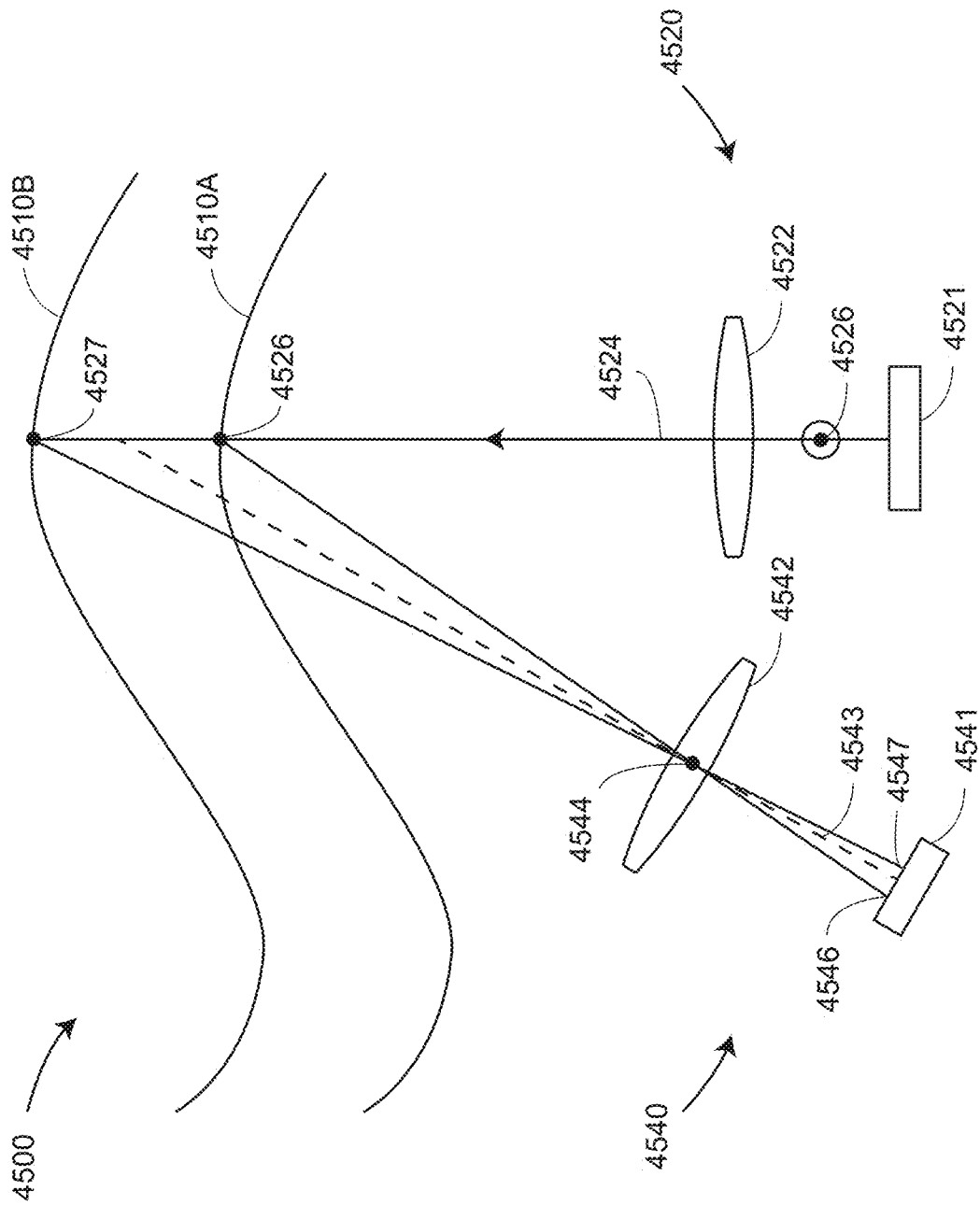
FIG. 4 is a schematic illustration of the principle of operation of a triangulation scanner that emits a line of light according to an embodiment.

FIG. 4 shows elements of a laser line probe (LLP) 4500 that includes a projector 4520 and a camera 4540. The projector 4520 includes a source pattern of light 4521 and a projector lens 4522. The source pattern of light includes an illuminated pattern in the form of a line. The projector lens includes a projector perspective center and a projector optical axis that passes through the projector perspective center. In the example of FIG. 4, a central ray of the beam of light 4524 is aligned with the projector optical axis. The camera 4540 includes a camera lens 4542 and a photosensitive array 4541. The lens has a camera optical axis 4543 that passes through a camera lens perspective center 4544. In the exemplary system 4500, the projector optical axis, which is aligned to the beam of light 4524 and the camera lens optical axis 4544, are perpendicular to the line of light 4523 projected by the source pattern of light 4521. In other words, the line 4523 is in the direction perpendicular to the paper in FIG. 4. The line strikes an object surface, which at a first distance from the projector is object surface 4510A and at a second distance from the projector is object surface 4510B. It is understood that at different heights above or below the plane of the paper of FIG. 4, the object surface may be at a different distance from the projector. The line of light intersects surface 4510A (in the plane of the paper) in a point 4526, and it intersects the surface 4510B (in the plane of the paper) in a point 4527. For the case of the intersection point 4526, a ray of light travels from the point 4526 through the camera lens perspective center 4544 to intersect the photosensitive array 4541 in an image point 4546. For the case of the intersection point 4527, a ray of light travels from the point 4527 through the camera lens perspective center to intersect the photosensitive array 4541 in an image point 4547. By noting the position of the intersection point relative to the position of the camera lens optical axis 4544, the distance from the projector (and camera) to the object surface can be determined using the principles of triangulation. The distance from the projector to other points on the line of light 4526, that is points on the line of light that do not lie in the plane of the paper of FIG. 4, may similarly be found.

In an embodiment, the photosensitive array 4541 is aligned to place either the array rows or columns in the direction of the reflected laser stripe. In this case, the position of a spot of light along one direction of the array provides information needed to determine a distance to the object, as indicated by the difference in the positions of the spots 4546 and 4547 of FIG. 4. The position of the spot of light in the orthogonal direction on the array provides information needed to determine where, along the length of the laser line, the plane of light intersects the object.

In this specification, it is understood that the terms column and row refer simply to a first direction along the photosensitive array and a second direction perpendicular to the first direction. As such, the terms row and column as used herein do not necessarily refer to row and columns according to documentation provided by a manufacturer of the photosensitive array 4541. In the discussion that follows, the rows are taken to be in the plane of the paper on the surface of the photosensitive array. The columns are taken to be on the surface of the photosensitive array and orthogonal to the rows. However, other arrangements are possible.

Figure 5A:
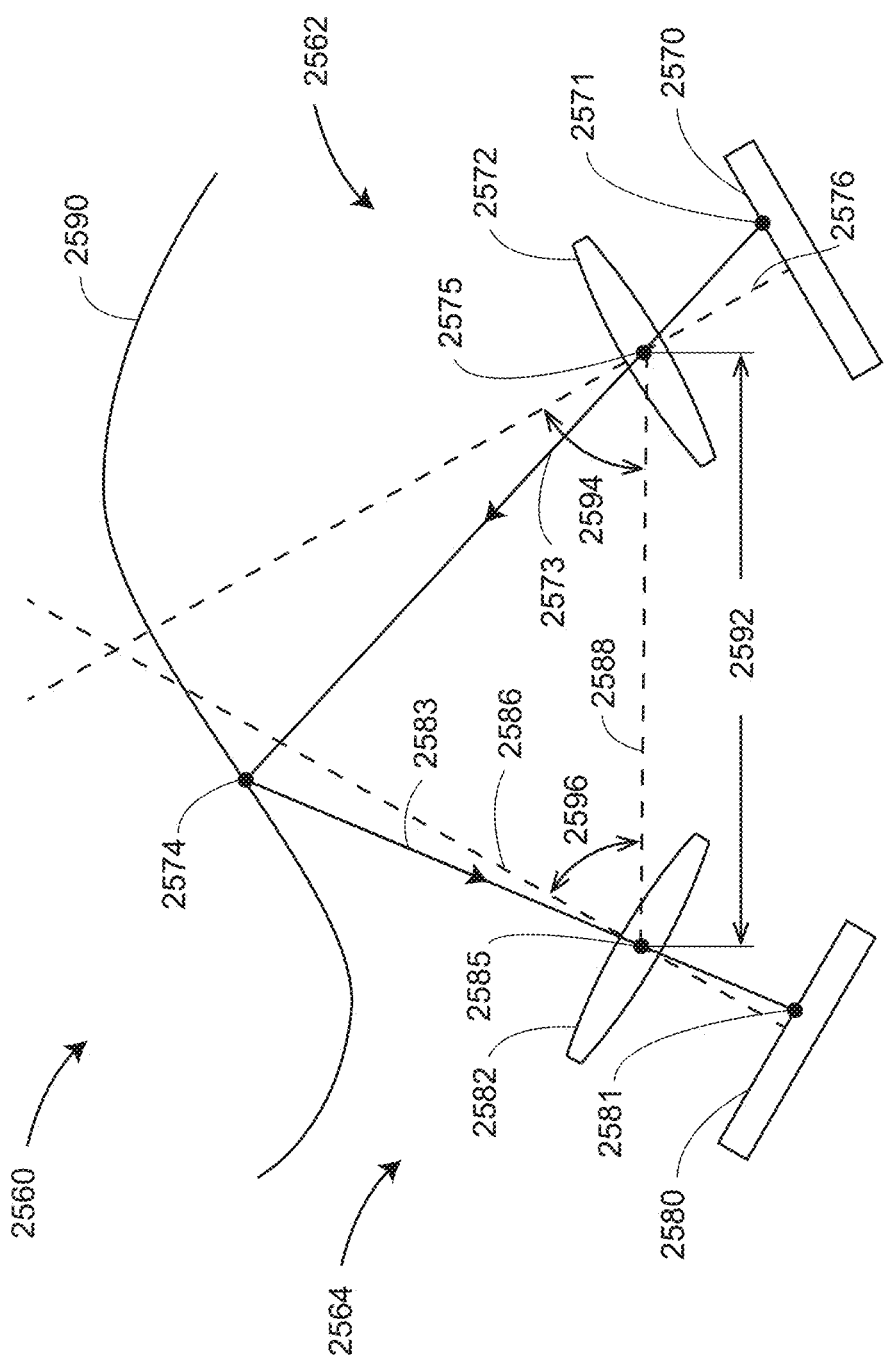
FIGS. 5A and 5B are schematic illustrations of the principle of operation for a structured light triangulation scanner according to two embodiments.

As explained herein above, light from a scanner may be projected in a line pattern to collect 3D coordinates over a line. Alternatively, light from a scanner may be projected to cover an area, thereby obtaining 3D coordinates over an area on an object surface. In an embodiment, the projector 510 in FIG. 3C is an area projector rather than a line projector. An explanation of triangulation principles for the case of area projection is now given with reference to the system 2560 of FIG. 5A and the system 4760 of FIG. 5B. Referring first to FIG. 5A, the system 2560 includes a projector 2562 and a camera 2564. The projector 2562 includes a source pattern of light 2570 lying on a source plane and a projector lens 2572. The projector lens may include several lens elements. The projector lens has a lens perspective center 2575 and a projector optical axis 2576. The ray of light 2573 travels from a point 2571 on the source pattern of light through the lens perspective center onto the object 2590, which it intercepts at a point 2574.

The camera 2564 includes a camera lens 2582 and a photosensitive array 2580. The camera lens 2582 has a lens perspective center 2585 and an optical axis 2586. A ray of light 2583 travels from the object point 2574 through the camera perspective center 2585 and intercepts the photosensitive array 2580 at point 2581.

Figure 5B:
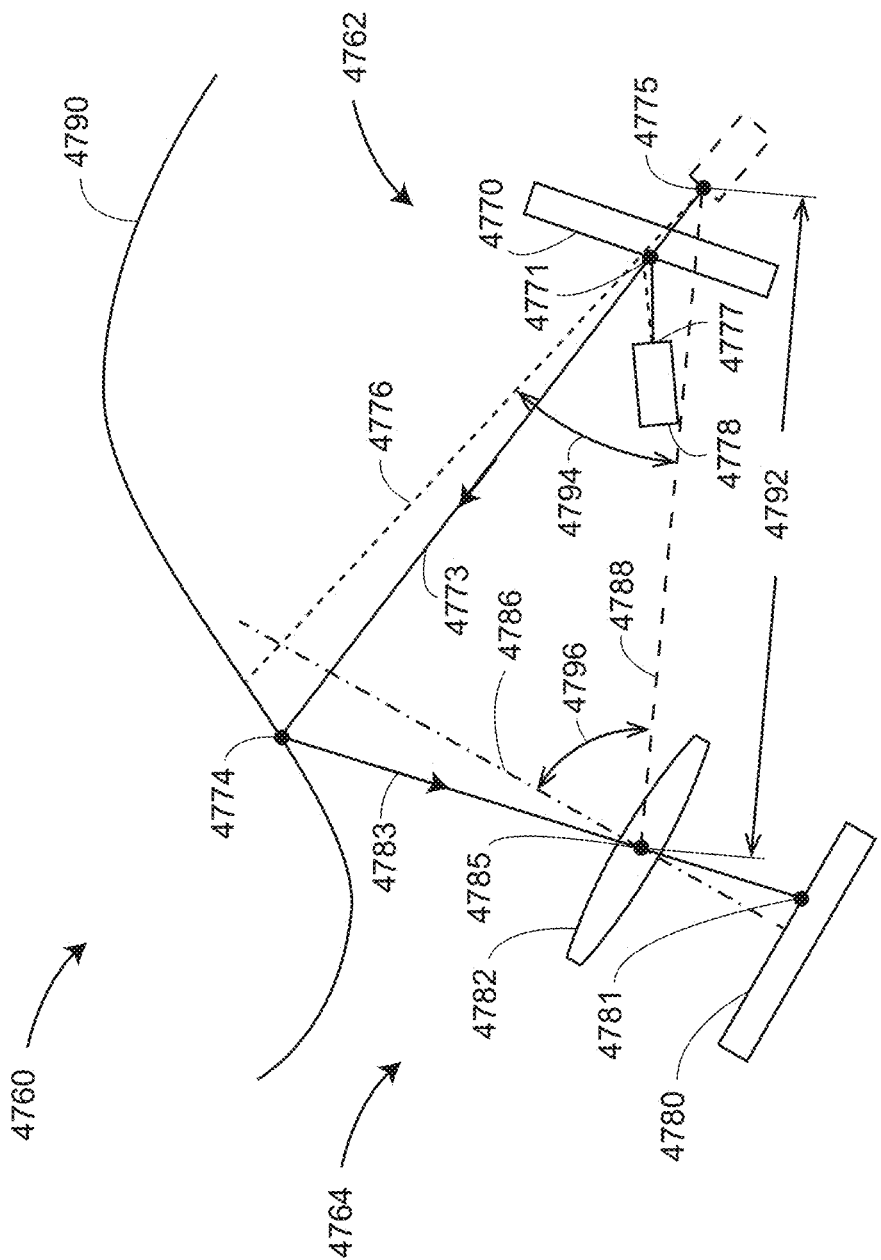

The line segment that connects the perspective centers is the baseline 2588 in FIG. 5A and the baseline 4788 in FIG. 5B. The length of the baseline is called the baseline length (2592, 4792). The angle between the projector optical axis and the baseline is the baseline projector angle (2594, 4794). The angle between the camera optical axis (2583, 4786) and the baseline is the baseline camera angle (2596, 4796). If a point on the source pattern of light (2570, 4771) is known to correspond to a point on the photosensitive array (2581, 4781), then it is possible using the baseline length, baseline projector angle, and baseline camera angle to determine the sides of the triangle connecting the points 2585, 2574, and 2575, and hence determine the surface coordinates of points on the surface of object 2590 relative to the frame of reference of the measurement system 2560. To do this, the angles of the sides of the small triangle between the projector lens 2572 and the source pattern of light 2570 are found using the known distance between the lens 2572 and plane 2570 and the distance between the point 2571 and the intersection of the optical axis 2576 with the plane 2570. These small angles are added or subtracted from the larger angles 2596 and 2594 as appropriate to obtain the desired angles of the triangle. It will be clear to one of ordinary skill in the art that equivalent mathematical methods can be used to find the lengths of the sides of the triangle 2574-2585-2575 or that other related triangles may be used to obtain the desired coordinates of the surface of object 2590.

Referring first to FIG. 5B, the system 4760 is similar to the system 2560 of FIG. 5A except that the system 4760 does not include a lens. The system may include a projector 4762 and a camera 4764. In the embodiment illustrated in FIG. 5B, the projector includes a light source 4778 and a light modulator 4770. The light source 4778 may be a laser light source since such a light source may remain in focus for a long distance using the geometry of FIG. 5B. A ray of light 4773 from the light source 4778 strikes the optical modulator 4770 at a point 4771. Other rays of light from the light source 4778 strike the optical modulator at other positions on the modulator surface. In an embodiment, the optical modulator 4770 changes the power of the emitted light, in most cases by decreasing the optical power to a degree. In this way, the optical modulator imparts an optical pattern to the light, referred to here as the source pattern of light, which is at the surface of the optical modulator 4770. The optical modulator 4770 may be a DLP or LCOS device for example. In some embodiments, the modulator 4770 is transmissive rather than reflective. The light emerging from the optical modulator 4770 appears to emerge from a virtual light perspective center 4775. The ray of light appears to emerge from the virtual light perspective center 4775, pass through the point 4771, and travel to the point 4774 at the surface of object 4790.

The baseline is the line segment extending from the camera lens perspective center 4785 to the virtual light perspective center 4775. In general, the method of triangulation involves finding the lengths of the sides of a triangle, for example, the triangle having the vertex points 4774, 4785, and 4775. A way to do this is to find the length of the baseline, the angle between the baseline and the camera optical axis 4786, and the angle between the baseline and the projector reference axis 4776. To find the desired angle, additional smaller angles are found. For example, the small angle between the camera optical axis 4786 and the ray 4783 can be found by solving for the angle of the small triangle between the camera lens 4782 and the photosensitive array 4780 based on the distance from the lens to the photosensitive array and the distance of the pixel from the camera optical axis. The angle of the small triangle is then added to the angle between the baseline and the camera optical axis to find the desired angle. Similarly for the projector, the angle between the projector reference axis 4776 and the ray 4773 is found can be found by solving for the angle of the small triangle between these two lines based on the known distance of the light source 4777 and the surface of the optical modulation and the distance of the projector pixel at 4771 from the intersection of the reference axis 4776 with the surface of the optical modulator 4770. This angle is subtracted from the angle between the baseline and the projector reference axis to get the desired angle.

The camera 4764 includes a camera lens 4782 and a photosensitive array 4780. The camera lens 4782 has a camera lens perspective center 4785 and a camera optical axis 4786. The camera optical axis is an example of a camera reference axis. From a mathematical point of view, any axis that passes through the camera lens perspective center may equally easily be used in the triangulation calculations, but the camera optical axis, which is an axis of symmetry for the lens, is customarily selected. A ray of light 4783 travels from the object point 4774 through the camera perspective center 4785 and intercepts the photosensitive array 4780 at point 4781. Other equivalent mathematical methods may be used to solve for the lengths of the sides of a triangle 4774-4785-4775, as will be clear to one of ordinary skill in the art.

Although the triangulation method described here is well known, some additional technical information is given herein below for completeness. Each lens system has an entrance pupil and an exit pupil. The entrance pupil is the point from which the light appears to emerge, when considered from the point of view of first-order optics. The exit pupil is the point from which light appears to emerge in traveling from the lens system to the photosensitive array. For a multi-element lens system, the entrance pupil and exit pupil do not necessarily coincide, and the angles of rays with respect to the entrance pupil and exit pupil are not necessarily the same. However, the model can be simplified by considering the perspective center to be the entrance pupil of the lens and then adjusting the distance from the lens to the source or image plane so that rays continue to travel along straight lines to intercept the source or image plane. In this way, the simple and widely used model shown in FIG. 5A is obtained. It should be understood that this description provides a good first order approximation of the behavior of the light but that additional fine corrections can be made to account for lens aberrations that can cause the rays to be slightly displaced relative to positions calculated using the model of FIG. 5A. Although the baseline length, the baseline projector angle, and the baseline camera angle are generally used, it should be understood that saying that these quantities are required does not exclude the possibility that other similar but slightly different formulations may be applied without loss of generality in the description given herein.

In some cases, a scanner system may include two cameras in addition to a projector. In other cases, a triangulation system may be constructed using two cameras alone, wherein the cameras are configured to image points of light on an object or in an environment. For the case in which two cameras are used, whether with or without a projector, a triangulation may be performed between the camera images using a baseline between the two cameras. In this case, the triangulation may be understood with reference to FIG. 5A, with the projector 2562 replaced by a camera.

In some cases, different types of scan patterns may be advantageously combined to obtain better performance in less time. For example, in an embodiment, a fast measurement method uses a two-dimensional coded pattern in which three-dimensional coordinate data may be obtained in a single shot. In a method using coded patterns, different characters, different shapes, different thicknesses or sizes, or different colors, for example, may be used to provide distinctive elements, also known as coded elements or coded features. Such features may be used to enable the matching of the point 2571 to the point 2581. A coded feature on the source pattern of light 2570 may be identified on the photosensitive array 2580.

An advantage of using coded patterns is that three-dimensional coordinates for object surface points can be quickly obtained. However, in most cases, a sequential structured light approach, such as the sinusoidal phase-shift approach discussed above, will give more accurate results. Therefore, the user may advantageously choose to measure certain objects or certain object areas or features using different projection methods according to the accuracy desired. By using a programmable source pattern of light, such a selection may easily be made.

A line emitted by a laser line scanner intersects an object in a linear projection. The illuminated shape traced on the object is two dimensional. In contrast, a projector that projects a two-dimensional pattern of light creates an illuminated shape on the object that is three dimensional. One way to make the distinction between the laser line scanner and the structured light scanner is to define the structured light scanner as a type of scanner that contains at least three non-collinear pattern elements. For the case of a two-dimensional coded pattern of light, the three non-collinear pattern elements are recognizable because of their codes, and since they are projected in two dimensions, the at least three pattern elements must be non-collinear. For the case of the periodic pattern, such as the sinusoidally repeating pattern, each sinusoidal period represents a plurality of pattern elements. Since there is a multiplicity of periodic patterns in two dimensions, the pattern elements must be non-collinear. In contrast, for the case of the laser line scanner that emits a line of light, all of the pattern elements lie on a straight line. Although the line has width, and the tail of the line cross section may have less optical power than the peak of the signal, these aspects of the line are not evaluated separately in finding surface coordinates of an object and therefore do not represent separate pattern elements. Although the line may contain multiple pattern elements, these pattern elements are collinear.

It should be noted that although the descriptions given above distinguish between line scanners and area (structured light) scanners based on whether three or more pattern elements are collinear, it should be noted that the intent of this criterion is to distinguish patterns projected as areas and as lines. Consequently patterns projected in a linear fashion having information only along a single path are still line patterns even though the one-dimensional pattern may be curved.

Figure 6A:
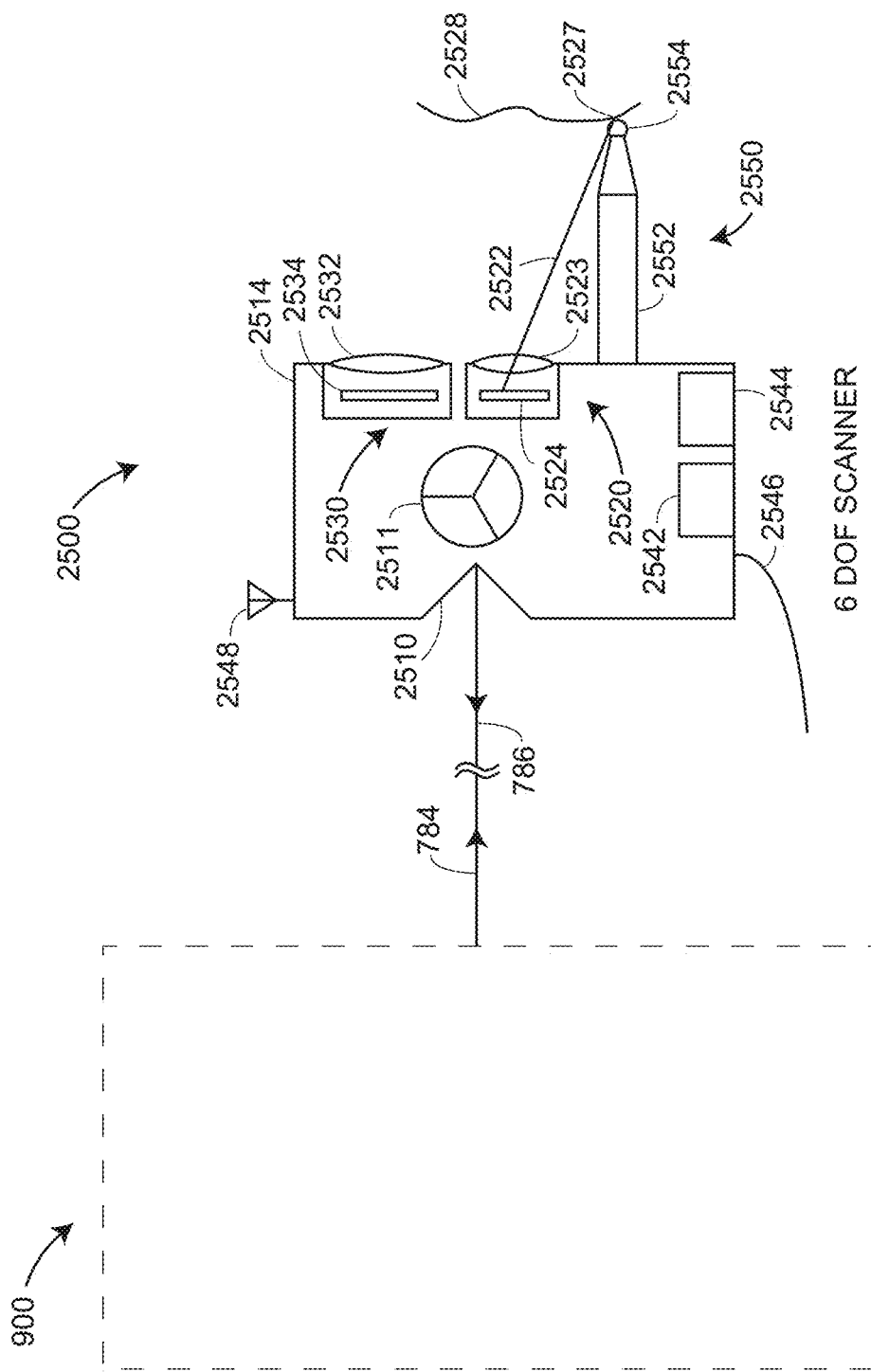
FIG. 6A is a schematic representation of elements of a six-DOF scanner and tactile probe according to an embodiment.

It is also known to use scanner 2500, which might be a line scanner or area scanner, with a six-DOF (degree-of-freedom) laser tracker 900 as shown in FIG. 6A. The scanner 2505 includes a projector 2520 that in an embodiment projects a two dimensional pattern of light (structured light). Such light emerges from the projector lens perspective center and travels in an expanding pattern outward until it intersects the object 2528. Examples of this type of pattern are the coded pattern and the periodic pattern, as explained herein above. The projector 2520 may alternatively project a one-dimensional pattern of light, thereby behaving as an LLP or line scanner.

Figure 6B:
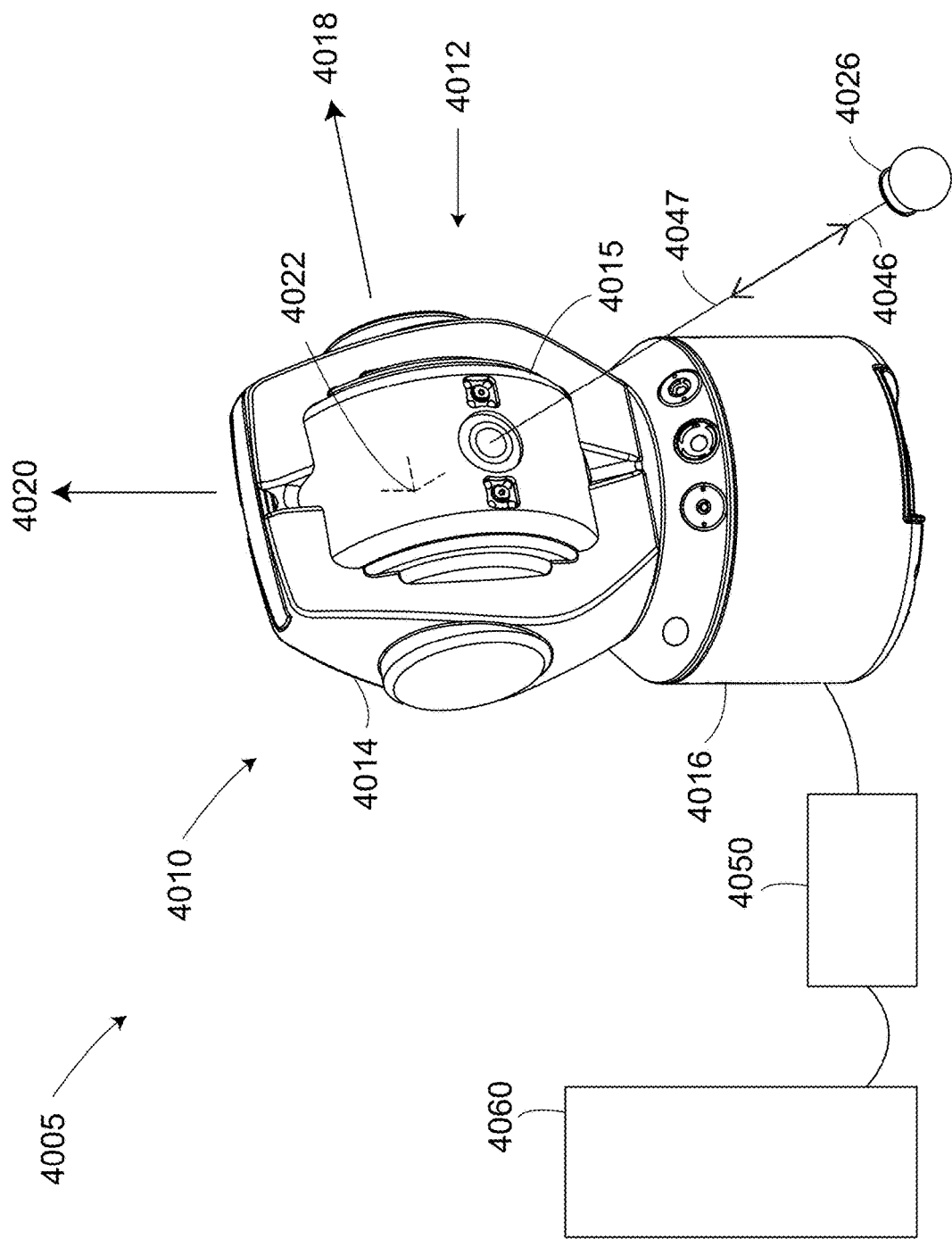
FIG. 6B is an isometric view of a laser tracker according to an embodiment.

An exemplary laser tracker system 4005 illustrated in FIG. 6B includes a laser tracker 4010, a retroreflector target 4026, an optional auxiliary unit processor 4050, and an optional auxiliary computer 4060. An exemplary gimbaled beam-steering mechanism 4012 of laser tracker 4010 comprises a zenith carriage 4014 mounted on an azimuth base 4016 and rotated about an azimuth axis 4020. A payload 4015 is mounted on the zenith carriage 4014 and rotated about a zenith axis 4018. Zenith axis 4018 and azimuth axis 4020 intersect orthogonally, internally to tracker 4010, at gimbal point 4022, which is typically the origin for distance measurements. A laser beam 4046 virtually passes through the gimbal point 4022 and is pointed orthogonal to zenith axis 4018. In other words, laser beam 4046 lies in a plane approximately perpendicular to the zenith axis 4018 and that passes through the azimuth axis 4020. Outgoing laser beam 4046 is pointed in the desired direction by rotation of payload 4015 about zenith axis 4018 and by rotation of zenith carriage 4014 about azimuth axis 4020. A zenith angular encoder, internal to the tracker, is attached to a zenith mechanical axis aligned to the zenith axis 4018. An azimuth angular encoder, internal to the tracker, is attached to an azimuth mechanical axis aligned to the azimuth axis 4020. The zenith and azimuth angular encoders measure the zenith and azimuth angles of rotation to relatively high accuracy. Outgoing laser beam 4046 travels to the retroreflector target 4026, which might be, for example, a spherically mounted retroreflector (SMR) as described above. By measuring the radial distance between gimbal point 4022 and retroreflector 4026, the rotation angle about the zenith axis 4018, and the rotation angle about the azimuth axis 4020, the position of retroreflector 4026 is found within the spherical coordinate system of the tracker.

Outgoing laser beam 4046 may include one or more laser wavelengths, as described hereinafter. For the sake of clarity and simplicity, a steering mechanism of the sort shown in FIG. 6B is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Several laser trackers are available or have been proposed for measuring six, rather than the ordinary three, degrees of freedom. Exemplary six degree-of-freedom (six-DOF) systems are described by U.S. Pat. No. 7,800,758 ('758) to Bridges et al., U.S. Pat. No. 8,525,983 ('983) to Bridges et al., U.S. Pat. No. 6,166,809 ('809) to Pettersen et al., and U.S. Patent Application No. 2010/0149525 ('525) to Lau, the contents all of which are incorporated by reference. Six-DOF systems provide measurements of three orientational degrees-of-freedom as well as three positional degrees-of-freedom (i.e., x, y, z).

FIG. 6A shows an embodiment of a six-DOF scanner 2500 used in conjunction with a six-DOF laser tracker 900. The six-DOF laser tracker 900 sends a beam of light 784 to a retroreflector 2510, 2511 on the six-DOF scanner 2500. The six-DOF tracker 900 measures the distance from the tracker 900 to scanner 2500 with a distance meter (not shown) in the tracker, and it measures two angles from the tracker 900 to the six-DOF scanner 2500 using two angle transducers such as angular encoders (not shown). The six-DOF scanner 2500 includes a body 2514, one or more retroreflectors 2510, 2511 a scanner camera 2530, a scanner light projector 2520, an optional electrical cable 2546, an optional battery 2444, an antenna 2548, and electronics circuit board 2542. The antenna 2548 if present provides wireless communication between the six-DOF scanner 2500 and other computing devices such as the laser tracker 900 and external computers. The scanner projector 2520 and the scanner camera 2530 together are used to measure the three dimensional coordinates of a workpiece 2528. The camera 2530 includes a camera lens system 2532 and a photosensitive array 2534. The photosensitive array 2534 may be a CCD or CMOS array, for example. The scanner projector 2520 includes a projector lens system 2523 and a source pattern of light 2524. The source pattern of light may emit a point of light, a line of light, or a structured (two dimensional) pattern of light. If the scanner light source emits a point of light, the point may be scanned, for example, with a moving mirror, to produce a line or an array of lines. If the scanner light source emits a line of light, the line may be scanned, for example, with a moving mirror, to produce an array of lines. In an embodiment, the source pattern of light might be an LED, laser, or other light source reflected off a digital micromirror device (DMD) such as a digital light projector (DLP) from Texas Instruments, an liquid crystal device (LCD) or liquid crystal on silicon (LCOS) device, or it may be a similar device used in transmission mode rather than reflection mode. The source pattern of light might also be a slide pattern, for example, a chrome-on-glass slide, which might have a single pattern or multiple patterns, the slides moved in and out of position as needed. Additional retroreflectors, such as retroreflector 2511, may be added to the first retroreflector 2510 to enable the laser tracker to track the six-DOF scanner from a variety of directions, thereby giving greater flexibility in the directions to which light may be projected by the six-DOF projector 2500.

The three dimensional coordinates of the workpiece 2528 is measured by the scanner camera 2530 by using the principles of triangulation. There are several ways that the triangulation measurement may be implemented, depending on the pattern of light emitted by the scanner light source 2520 and the type of photosensitive array 2534. For example, if the pattern of light emitted by the scanner light source 2520 is a line of light or a point of light scanned into the shape of a line and if the photosensitive array 2534 is a two dimensional array, then one dimension of the two dimensional array 2534 corresponds to a direction of a point 2526 on the surface of the workpiece 2528. The other dimension of the two dimensional array 2534 corresponds to the distance of the point 2526 from the scanner light source 2520. Hence the three dimensional coordinates of each point 2526 along the line of light emitted by scanner light source 2520 is known relative to the local frame of reference of the six-DOF scanner 2500. The six degrees of freedom of the six-DOF scanner are known by the six-DOF laser tracker using the methods described in patent '758. From the six degrees of freedom, the three dimensional coordinates of the scanned line of light may be found in the tracker frame of reference, which in turn may be converted into the frame of reference of the workpiece 2528 through the measurement by the laser tracker of three points on the workpiece, for example.

If the six-DOF scanner 2500 is moved by the end effector 205 of the mobile measurement platform 200, a line of laser light emitted by the scanner light source 2520 may be moved in such a way as to "paint" the surface of the workpiece 2528, thereby obtaining the three dimensional coordinates for the entire surface. It is also possible to "paint" the surface of a workpiece using a scanner light source 2520 that emits a structured pattern of light. Alternatively, when using a scanner 2500 that emits a structured pattern of light, more accurate measurements may be made by mounting the six-DOF scanner on a tripod or instrument stand. The structured light pattern emitted by the scanner light source 2520 might, for example, include a pattern of fringes, each fringe having an irradiance that varies sinusoidally over the surface of the workpiece 2528. In an embodiment, the sinusoids are shifted by three or more phase values. The amplitude level recorded by each pixel of the camera 2530 for each of the three or more phase values is used to provide the position of each pixel on the sinusoid. This information is used to help determine the three dimensional coordinates of each point 2526. In another embodiment, the structured light may be in the form of a coded pattern that may be evaluated to determine three-dimensional coordinates based on single, rather than multiple, image frames collected by the camera 2530. Use of a coded pattern may enable relatively accurate measurements while the six-DOF scanner 2500 is moved by hand at a reasonable speed.

In some cases, it is advantageous to measure the features such as edges or holes using an optional tactile probe 2550 attached to the six-DOF scanner 2500. The tactile probe 2550 in FIG. 6A includes such as a probe tip 2554, which is part of a probe extension assembly 2550. In an embodiment, the projector 2520 sends a laser beam to illuminate the region to be measured.

As explained herein above, the laser tracker 900 measures a distance and two angles to determine three positional degrees-of-freedom (x, y, z) of the six-DOF scanner 2500. There are many possible methods of determining the three orientational degrees-of-freedom of the six-DOF scanner 2500. These methods are described in more detail herein below.

Figure 7A:
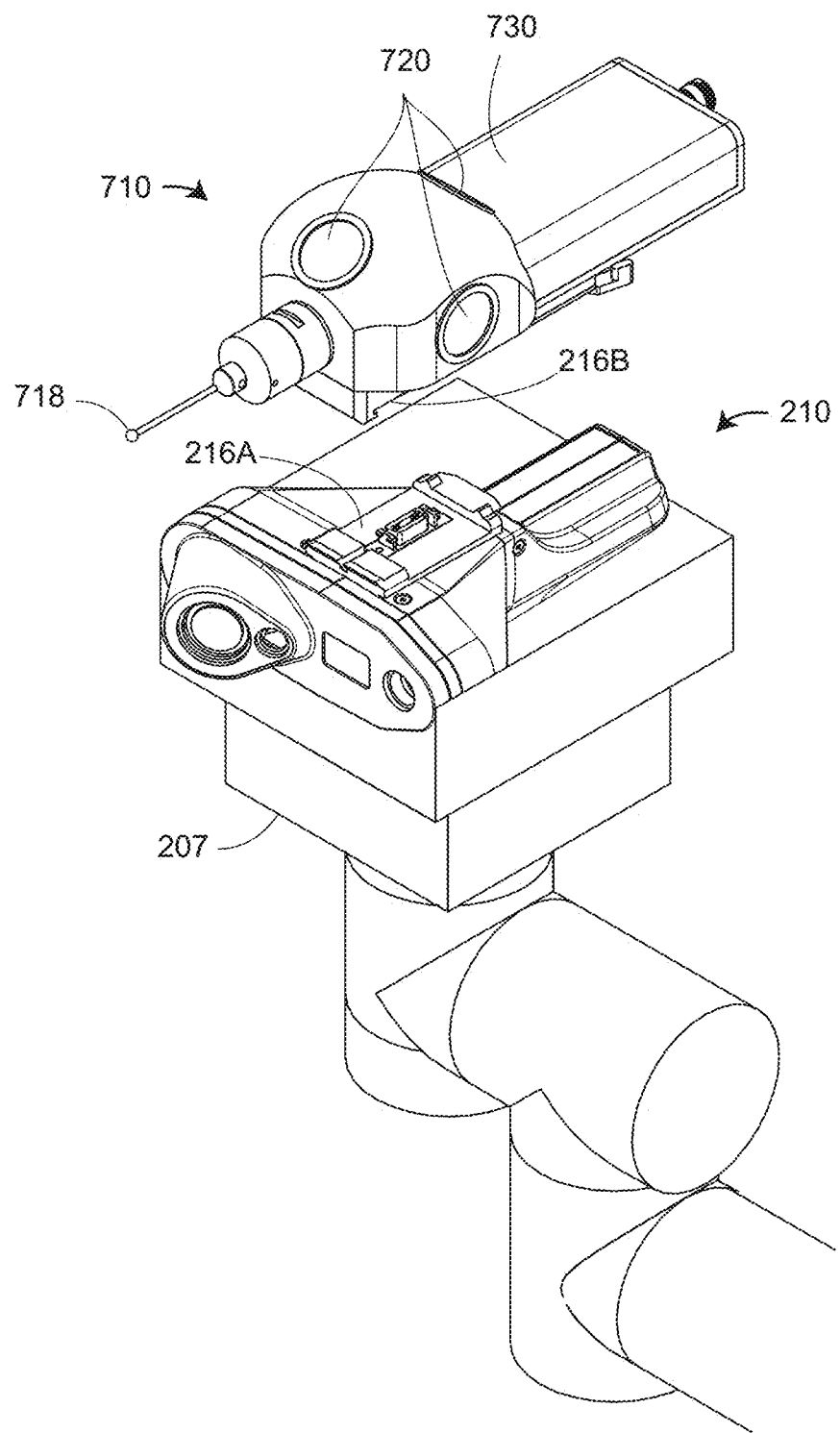
FIG. 7A is an isometric exploded view of a triangulation scanner and six-DOF tracker target assembly on a robotic articulated arm according to an embodiment.
Figure 7B:
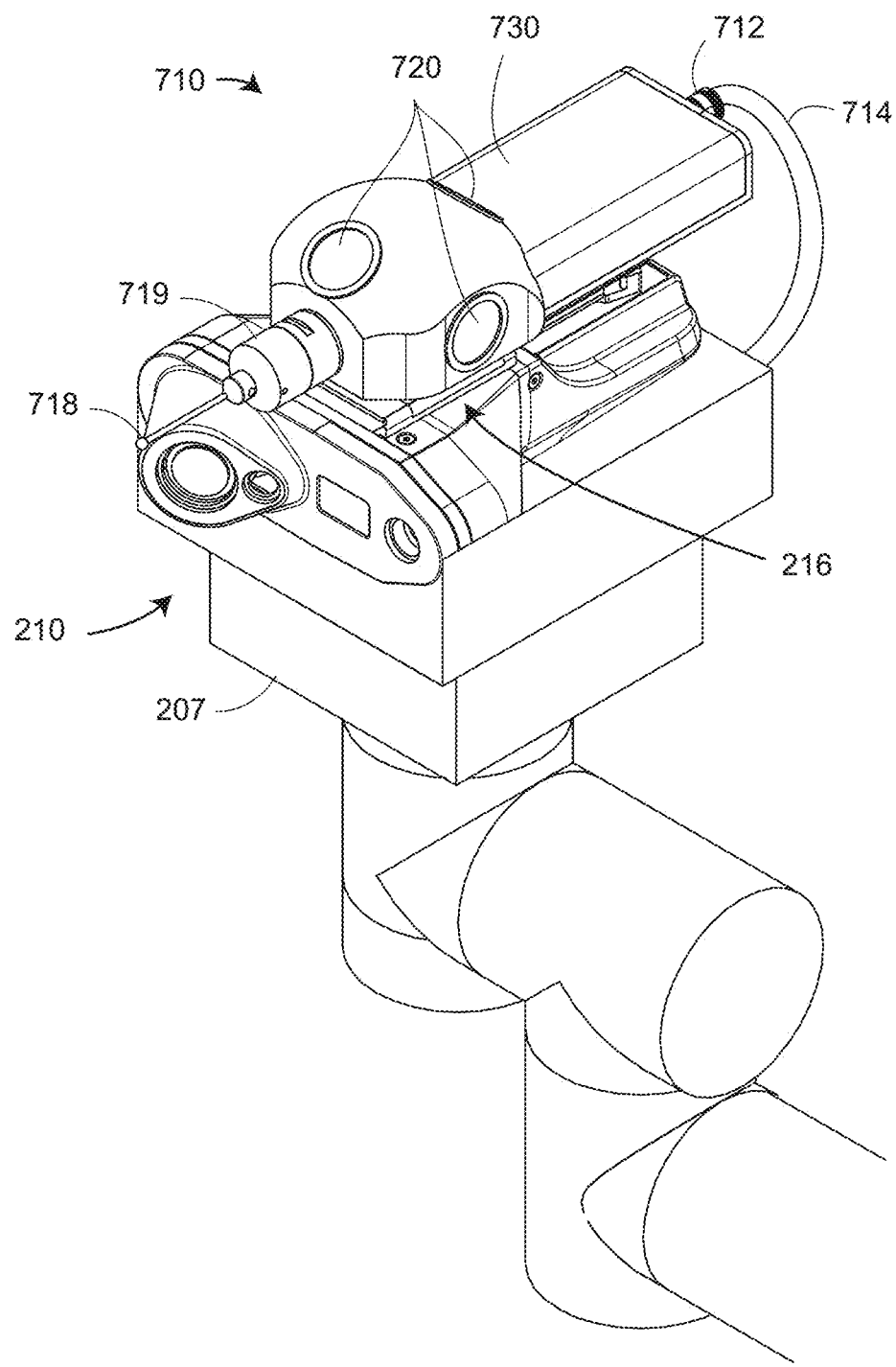
FIG. 7B is an isometric view of a triangulation scanner and a six-DOF tracker target assembly according to an embodiment.

FIGS. 7A and 7B are isometric exploded and isometric views, respectively, of a detachable six-DOF tracker target assembly 710 coupled to a triangulation scanner 210. FIG. 7A is an isometric view of the detachable six-DOF tracker target assembly 710 configured for coupling to the triangulation scanner 210. Coupling is made through the mechanical and electrical interface 216. The electrical interface 216 includes two parts, a first part 216A, which in this case is an upper scanner connector 216A, and a second part 216B, which in this case is a lower six-DOF tracker assembly connector 216B. The first part and the second part couple together to hold the scanner 210 in fixed position and orientation relative to the six-DOF tracker target assembly 710.

The six-DOF tracker target assembly 710 cooperates with a laser tracker 4010 to determine six degrees of freedom of the assembly 710. The six degrees of freedom include three translational degrees of freedom (e.g., x, y, z), which the tracker determines as explained herein above with reference to FIG. 6B. The tracker also determines three orientational degrees of freedom (e.g., pitch, roll, and yaw angles) through cooperative action with the six-DOF tracker target assembly 710. Such a six-DOF tracker target assembly may be any of a variety of types, for example, as described in the patents '758, '983, '809, and patent application '525, all which are incorporated by reference herein above. By measuring the six degrees of freedom of the connected six-DOF accessory 710 and scanner 210, the tracker can track the position and orientation of the scanner 210 relative to the object, thereby enabling relatively simple and accurate registration of multiple line scans or area scans. In an embodiment, a probe tip 718 is attached to a probe coupler 719. The tracker determines the 3D coordinates of the probe tip 718 based on the measured six degrees of freedom.

In an embodiment, the laser tracker 4010 cooperates with the six-DOF tracker target assembly 710 and a processor to determine the six degrees of freedom of the six-DOF tracker target assembly 710. In an embodiment, the laser tracker 4010 sends a beam of light to the six-DOF target 710, which may include a retroreflector target that in an embodiment is a cube-corner retroreflector. A collection of multiple six-DOF retroreflector targets 720 may be provided to permit convenient viewing of the six-DOF targets from a wide range of angles. A first portion of the light returning from the retroreflector travels to a distance meter in the laser tracker 4010 to determine a distance from the tracker to the retroreflector and a second portion of the light travels to a tracker position detector that generates an electrical position signal indicating the position of the beam of light on the retroreflector. In one mode of operation, the position detector provides the electrical signal to a control system that includes motors to steer the beam of light to keep it centered on the retroreflector, thereby enabling tracking of the retroreflector as it is moved. In addition, as explained herein above, the tracker uses angular transducers such as angular encoders to provide two angles that specify the direction of the laser beam. With these two angles and the distance provided by the distance meter, the three translational degrees of freedom are obtained for the six-DOF tracker target assembly 710. Signals from the six-DOF targets may be sent to an electrical unit 730 for processing and synchronization of data. In an embodiment, electrical signals are sent to or from the electrical processing unit 730 to electronics box 207 through connector 712 and cable 714.

As explained herein above, many methods are possible for determining the three orientational degrees of freedom, for example, as taught in the patents '758, '983, '809, and patent application '525. These disclose methods that include (1) measuring the position of multiple light sources on a tracker six-DOF target with a camera on the laser tracker to determine the three orientational degrees of freedom; (2) measuring lines marked on a cube-corner retroreflector to determine the three orientational degrees of freedom; and (3) measuring light passing through an opening in a cube-corner retroreflector to determine pitch and yaw angles and measuring angle of inclination to determine roll angle. Many other methods of measuring three orientational degrees of freedom are possible, and any method of measuring three orientational degrees of freedom may be used with the six-DOF tracker target assembly 710.

A preliminary step in the methods described below is to obtain a common frame of reference for the scanner 210 and six-DOF tracker target assembly 710. Such a preliminary step may be carried out at the manufacturer's factory or by the operator by performing procedures prescribed by the manufacturer. The common frame of reference can be obtained, for example, by viewing common features with the scanner 210 and camera assembly 710, and then performing a least-squares optimization procedure to match the observed features. Such methods are well known in the art and are not discussed further.

In an embodiment, the six-DOF tracker target assembly 710 further includes a tactile probe 718, which connects to the collection of six-DOF targets 720 through an interface unit 719. The interface unit may provide convenient attaching and detaching of different tactile probes 718. It may also provide electrical functionality needed to special types of probes such as a "touch probe" that takes a measurement as soon as the probe touches an object.

Figure 7C:
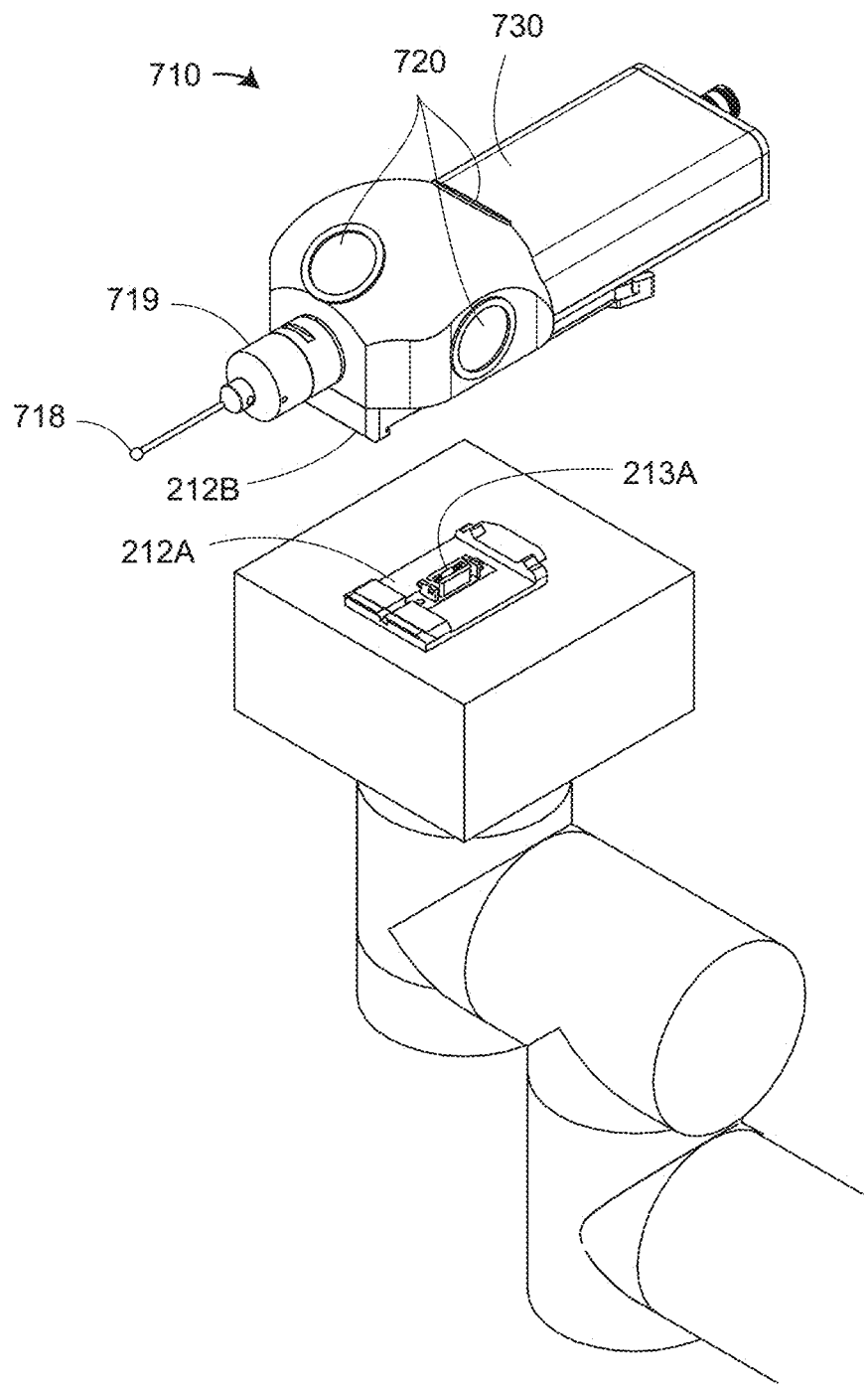
FIG. 7C is an isometric exploded view of an electronics box on an end effector and a six-DOF tracker target assembly according to an embodiment.
Figure 7D:
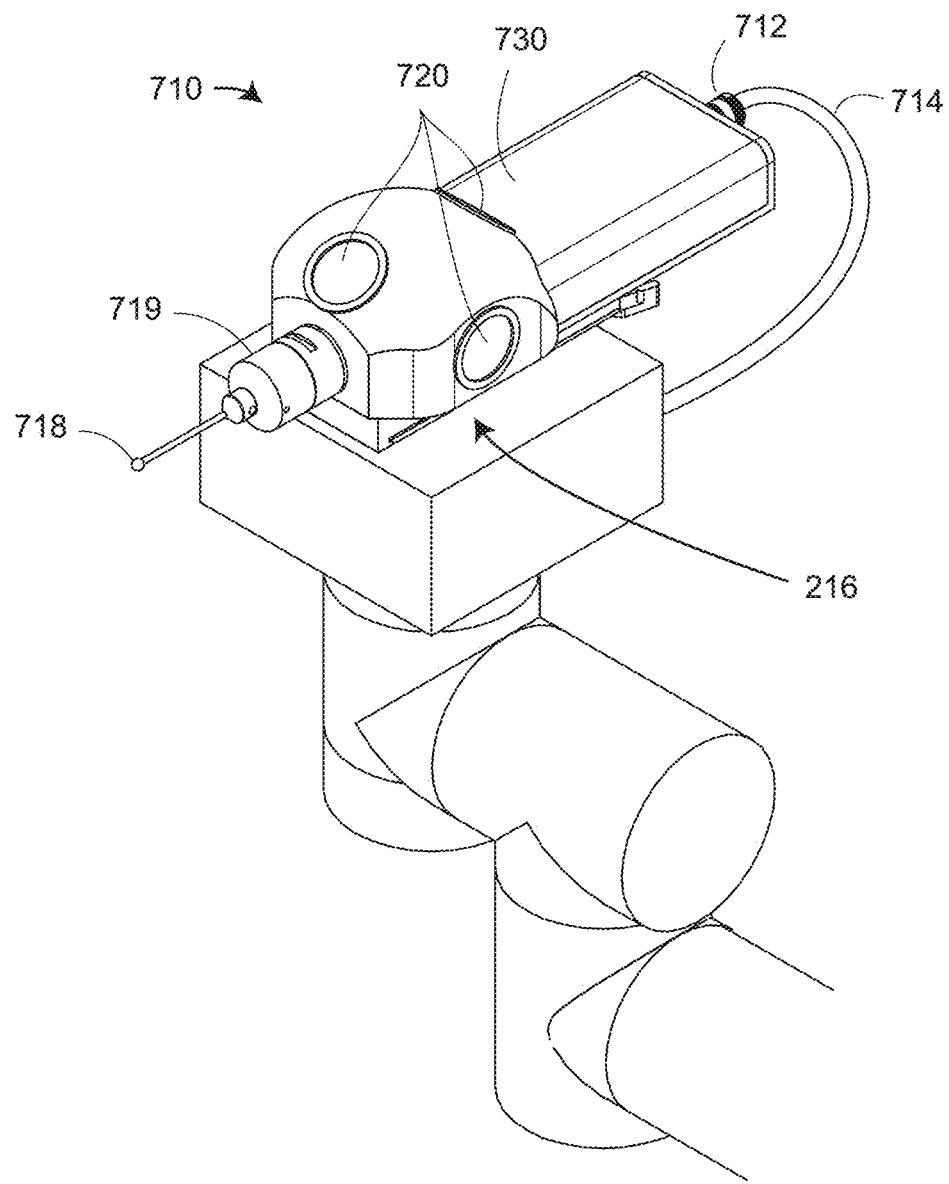
FIG. 7D is an isometric view of an electronics box on an end effector and a six-DOF tracker target assembly according to an embodiment.

In an embodiment, the triangulation scanner 210 is removed and the six-DOF tracker target assembly 710 attached directly to the electronics box 207 or directly to a mechanical coupler on the final joint of the robotic articulated arm 150. This arrangement is illustrated in FIGS. 7C and 7D.

Figure 8A:
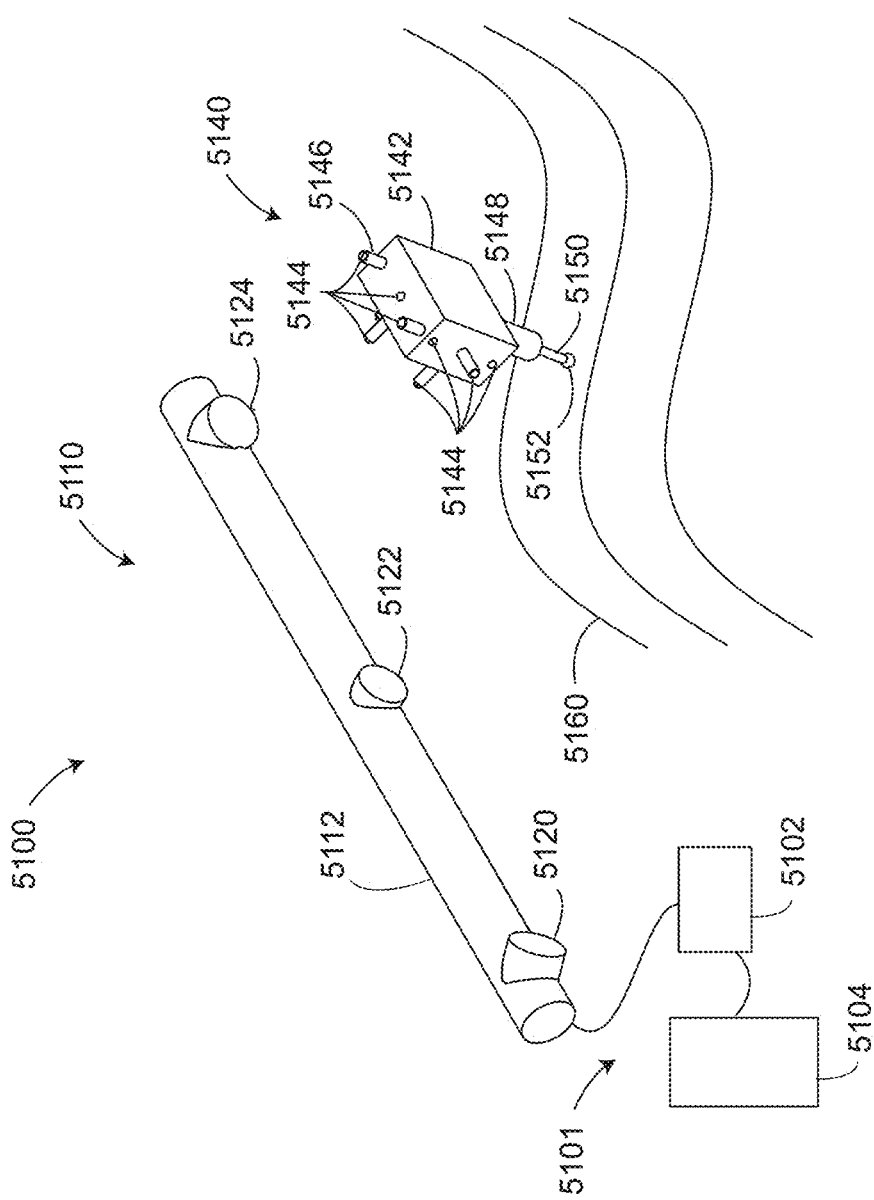
FIG. 8A shows a camera bar used to measure a tactile probe having targets viewable by the camera bar according to an embodiment.

FIG. 8A is a perspective view of a three-dimensional tactile probing system 5100 that includes a camera bar 5110 and a probe assembly 5140. The camera bar includes a mounting structure 5112 and at least two triangulation cameras 5120, 5124. It may also include an optional camera 5122. The cameras each include a lens and a photosensitive array, for example, as shown in the lens 2564 of FIG. 5A. The optional camera 5122 may be similar to the cameras 5120, 5124 or it may be a color camera. The probe assembly 5140 includes a housing 5142, a collection of lights 5144, optional pedestals 5146, shaft 5148, stylus 5150, and probe tip 5152. The position of the lights 5144 are known relative to the probe tip 5152. The lights may be light sources such as light emitting diodes or they might be reflective spots that may be illuminated by an external source of light. Factory or on-site compensation procedures may be used to find these positions. The shaft may be used to provide a handle for the operator, or an alternative handle may be provided.

Triangulation of the image data collected by the cameras 5120, 5124 of the camera bar 5110 are used to find the three-dimensional coordinates of each point of light 5144 within the frame of reference of the camera bar. Throughout this document, and in the claims, the term "frame of reference" is taken to be synonymous with the term "coordinate system." Mathematical calculations, which are well known in the art, are used to find the position of the probe tip within the frame of reference of the camera bar. By bringing the probe tip 5152 into contact with an object 5160, surface points on the object can be measured.

An electrical system 5101 may include an electrical circuit board 5102 and an external computer 5104. The external computer 5104 may comprise a network of computers. The electrical system 5101 may include wired and wireless portions, either internal or external to the components of FIG. 8A that carry out the measurements and calculations required to obtain three-dimensional coordinates of points on the surface. In general, the electrical system 5101 will include one or more processors, which may be computers, microprocessors, field programmable gate arrays (FPGAs), or digital signal processing (DSP) units, for example.

Figure 8B:
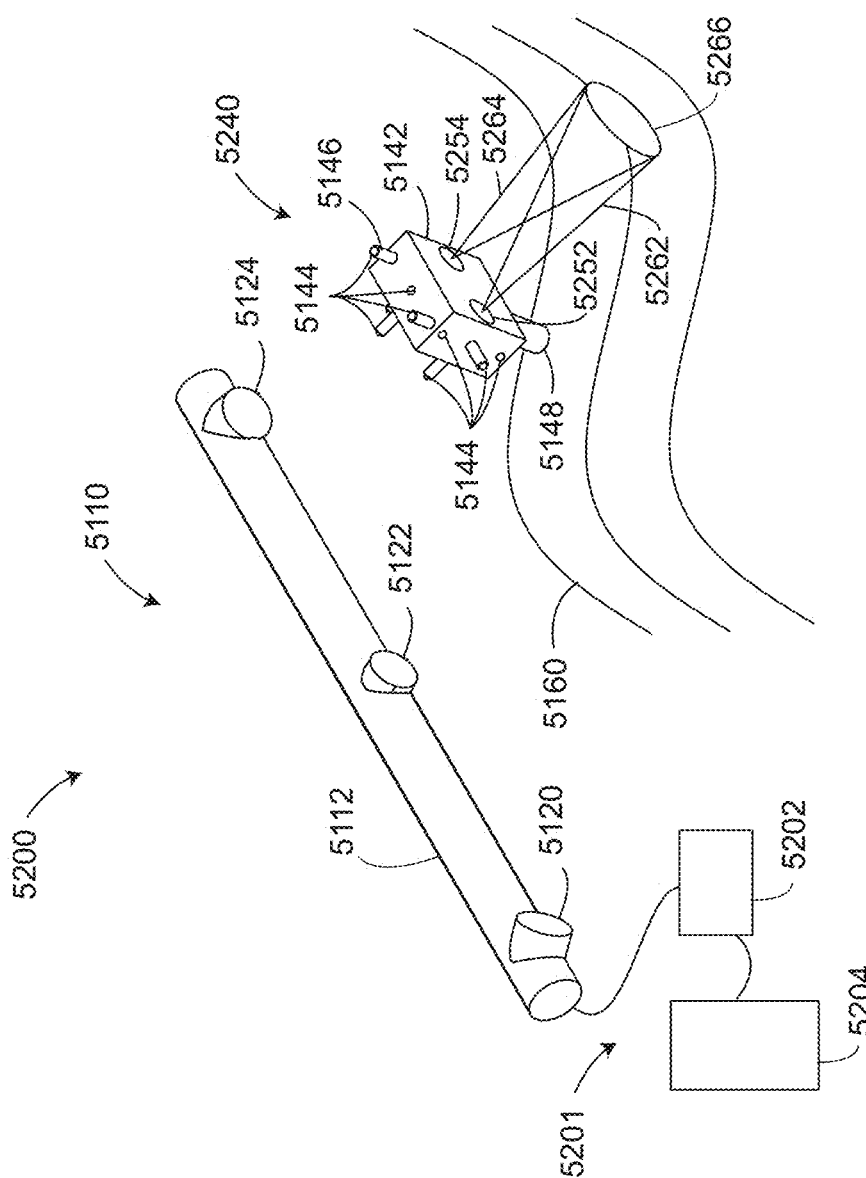
FIG. 8B shows a camera bar used to measure a triangulation area scanner having targets viewable by the camera bar according to an embodiment.

FIG. 8B is a perspective view of a three-dimensional area scanning system 5200 that includes a camera bar 5110 and a scanner assembly 5240. The camera bar was described herein above in reference to FIG. 8A. The scanner assembly 5240 includes a housing 5142, a collection of lights 5144, optional pedestals 5146, shaft 5148, projector 5252, and camera 5254. The characteristics of the housing 5142, lights 5144, optional pedestals 5146, and shaft 5148 were described hereinabove in reference to FIG. 8A. The projector 5252 projects light onto the object 5160. The projector 5252 may be a variety of types, for example, LED, laser, or other light source reflected off a digital micromirror device (DMD) such as a digital light projector (DLP) from Texas Instruments, a liquid crystal device (LCD) or liquid crystal on silicon (LCOS) device. The projected light might come from light sent through a slide pattern, for example, a chrome-on-glass slide, which might have a single pattern or multiple patterns, the slides moved in and out of position as needed. The projector 5252 projects light 5262 into an area 5266 on the object 5160. A portion of the illuminated area 5266 is imaged by the camera 5254 to obtain digital data.

The digital data may be partially processed using electrical circuitry within the scanner assembly 5240. The partially processed data may be provided to an electrical system 5201 that includes an electrical circuit board 5202 and an external computer 5204. The external computer 5204 may comprise a network of computers. The electrical system 5201 may include wired and wireless portions, either internal or external to the components of FIG. 8B, that carry out the measurements and calculations required to obtain three-dimensional coordinates of points on the surface 5160. In general, the electrical system 5201 will include one or more processors, which may be computers, microprocessors, field programmable gate arrays (FPGAs), or digital signal processing (DSP) units, for example. The result of the calculations is a set of coordinates in the camera bar frame of reference, which may in turn be converted into another frame of reference, if desired.

Figure 8C:
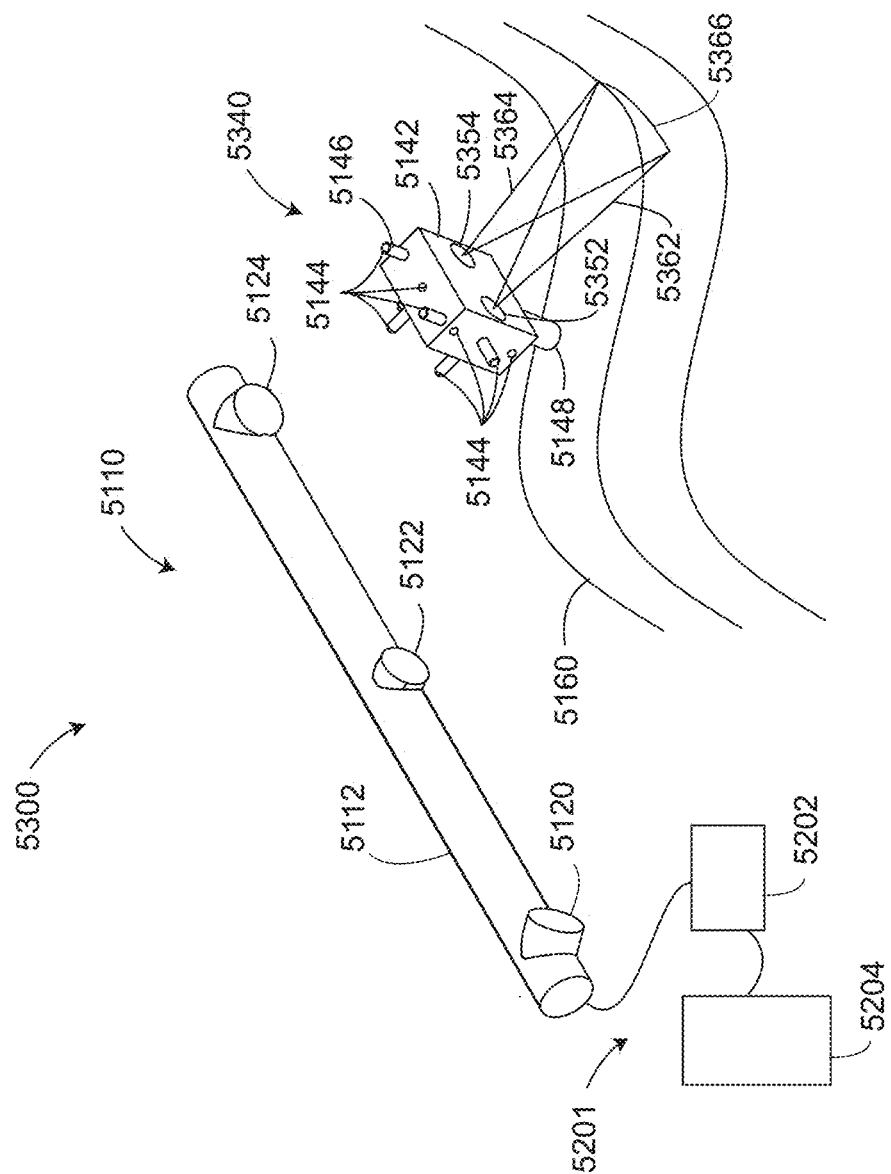
FIG. 8C shows a camera bar used to measure a triangulation line scanner having targets viewable by the camera bar according to an embodiment.

FIG. 8C is a perspective view of a three-dimensional line scanning system 5300 that includes a camera bar 5110 and a scanner assembly 5340. The camera bar was described hereinabove in reference to FIG. 8A. The scanner assembly 5340 includes a housing 5142, a collection of lights 5144, optional pedestals 5146, shaft 5148, projector 5352, and camera 5354. The characteristics of the housing 5142, lights 5144, optional pedestals 5146, and shaft 5148 were described hereinabove in reference to FIG. 8A. The projector 5352 projects light onto the object 5160. The projector 5352 may be a source of light that produces a stripe of light, for example, a laser that is sent through a cylinder lens or a Powell lens, or it may be a DLP or similar device also having the ability to project 2D patterns, as discussed hereinabove in reference to FIG. 8B. The projector 5352 projects light 5362 in a stripe 5366 onto the object 5160. A portion of the stripe pattern on the object is imaged by the camera 5354 to obtain digital data. The digital data may be processed in a manner similar to that described in reference to FIG. 8B using for example electrical components 5201. The result of the calculations is a set of three-dimensional coordinates of the object surface in the camera-bar frame of reference, which may in turn be converted into another frame of reference, if desired.

Figure 9:
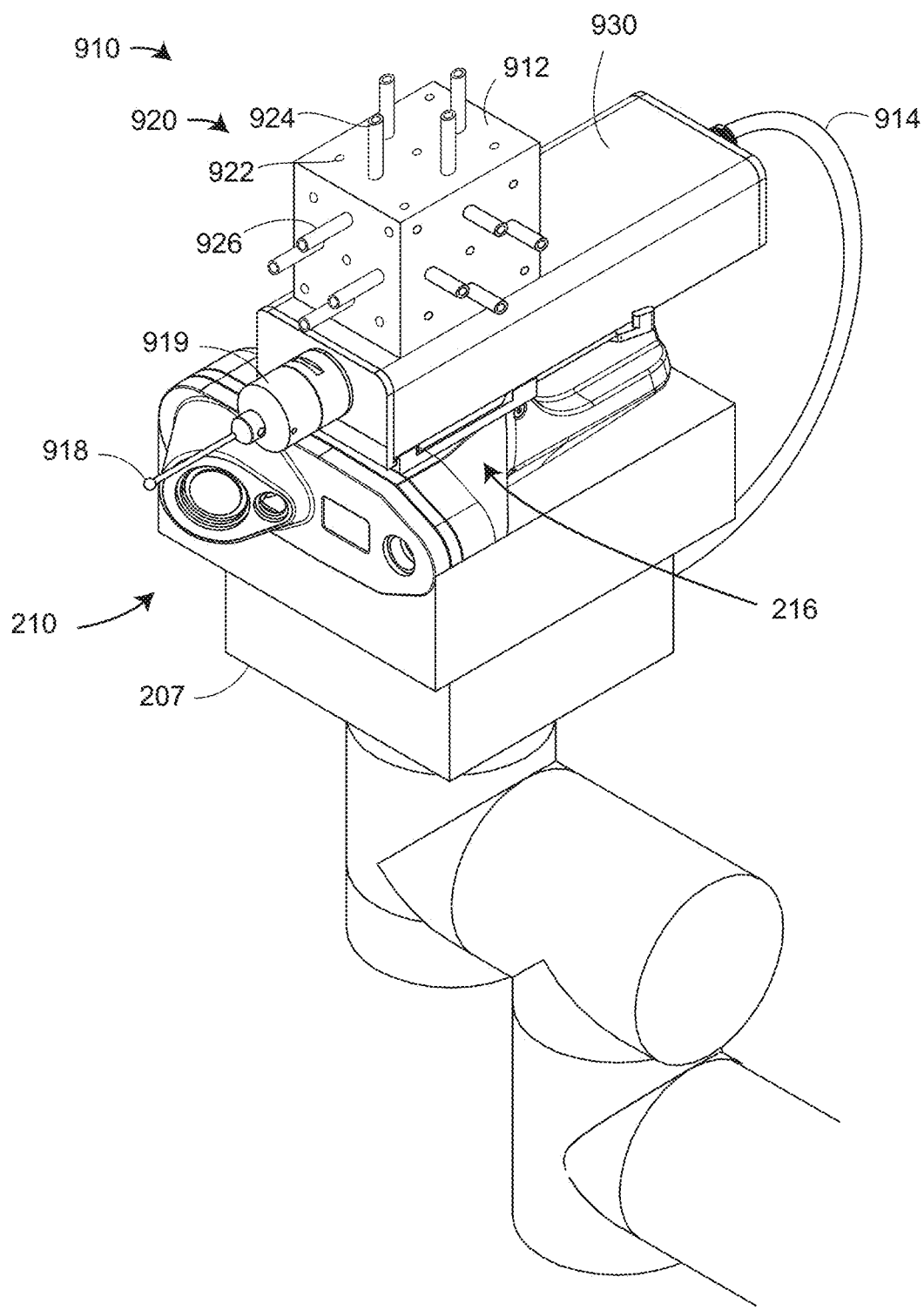
FIG. 9 is an isometric view of a triangulation scanner and a six-DOF light-point target assembly on an end effector according to an embodiment.

FIG. 9 is an isometric view of a detachable six-DOF target assembly 910 coupled to a triangulation scanner 210. The targets on the six-DOF target assembly 910 may be measured with a camera bar, such as the camera bar 5110 of FIGS. 8A-8C. Alternatively, the targets on the six-DOF target assembly may be measured with two or more cameras separately mounted in an environment, which is to say, not attached to a common bar. A camera bar includes two or more cameras spaced apart by a camera-bar baseline. Triangulation is applied to the images of the targets obtained by the two cameras to determine the six degrees of freedom of the six-DOF target assembly and scanner 210. Additional geometrical values such as camera-bar baseline and orientation of the cameras on the camera bar are used by a processor in the triangulation calculation.

In an embodiment, the six-DOF target assembly 910 includes a collection of light points 920, an electrical enclosure 930, and a tactile probe 918. In an embodiment, the collection of light points 920 include some points 922 mounted directly to the structure 912 and other points of light 924 mounted on pedestals 926. In an embodiment, the points of light 922, 924 are LEDs. In another embodiment, the points of light 922, 924 are reflective spots. In an embodiment, the reflective spots are illuminated by an external source of light. In an embodiment, the points or light are positioned so as to be visible from a wide range of viewing angles relative to the scanner 210.

In an embodiment, the six-DOF target assembly includes a tactile probe 918 which connects to the electrical enclosure 930 through a probe interface 216. The probe interface 216 may provide touch probe or analog probe electronics. A scanner 210 may provide a lot of detailed information quickly, but may provide less information about edges or holes than might be desired. The tactile probe 918 can be used by the operator to obtain this desired information.

Figure 10A:
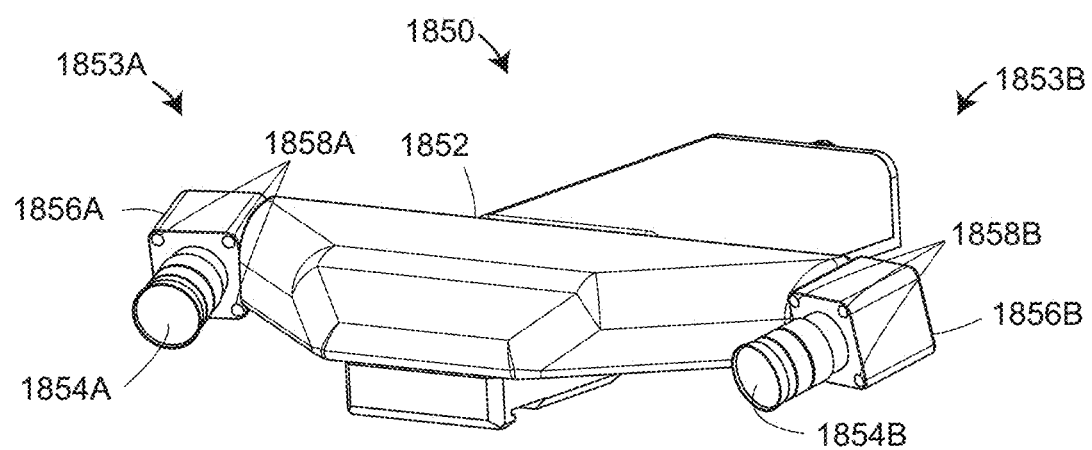
FIG. 10A is an isometric view of a detachable camera assembly configured for coupling to a triangulation scanner according to an embodiment.

FIG. 10A shows a camera assembly 1850 configured for attachment to a triangulation scanner or other 3D measurement device. In an embodiment, the camera assembly 1850 includes at least one camera. In an embodiment, the camera assembly 1850 includes two cameras 1853A, 1853B. The camera 1853A includes a lens assembly 1854A and an electronics box 1856A that includes a photosensitive array (not shown). The camera 1853B includes a lens assembly 1854B and an electronics box 1856B that includes a photosensitive array. In an embodiment, the cameras 1853A, 1853B have fields-of-view (FOVs) that partially overlap, thereby providing stereo imaging. Such imaging enables determination of 3D coordinates of targets using triangulation methods as described herein above. In some embodiments, the cameras together provide a FOV larger than the camera 508. In other embodiments, the cameras together provide a smaller FOV than the camera 508. In some embodiments, a single wide FOV camera is provided on the assembly 1850. In other cases, several wide FOV, but non-overlapping, cameras are provided on the camera assembly 1850. In another embodiment, the camera assembly, designated 1850B, includes only one camera 1853C. It includes a lens 1854C and an electronics box 1856C that includes a photosensitive array.

If the triangulation scanner 210 is a line scanner, then the 3D coordinates are projected on a line, which is to say that the 3D coordinates are found in the line of light sent from the projector 510 onto an object. If the scanner 210 is an area scanner, then the 3D coordinates are projected in a 2D area on the surface of the object. It is necessary to register the multiple collections of 3D coordinates obtained from individual scans by the scanner 210. In the case of a line scanner 210, the individual scans to be registered are line scans. In the case of an area scanner 210, the individual scans to be registered are area scans.

Methods are now described for using the camera assembly 1850 or 1850B in combination with the scanner 210 to register multiple scans obtained by the scanner 210, thereby enabling scans to be taken without being tracked by a six-DOF measuring device.

For all of the methods described herein below, a preliminary step is to obtain a common frame of reference for the scanner 210 and camera assembly 1850 or 1850B. Such a preliminary step may be carried out at the manufacturer's factory or by the operator by performing procedures prescribed by the manufacturer. The common frame of reference can be obtained, for example, by viewing common features with the scanner 210 and camera assembly 1850 or 1850B, and then performing a least-squares optimization procedure to match the observed features. Such methods are well known in the art and are not discussed further.

Figure 11A:
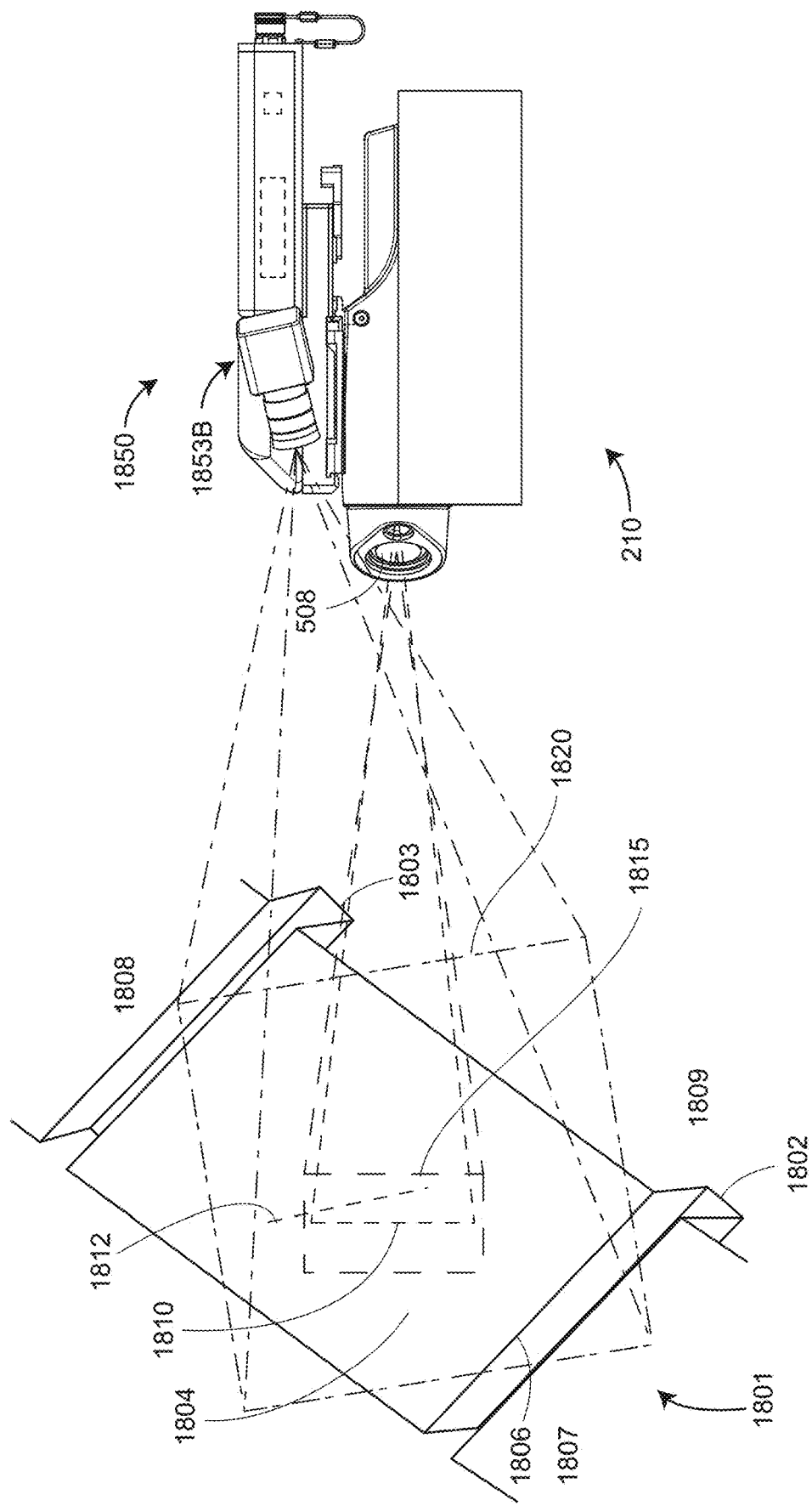
FIGS. 11A-11G illustrate methods of measuring 3D coordinates according to an embodiment.

FIG. 11A illustrates a first method for using the cameras 1853A, 1853B or 1853C to register multiple 3D coordinates obtained from line scans taken by a line scanner 210, wherein the registration is based on the matching of natural features. In a first instance, a first line of light 1810 is projected by the projector 510 onto an object 1801. In some regions, the object 1801 may include some fine details, as in the features 1802 and 1803, and in other regions, the object 1801 may include large regions 1804 that have few features. The first line of light 1810 is viewed by the 2D image sensor (e.g., photosensitive array) of the camera 508 in a region 1815 of the object imaged by the camera 508. As explained herein above with reference to FIG. 4, the appearance of the first line of light 1810 on the 2D image sensor of the camera 508 provides the information needed for a processor in the system to determine the 3D coordinates of the first line of light on the object 1801, where the 3D coordinates are given in the frame of reference of the scanner 210.

In a second instance, a second line of light 1812 is projected by the projector 510 onto the object 1801. The appearance of the second line of light 1812 on the 2D image sensor of the camera 508 provides the information needed for the processor in the scanner 210 to determine the 3D coordinates of the second line of light, again in the frame of reference of the scanner 210. What is needed is a way to register scans in the first instance and the second instance so that the 3D coordinates of the first line of light and the second line of light are put into a common frame of reference.

In a first method of registration, which uses natural features, the cameras 1853A, 1853B image a region 1820 of the object. In the example shown, detailed features 1806, 1807, and 1808 are imaged by the cameras 1853A, 1853B. Using triangulation, a processor in the system use the images of the cameras 1853A, 1853B find the 3D coordinates of these detailed features in the frame of reference of the scanner 210. As explained herein above, such triangulation requires a baseline distance between the camera 1853A and 1853B and the relative orientation of these cameras relative to the baseline. Because the 3D coordinates of the detailed features captured by the cameras 1853A, 1853B cover an area of the object 1801, rather than just a line, it may be possible to match the features in 2D, thereby determining the coordinate transformation required to place the first line of light 1810 and the second line of light 1812 in the same frame of reference. Some natural features such as the point of intersection of three planes 1809 in FIG. 11A have an unambiguous position in 3D space. Such features are relatively easy to match in multiple camera images and hence are particularly useful in registering images based on natural targets.

Figure 10B:
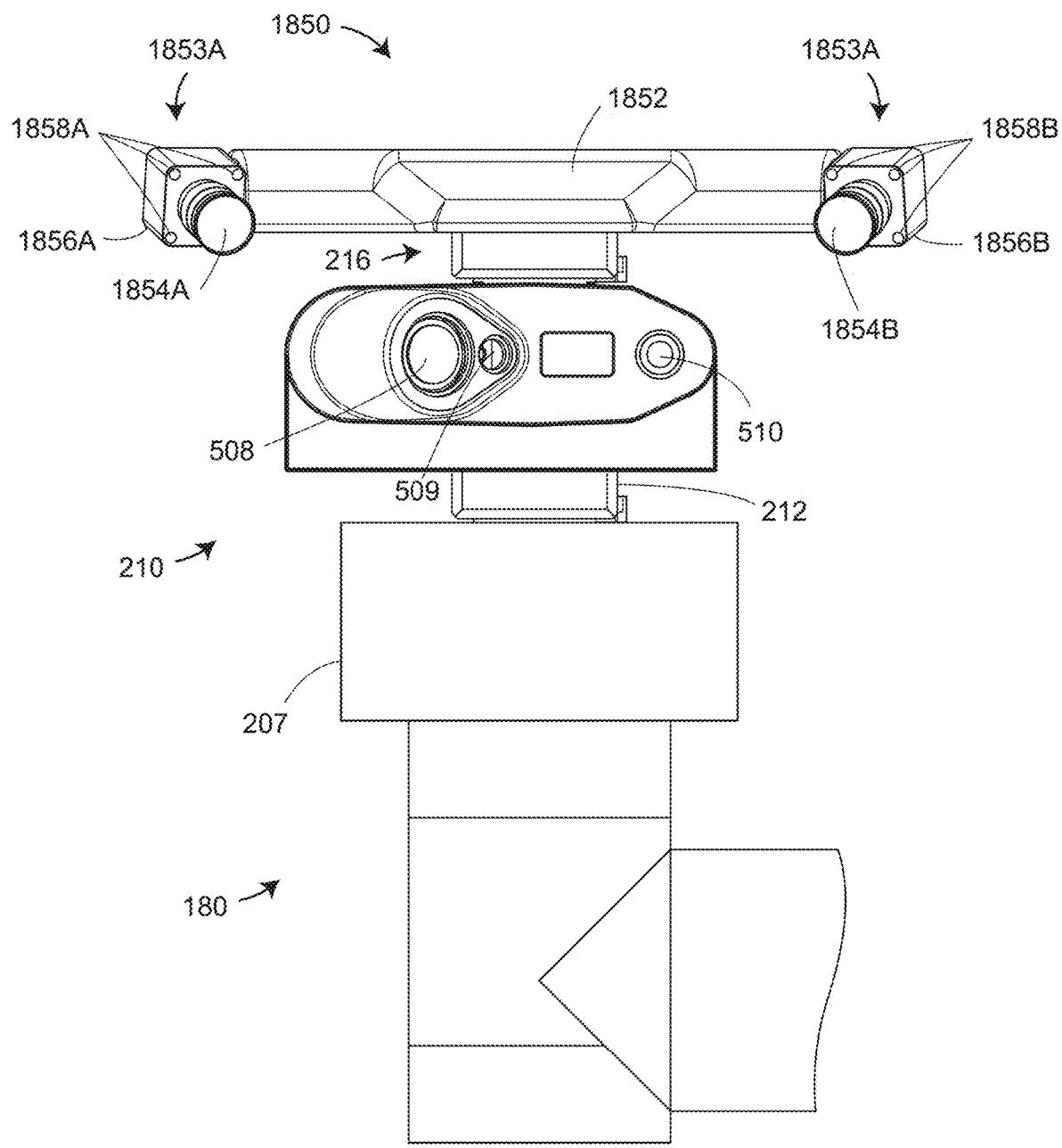
FIG. 10B is a front view of a detachable camera assembly attached to a triangulation scanner according to an embodiment.
Figure 10C:
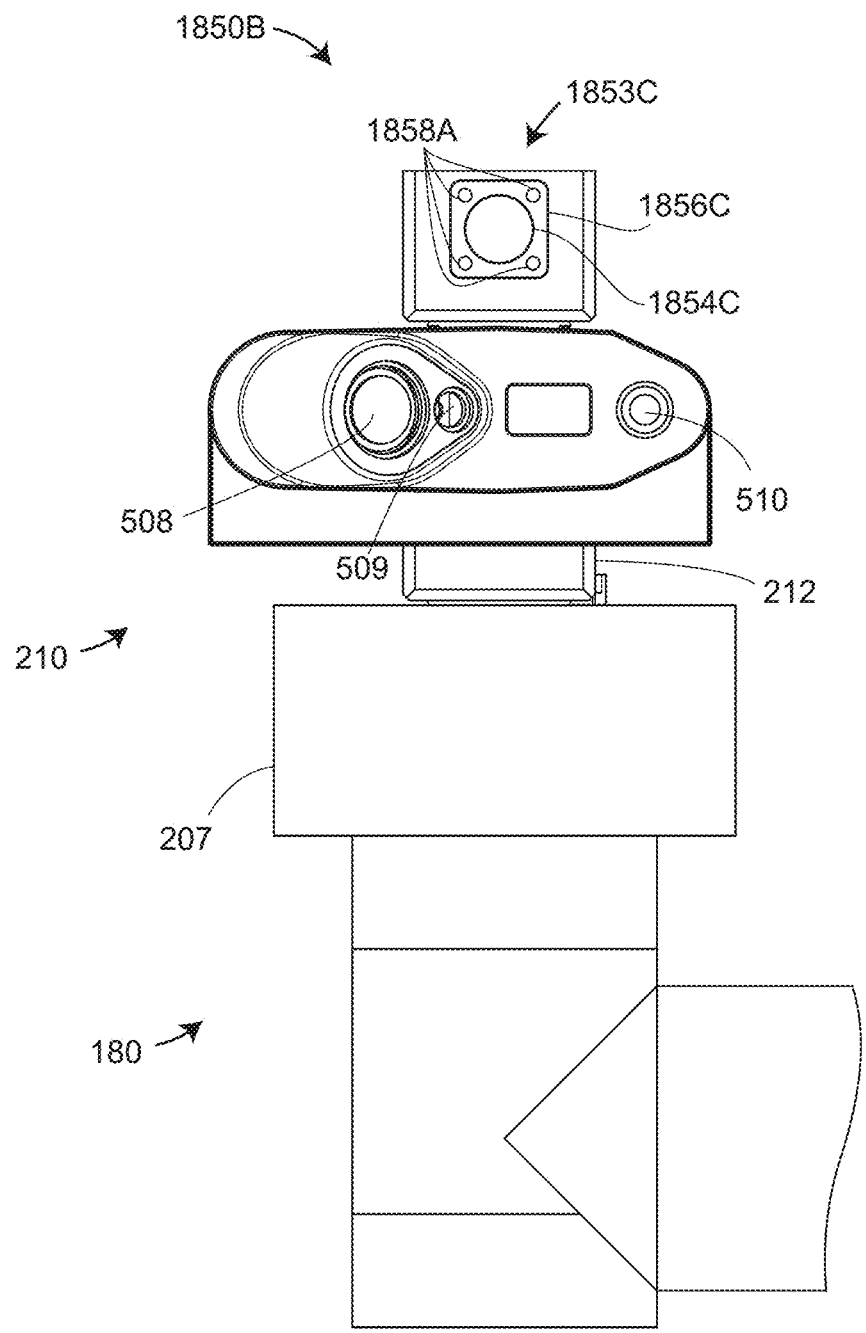
FIG. 10C is a front view of a detachable camera assembly that includes a single camera rather than two cameras according to an embodiment.
Figure 11B:
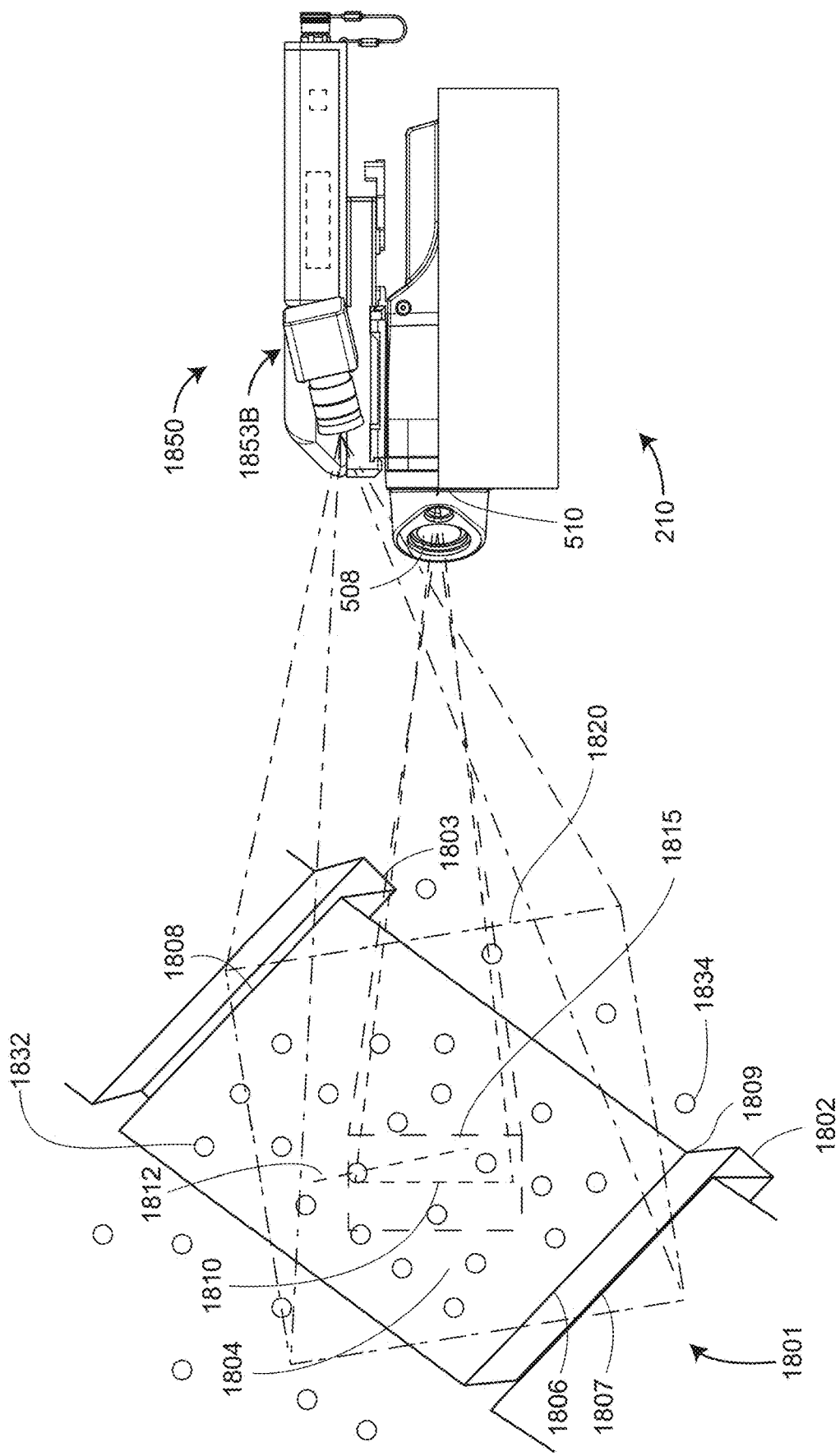

FIG. 11B illustrates a second method for using the cameras 1853A, 1853B to register multiple 3D coordinates obtained from line scans taken by a line scanner 210, wherein the registration is based on the matching of physical targets rather than natural targets. FIG. 11B is the same as FIG. 11B except that FIG. 11B further includes markers 1832 on the object 1801 and/or markers 1834 in the vicinity of the object but not on the object. In an embodiment, the targets are reflective targets, for example, white circular targets sometimes referred to as photogrammetry targets. In an embodiment, such targets are illuminated by light sources 1858A, 1858B in FIGS. 10A and 10B or light sources 1858C in FIG. 10C. In other embodiments, the targets 1832, 1834 are illuminated by ambient light sources or by other light sources located off the camera assembly 1850. In an embodiment, the targets 1832, 1834 are themselves light sources, for example, LEDs. In an embodiment, the targets 1832, 1834 are a combination of photogrammetry targets and LEDs.

In a first instance, the projector 510 projects a first line of light 1810 onto the object 1801. In a second instance, the projector 510 projects a second line of light 1812 onto the object 1801. In an embodiment, in each of the first and second instances, the cameras 1853A, 1853B each image three common non-collinear targets, which might include 1832, 1834. These three points enable a processor in the system to place the 3D coordinates obtained from the first and second lines of light in a common frame of reference. This registration procedure is carried out repeatedly as the scanner 210 is moved across the object 1801, thereby enabling the processor to determine 3D coordinates of the surface of the object 1801. In another embodiment, image information provided by physical targets is combined with image information provided by natural targets to register together 3D coordinates from line scans to obtain 3D coordinates over the surface of the object 1801.

Figure 11C:
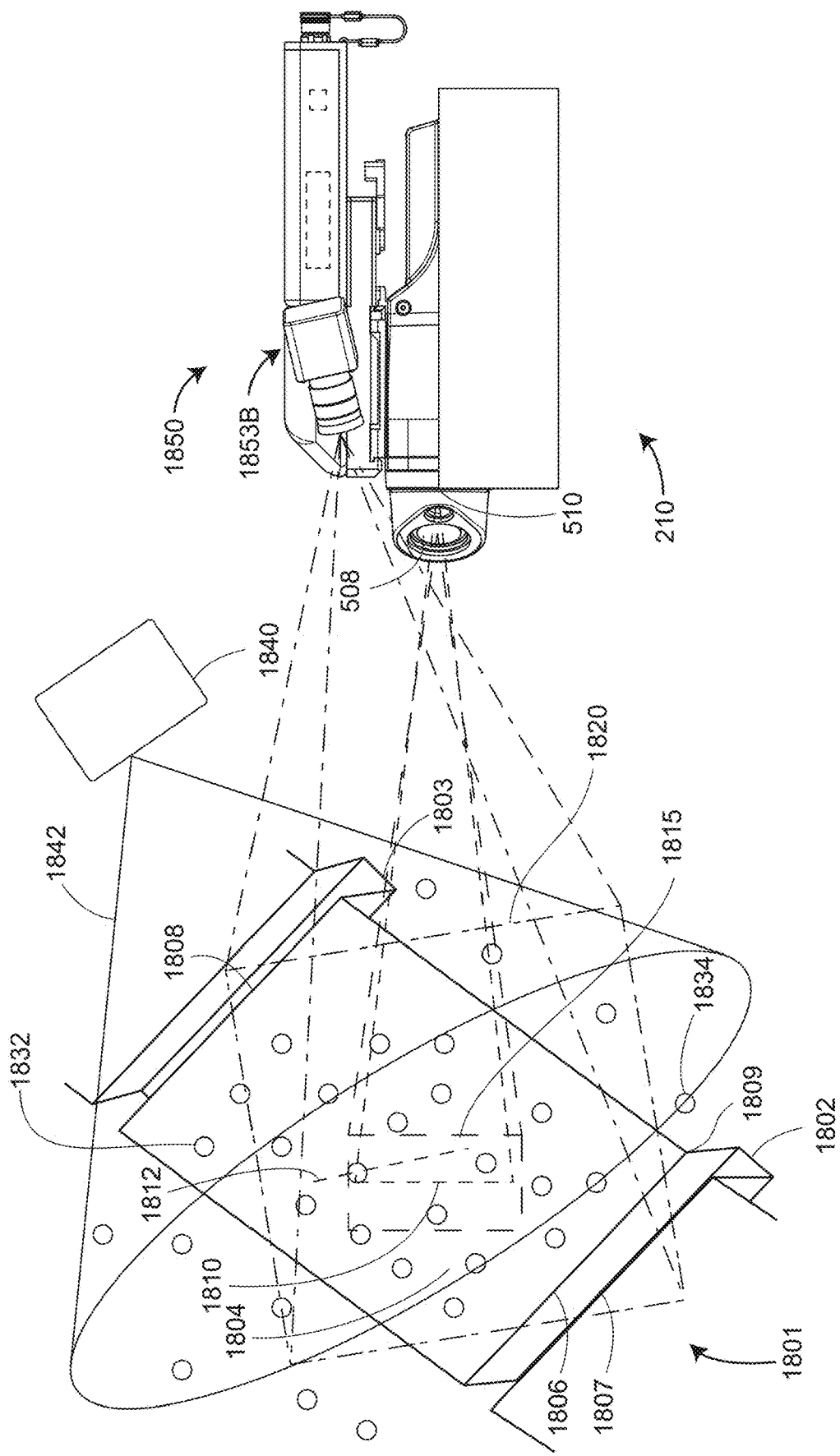

FIG. 11C illustrates a third method for using the cameras 1853A, 1853B to register multiple 3D coordinates obtained from line scans taken by a line scanner 210, wherein the registration is based on the matching of projected spots of light rather than physical targets or natural targets. An external projector 1840 separate from the scanner 210 and camera assembly 1850 projects spots of light 1832 onto the object and/or spots of light 1834 off the object but in the vicinity of the object. The cameras 1853A, 1853B image these spots of light in the same way they imaged the physical targets in FIG. 11B, and the processor determines 3D coordinates of the object surface in the same manner in each case.

Figure 11D:
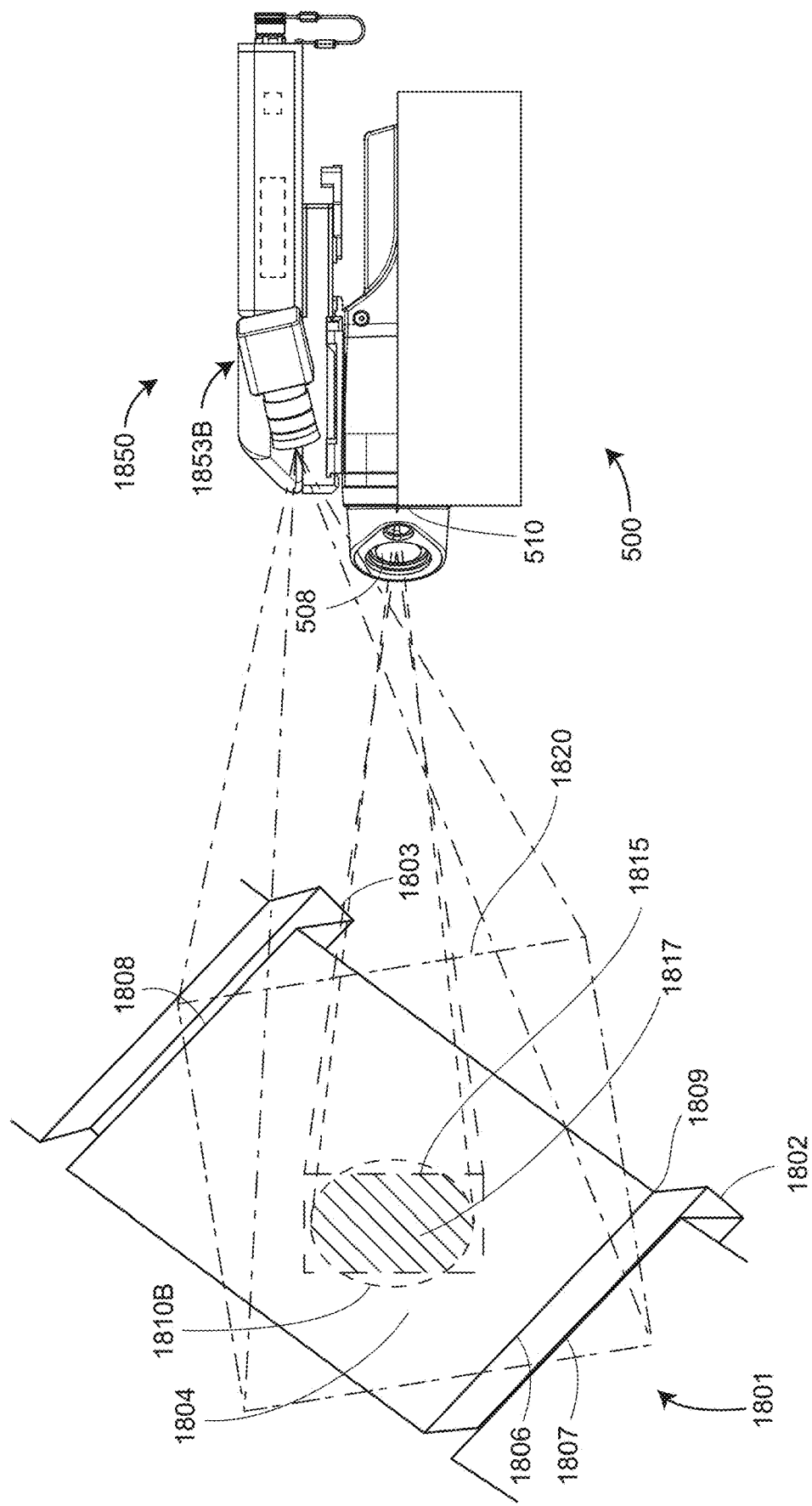

FIG. 11D illustrates a first method for using the cameras 1853A, 1853B to register multiple 3D coordinates obtained from area scans taken by an area scanner 210, wherein the registration is based on the matching of natural features. In a first instance, a first area of light 1810B is projected by the projector 510 onto an object 1801. The portion of the first area of light 1810B is viewed by the 2D image sensor (e.g., photosensitive array) of the camera 508 in a region 1815 of the object imaged by the camera 508. The overlap of the projected region of light 1810B and the imaged region 1815 is an overlap region 1817. In this overlap region 1817, a processor may determine 3D coordinates of the surface of the object 1801. These 3D coordinates are found in the frame of reference of the scanner 210.

Figure 11E:
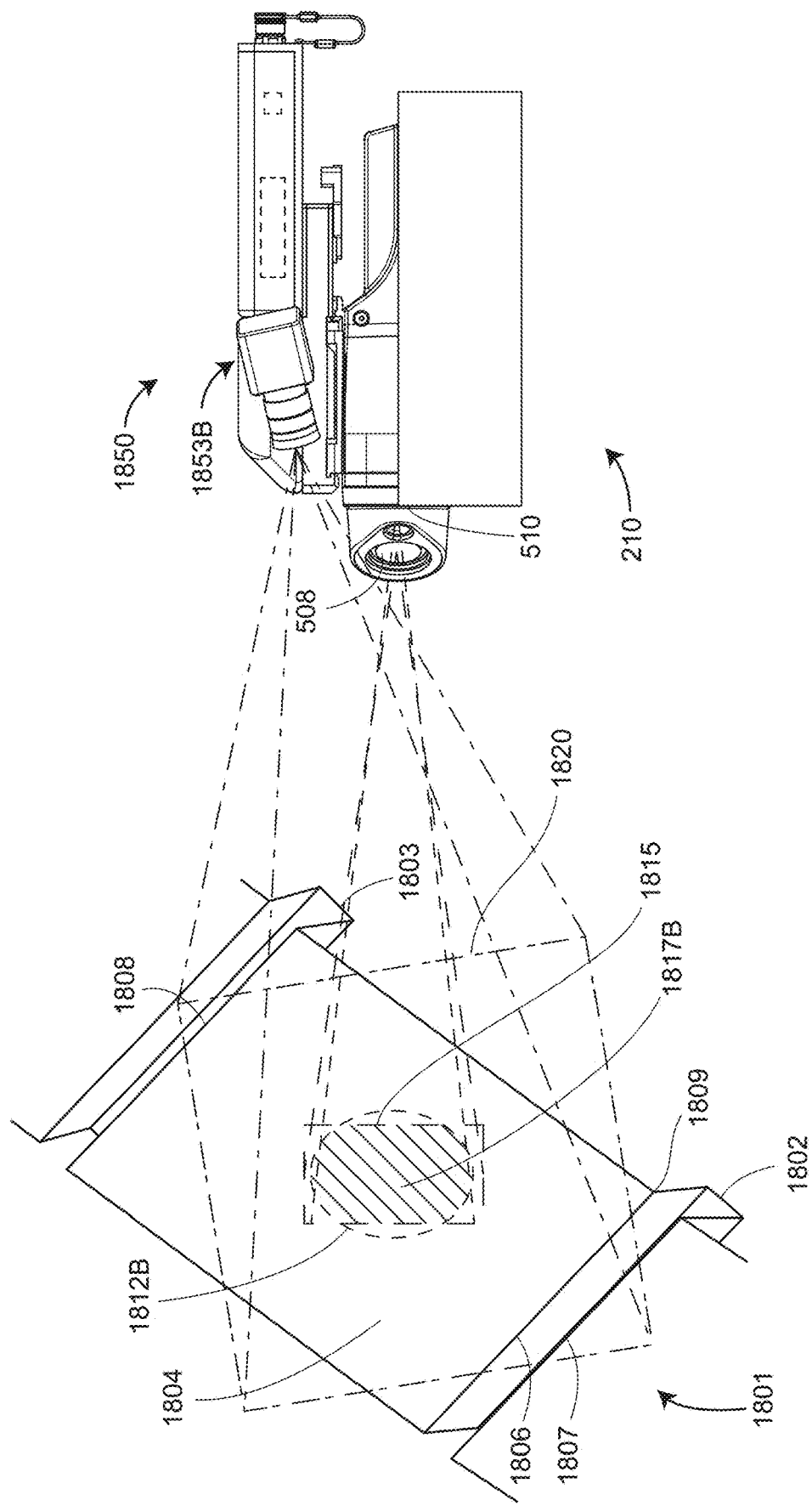

In a second instance illustrated in FIG. 11E, a second area of light 1812B and the area imaged by the cameras 1853A, 1853B are to the right of the first area of light by the projector 510 onto the object 1801, thereby producing a second overlap region 1817B to the right of the first overlap region 1817. In some cases, there are enough common natural feature details within the first and second overlap regions to enable registration of the 3D coordinates in the frame of reference of the scanner 210 in the first and second instances to be put into a common frame of reference. However, if the object 1801 has relatively few features in the overlap regions 1817 and 1817B, it may not be possible to accurately register the first and second area scans based on scan data alone.

In an embodiment, the cameras 1853A, 1853B have a wider FOV than the camera 510, thereby enabling additional features such as 1806, 1807, and 1808 to improve the registration by matching of the 3D features as discussed herein above using the methods described with respect to FIGS. 11A, 11B, and 11C. If an object 1801 lacks distinct features, as in the region 1804, the registered 3D images may end up warping. For example, the flat surface in the region 1804 may end up looking like a saddle. This effect is sometimes referred to as the "potato chip" or "potato crisp" effect.

Figure 11F:
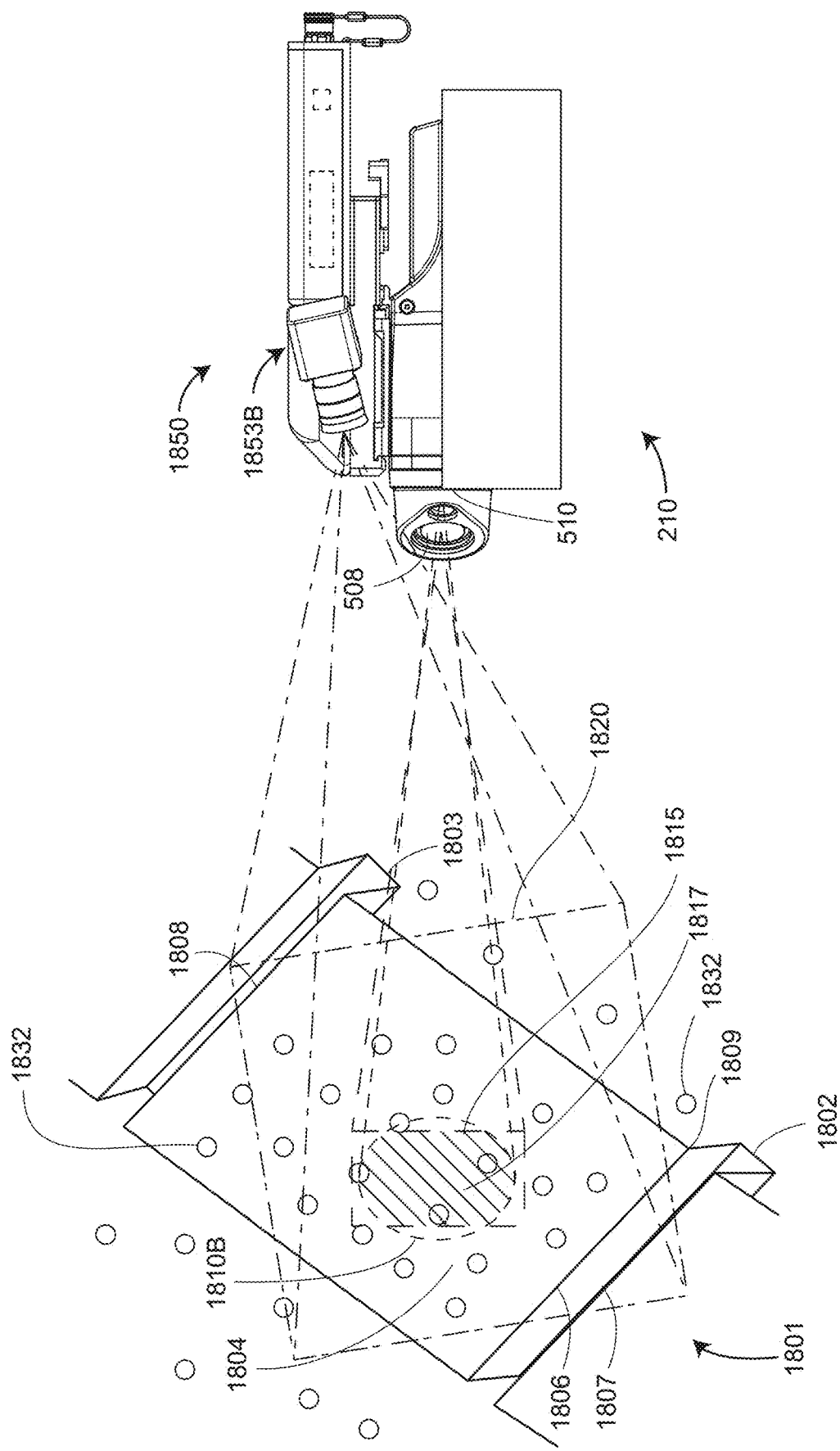

For scanned regions with few features, registration can be improved by providing targets on or off the object 1801. FIG. 11F illustrates a second method for using the cameras 1853A, 1853B to register multiple 3D coordinates obtained from area scans taken by an area scanner 210, wherein the registration is based on the matching of physical targets rather than natural targets. FIG. 11F is the same as FIG. 11D except that FIG. 11F further includes markers 1832 on the object 1801 and/or markers 1834 in the vicinity of the object but not on the object. By using the method described with reference to FIG. 11B, improved registration of the 3D coordinates obtained from the successive area scans may in many cases be obtained.

Figure 11G:
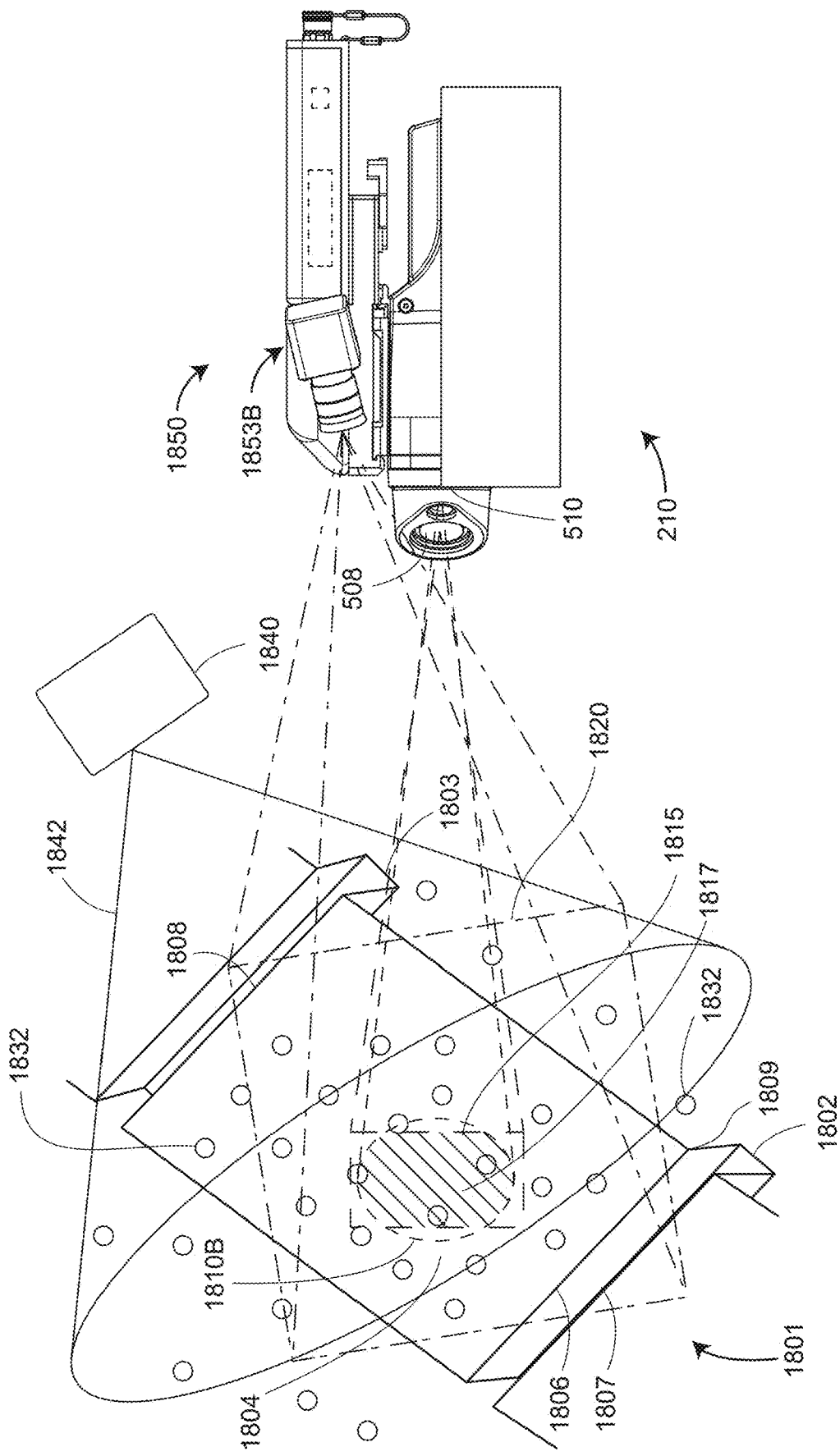

FIG. 11G illustrates a third method for using the cameras 1853A, 1853B to register multiple 3D coordinates obtained from area scans taken by an area scanner 210, wherein the registration is based on the matching of projected spots of light rather than physical targets or natural targets. An external projector 1840 separate from the scanner 210 and camera assembly 1850 projects spots of light 1832 onto the object and/or spots of light 1834 off the object but in the vicinity of the object. The cameras 1853A, 1853B image these spots of light in the same way they imaged the physical targets in FIG. 11F, and the processor determines 3D coordinates of the object surface in the same manner in each case.

The term "mark" may be used to refer to any of the physical features used to assist in the registration of multiple sets of 3D coordinates obtained by the scanner 210 in combination with the camera assembly 1850 or 1850B. In the discussion herein above, four marks were described: (1) natural features of the object surface (or features on a stationary surface proximate the object); (2) LED markers (targets) on the object or proximate to the object; (3) reflective markers (targets) on the object or proximate the object; and (4) spots of light projected onto the object or proximate the object by an external projector not located on the scanner 210 or camera assembly 1850.

Figure 12A:
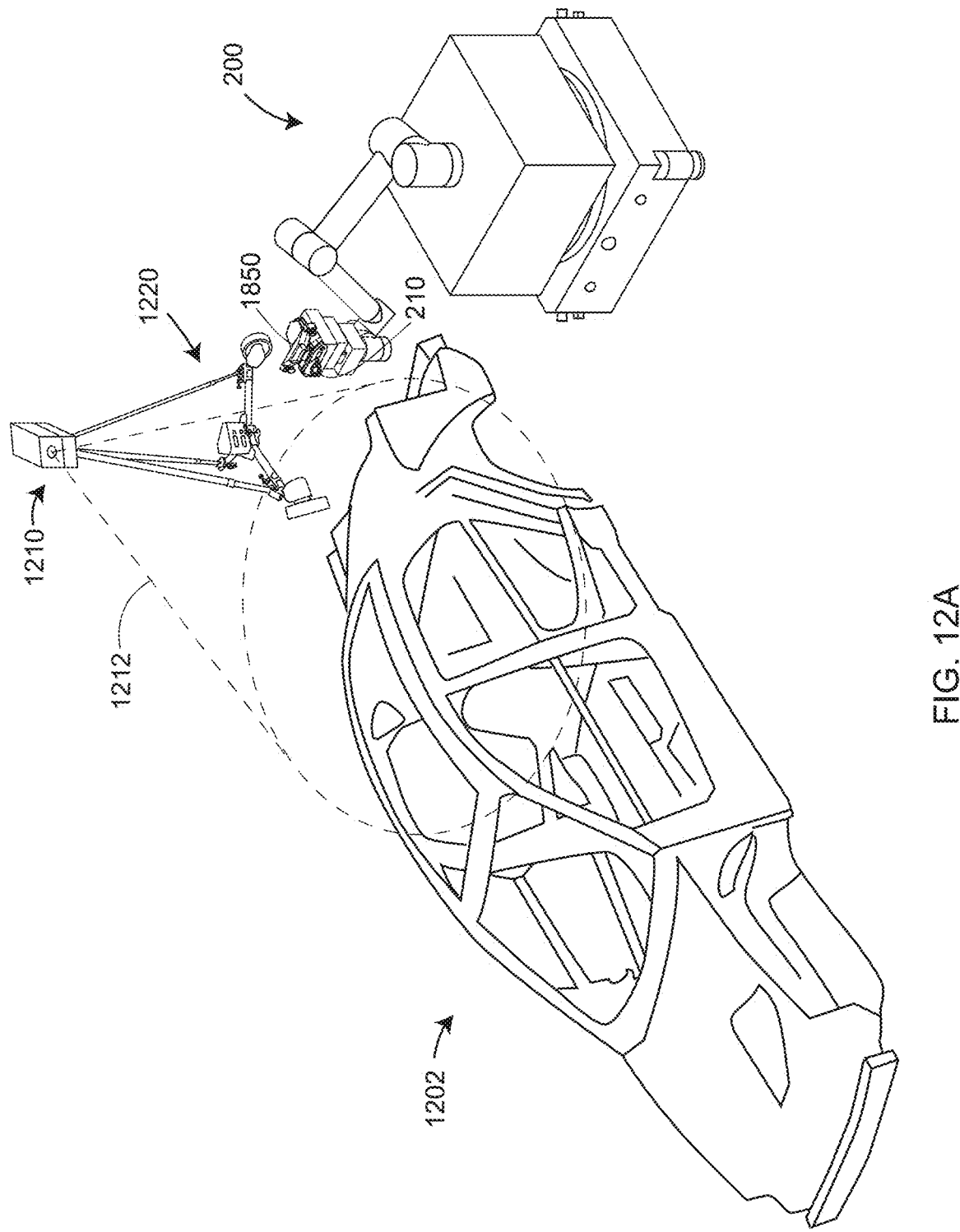
FIG. 12A shows a triangulation scanner and camera assembly measuring 3D coordinates in cooperation with an external projector on a mobile structure according to an embodiment.

FIG. 12A shows a mobile measurement platform 200 having an end effector that includes a triangulation scanner 210 and a camera assembly 1850. In the example shown in this figure, the mobile measurement platform is measuring a rear portion of an automobile BiW 1202. An external projector projects spots of light 1212 onto a wide measurement region to enable the camera assembly 1850 to provide information to the one or more processors in the system to assist in registering the multiple scans from the scanner 210. In an embodiment, the external projector 1210 is on a mobile tripod 1220 which may move autonomously or under user direction from place to place to provide projected spots where needed.

Figure 12B:
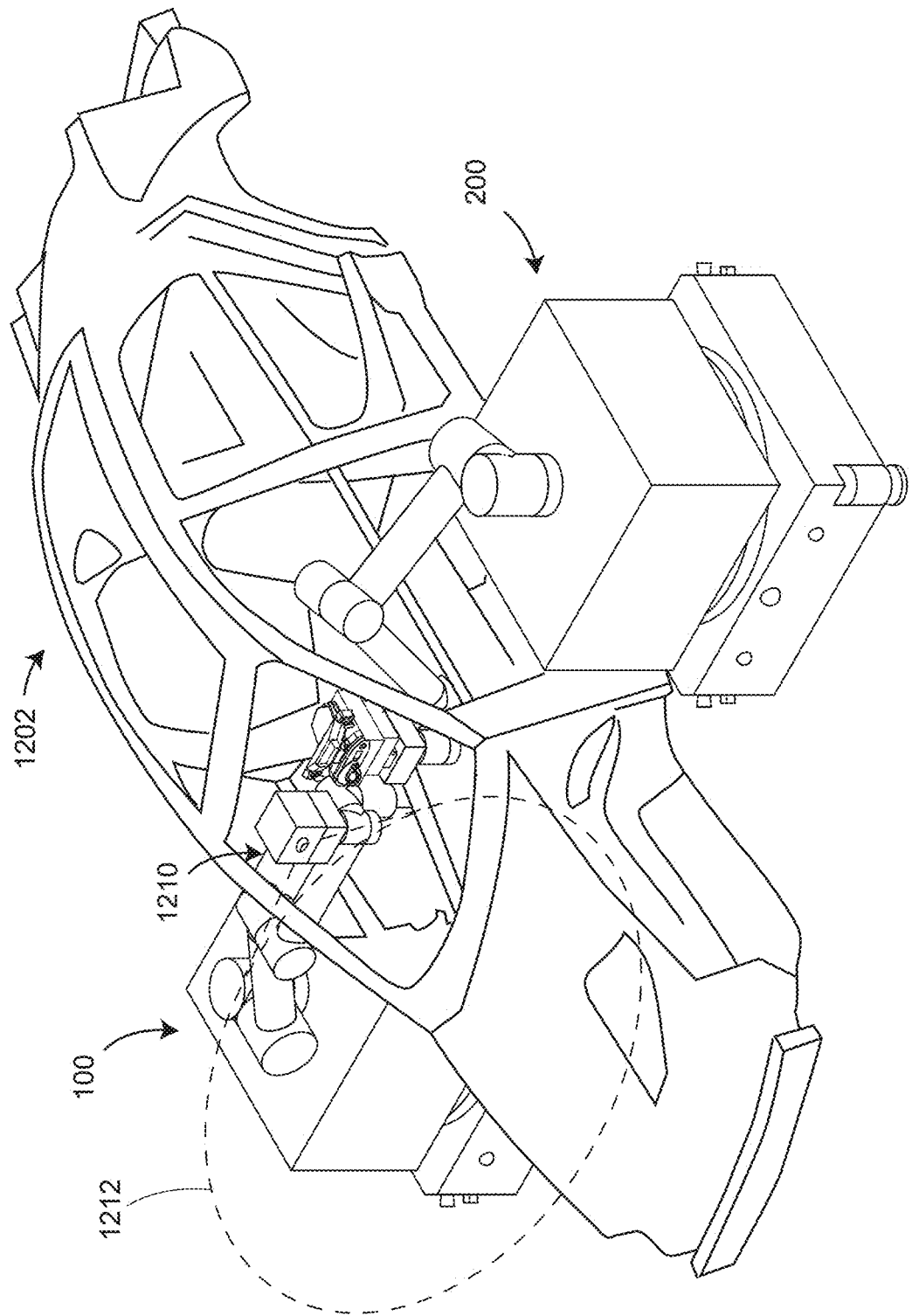
FIG. 12B shows a triangulation scanner and camera assembly measuring 3D coordinates in cooperation with an external projector on a second mobile platform according to an embodiment.

FIG. 12B shows the mobile measurement platform 200 having an end effector that includes the triangulation scanner 210 and the camera assembly 1850. The mobile measurement platform is measuring an interior portion of the BiW 1202. In this case, a projector located outside one of the windows would likely project spots in elongated ellipses because of the angle of entry of the projected spots on the interior regions. In addition, as the mobile platform 200 moves its end effector from place to place, it will tend to block some of the spots. In some cases, this could be a problem. A way around this potential difficulty is to place the projector 1810 on a mobile platform 100. The robotic articulated arm can position the external projector 1810 into whatever position and orientation is considered optimum for the situation.

Figure 13A:
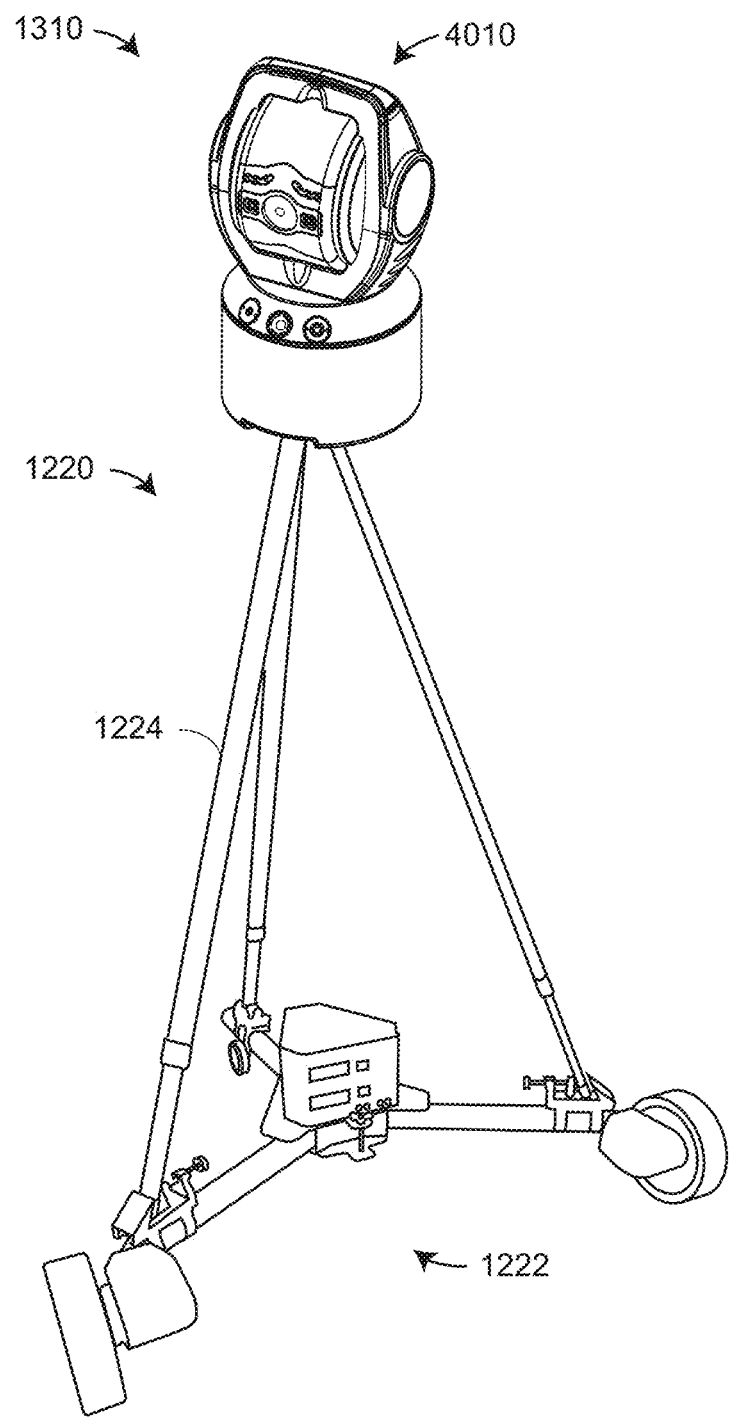
FIG. 13A shows a laser tracker mounted on a mobile structure according to an embodiment.

FIG. 13A shows an apparatus 1310 that includes a laser tracker 4010 mounted on a mobile structure 1220. In an embodiment, the mobile structure 1220 includes tripod legs 1224 and a motorized dolly 1222.

Figure 13B:
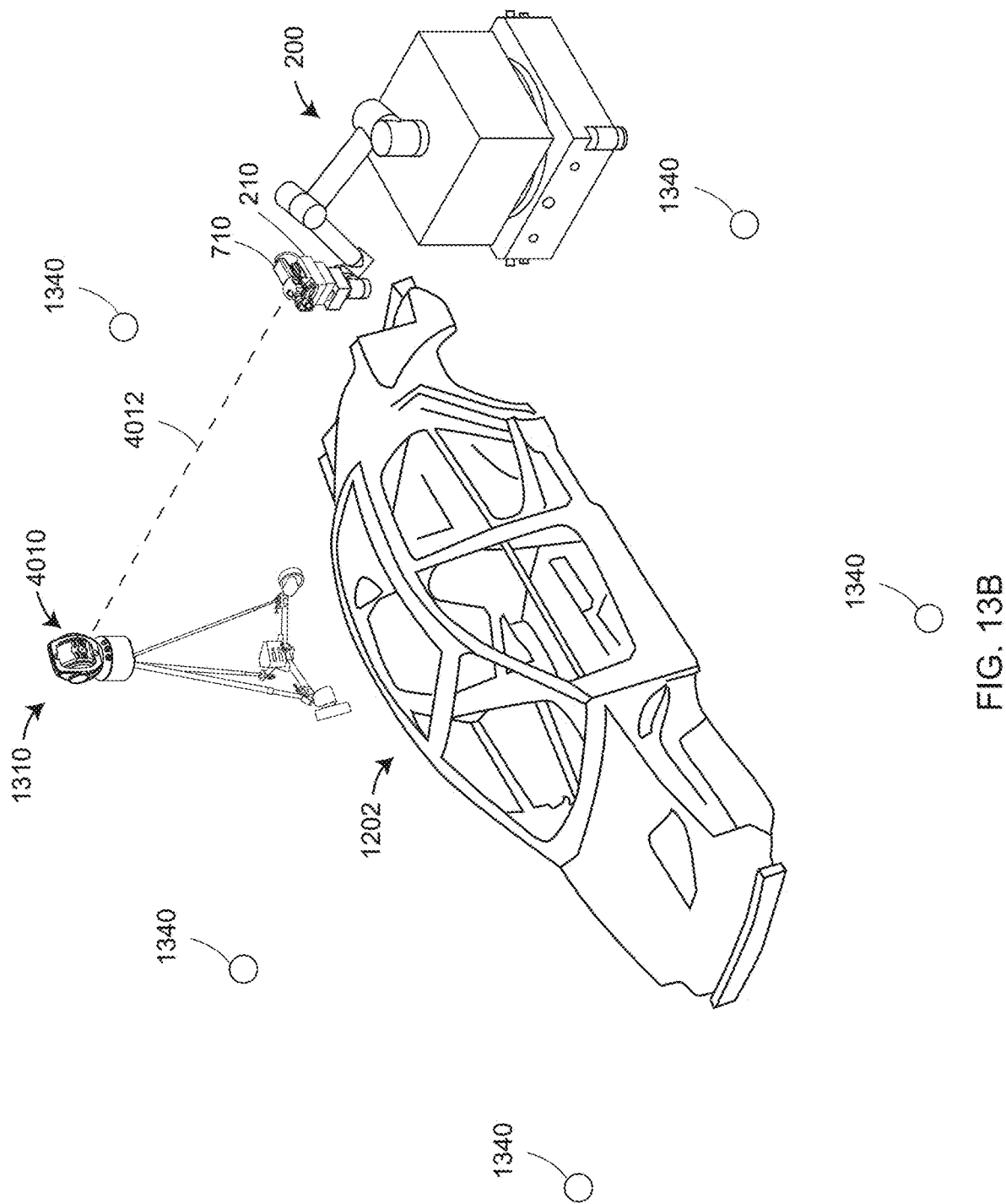
FIG. 13B shows a laser tracker following the position and orientation of a 3D probe according to an embodiment.

FIGS. 13B-13E show a procedure for putting measurements collected over a wide volume into a common frame of reference. FIG. 13B shows a mobile measurement platform 200 measuring 3D coordinates of a rear portion of a BiW 1202. The end effector of the robotic articulated arm of the mobile platform includes a scanner 210 coupled to a six-DOF tracker target assembly 710. A six-DOF laser tracker 4010 sends a beam of light to the six-DOF tracker target assembly 710 and determines the six-DOF of freedom of the scanner 210. It is also possible for measurements to be made with the tactile probe 718 on the six-DOF tracker target assembly 710.

Figure 13C:
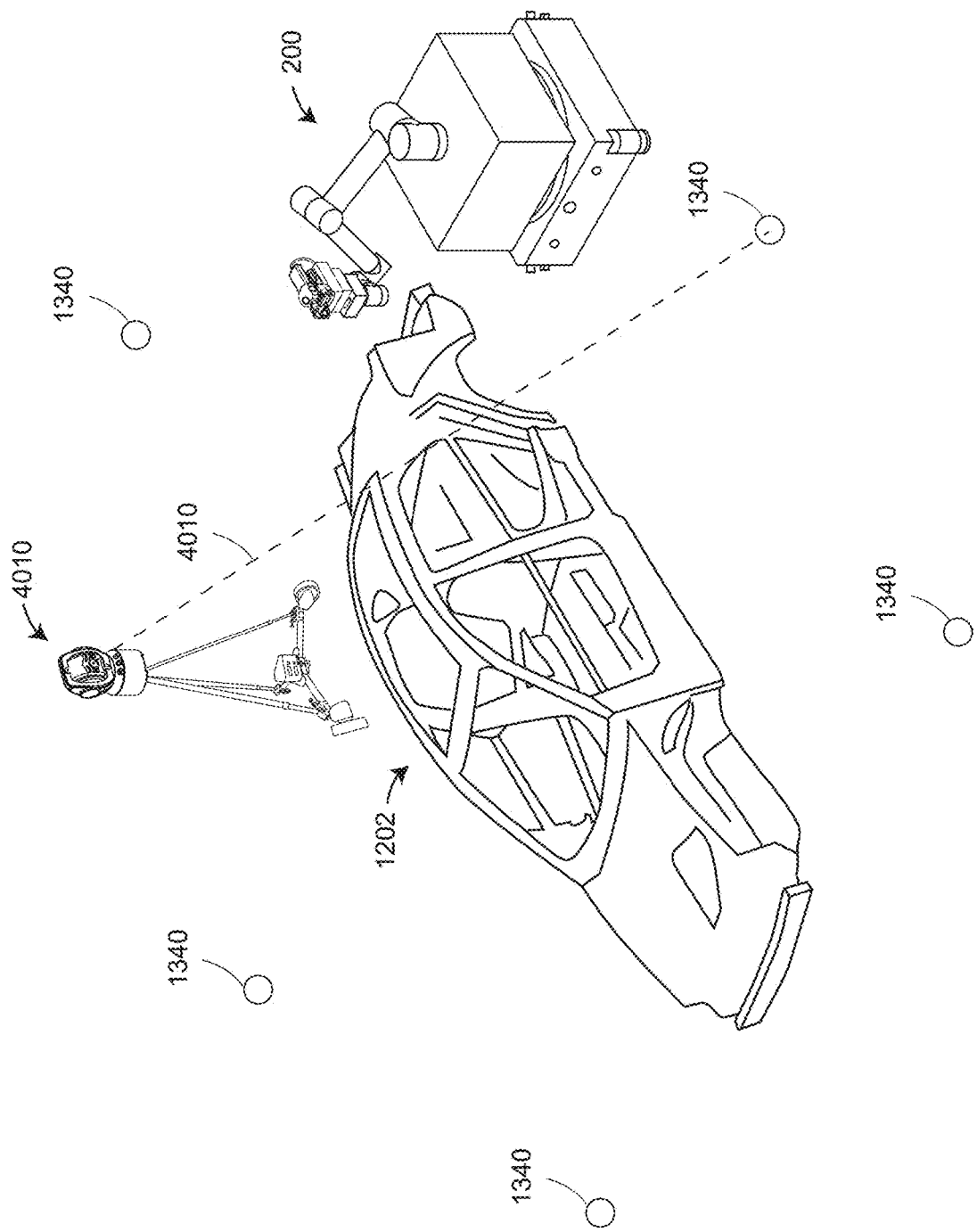
FIG. 13C shows a laser tracker measuring a six-DOF target or a plurality of 3D retroreflectors according to an embodiment.
Figure 13D:
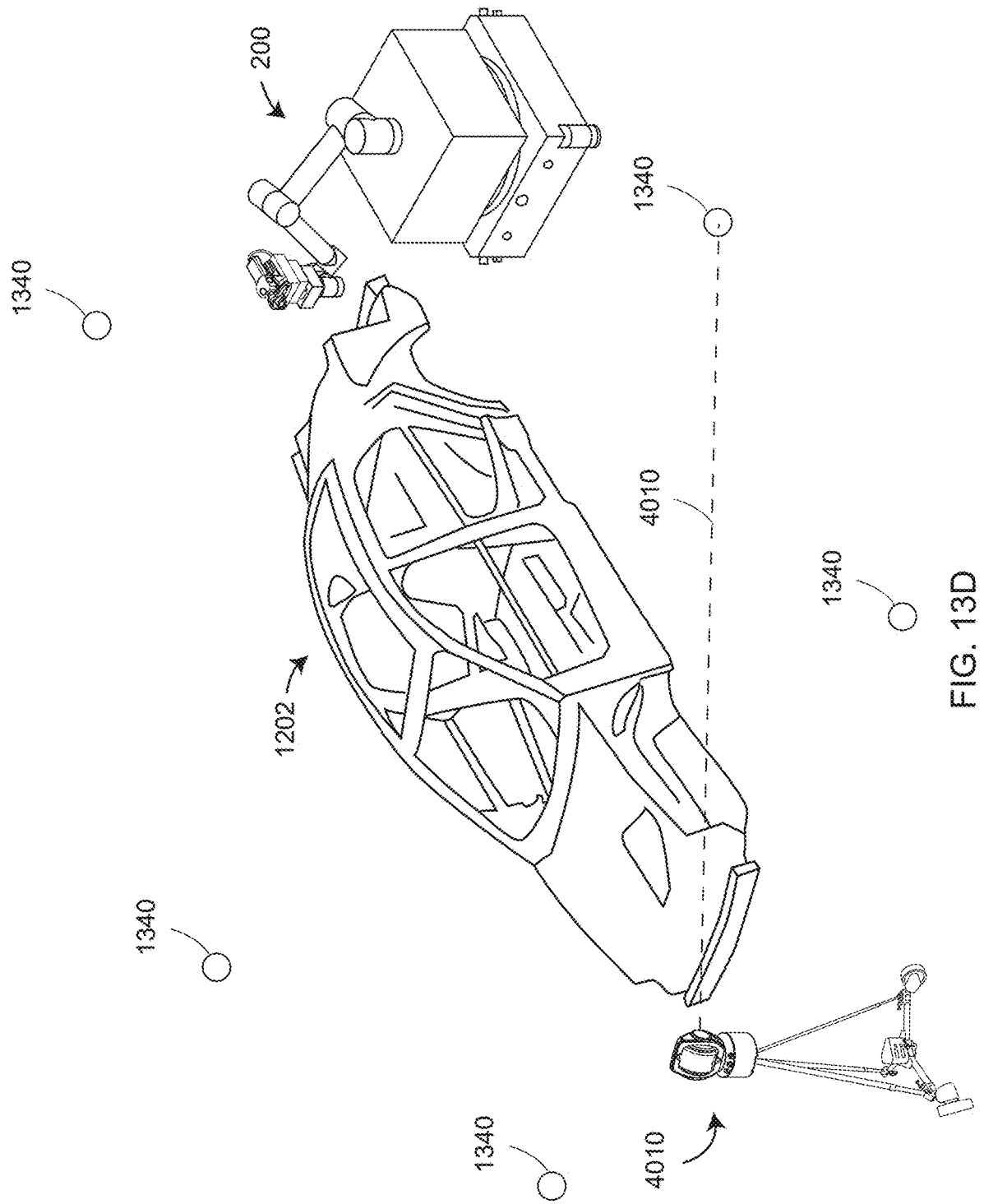
FIG. 13D shows the laser tracker moved to a new position and measuring the six-DOF target or the plurality of 3D retroreflector targets to register the tracker in FIG. 13C according to an embodiment.

The mobile platform 200 now wants to move to a new position to make additional measurements. In an embodiment, in the new position, the BiW will block the beam of light from the laser tracker. It is therefore necessary to move the laser tracker but in a way that will enable 3D measurements made in each location to be placed in a common frame of reference. A procedure for performing this relocation of the laser tracker is to measure one or more six-DOF targets 1340 in a first instance as shown in FIG. 13C and then measure the same six-DOF targets in a second instance as shown in FIG. 13D. Alternatively, the tracker may measure three or more three-DOF targets, also labeled 1340 herein, such as SMRs in the first instance as shown in FIG. 13C and then measure the same three or more three-DOF targets in the second instance as shown in FIG. 13D.

These tracker measurements of a common six-DOF target or of three or more three-DOF targets enable a transformation matrix to be calculated that will enable measurements to be put into a common frame of reference. In a step illustrated in FIG. 13E, the mobile platform continues measuring, now on the interior of the BiW, while the tracker monitors the six degrees of freedom of the scanner 210 and corrects for the movement of the scanner, which is to say, puts the scanner readings into a common frame of reference. As explained herein above, besides measuring a single six-DOF target to obtain a transformation matrix, it is also possible to obtain a transformation matrix by measuring three regular (three-DOF) retroreflectors with a laser tracker. This method of relocating using a six-DOF laser tracker can also be performed with a camera-bar device used in combination with a six-DOF light-point target assembly, as explained further herein below in reference to FIG. 15A.

A mobile measurement platform 200 including any combination of end effector devices discussed herein above may be used to perform automated inspections. In an embodiment, an automated inspection is provided by centralized production scheduling software. Inspection instructions may be changed according to the type of device being inspected.

In an embodiment, inspection instructions are put onto a tag, which might be a near-field communication (NFC) tag, a radio-frequency identification (RFID tag), a bar code, a QR code, or any other type of storage device that can conveniently convey information. In an embodiment, the tag travels with the object under test and is read by the mobile measurement platform. In an embodiment, an inspection plan includes information about the locations where measurements are to be made and the types of information to be gathered and analysis to be performed. A 3D measuring system may evaluate a wide variety of dimensional characteristics including point coordinates, diameters, lengths, angles, and so forth. An inspection plan can include the specific measurements to be performed and the dimensional characteristics to be evaluated. In an embodiment, a nominal value is provided for each of the measured dimensional characteristic. The error is calculated as the measured value minus the nominal value. In an embodiment, an alarm is given if the absolute value of an error exceeds a tolerance value. In an embodiment, a tolerance value is included as part of the inspection plan. In an embodiment, test results are put into a database and evaluated with statistical process control (SPC) software. In an embodiment, a CAD model is provided to the one or more processors that guide the movements and measurements of the mobile platform. Information about the dimensions of the object in the CAD model may be used to guide movement of the mobile platform. In an alternative embodiment, the mobile platform selects a path based on the dimensions of the object as observed by the 2D scanners and other sensors tied to the mobile platform.

Two types of navigation of a mobile platform may be used. In a first type of navigation, internal sensors of the mobile platform are used to guide the platform movement. This method ordinarily provides an accuracy of movement of one to five centimeters. Internal sensors that may be used include 2D scanner sensors that emit a horizontal plane of light, usually near the floor. Such scanners help prevent collisions, but the data can also be used for navigation. Odometry sensors, in this case the angular encoders in the wheel assemblies, may also provide information that can be used for navigation. IMU and heading sensors, as well as 2D and 3D cameras mounted around the mobile platform, may also assist in navigation.

In a second type of navigation, a six-DOF measuring device such has a laser tracker or a camera bar (which may be two cameras separated and stable but not connected by an actual bar) is used to direct the movement of the mobile platform and articulated arm. Such navigation can be better than 100 micrometers in some cases, depending on the speed of the moving platform and other factors.

Figure 13E:
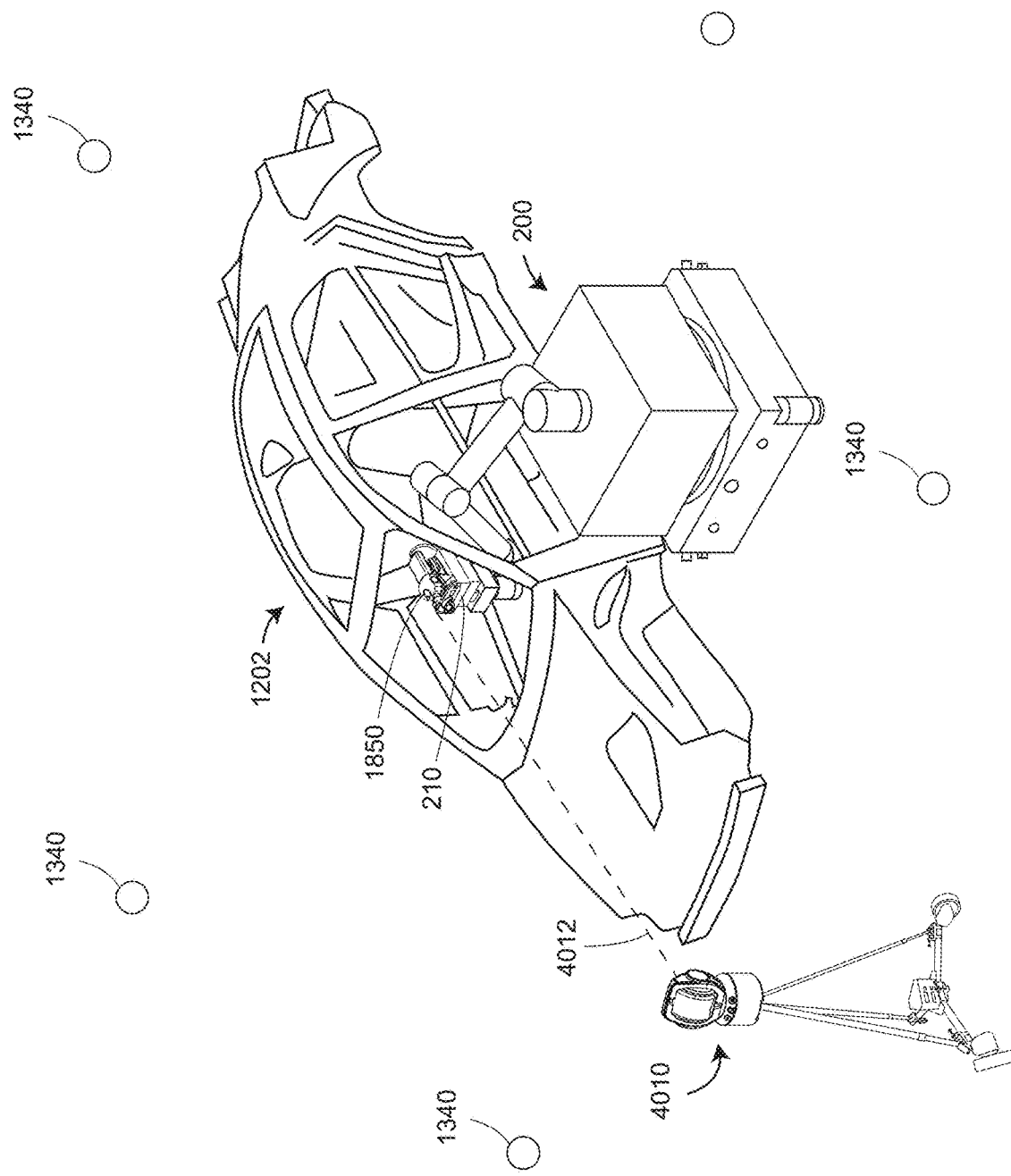
FIG. 13E shows the laser tracker measuring a six-DOF tracker target assembly while measuring a body-in-white interior with a triangulation scanner according to an embodiment.

A difficulty commonly encountered in making three-dimensional measurements of an object such as an automobile BiW 1202 is that the 3D coordinates of the inside and outside of the BiW are measured separately. Often the coordinates of the outside of an object under test are obtained using a global registration method such as registration by a laser tracker or registration by a photogrammetry system having targets that extend over the length of the object. In contrast, 3D coordinates of the interior of the object, although sometimes measurable by a laser tracker or similar device, as shown in FIG. 13E, are not generally globally measurable in the object interior. An objective of the present invention is to tie together 3D measurements made in local and global frames of reference.

FIG. 14A shows a 3D measurement device 1410 being used to measure an exterior portion of an object 1202 while being measured in six-DOF by a six-DOF measuring device 1420. Examples of possible six-DOF measurement devices include a six-DOF laser tracker such as that shown in FIGS. 13A-E and a camera bar such as that shown in FIGS. 8A-C. The use of stereo camera configurations to serve as a six-DOF measurement device are described further herein below.

FIG. 14A illustrates the collection of 3D coordinate data while the 3D measurement device 1410 is being moved. Such movement may be performed by a human operator holding and moving the measurement device. Alternatively, the movement may be performed by a 3D measurement device being held by a mechanical measurement device such as the mobile robotic platform 200 shown in FIGS. 2A, 2C, 12A, 12B, and 13B-E. Alternatively, the movement may be performed by a fixed or constrained robot configured to hold the 3D measurement device on its end effector.

FIG. 14B shows a close-up view of the 3D measuring device 1410 that includes a triangulation scanner 210 configured to measure 3D coordinates of an object as explained herein above. Attached to the triangulation scanner 210 is a six-DOF measuring device 710 configured for six-DOF measurement by a six-DOF laser tracker. Also attached to the triangulation scanner 210 is a camera assembly 1850 or 1850B for providing registration based on one of the following methods: (a) matching of natural features as illustrated in FIGS. 11A and 11D, (b) matching of artificial targets (markers) placed on or near the object as illustrated in FIG. 11B, (c) matching of projected spots of light or projected patterns as illustrated in FIG. 11C and FIG. 11F. The matching of features may be performed based on 2D camera images or 3D images obtained from a scanner or other 3D measuring device. Many other configurations are possible for the 3D measuring device 1410. One of more of the devices 210, 1850, and 710 may include a two-axis inclinometer 1490 as shown in FIG. 14B.

In FIG. 14A, the 3D measurement device 1410 measures an exterior portion of the object 1202 while its position in a global frame of reference is determined by the six-DOF measuring device 1420, which in an embodiment illustrated in FIG. 14A is a six-DOF tracker. The six-DOF tracker sends a laser beam 1422 to a retroreflector 720 in the six-DOF target 710. The laser tracker uses the return light to determine distance and two measured angles to the six-DOF target. It uses any one of a number of additional methods to determine the three orientational degrees of freedom of the six-DOF target. In an embodiment, the 3D coordinates of the object 1202 are determined by triangulation scanner 210. In other embodiments, the 3D coordinates may be measured by a tactile probe such as the probe 718 on the six-DOF target 710.

In an embodiment, the six-DOF measuring device 1420 is mounted on a mobile platform 1220. In an embodiment, the mobile platform is configured to be pushed on wheels 1222 by an operator to desired locations. In another embodiment, the mobile platform 1220 is configured to be moved under computer control by motorized wheels 1222.

Figure 14C:
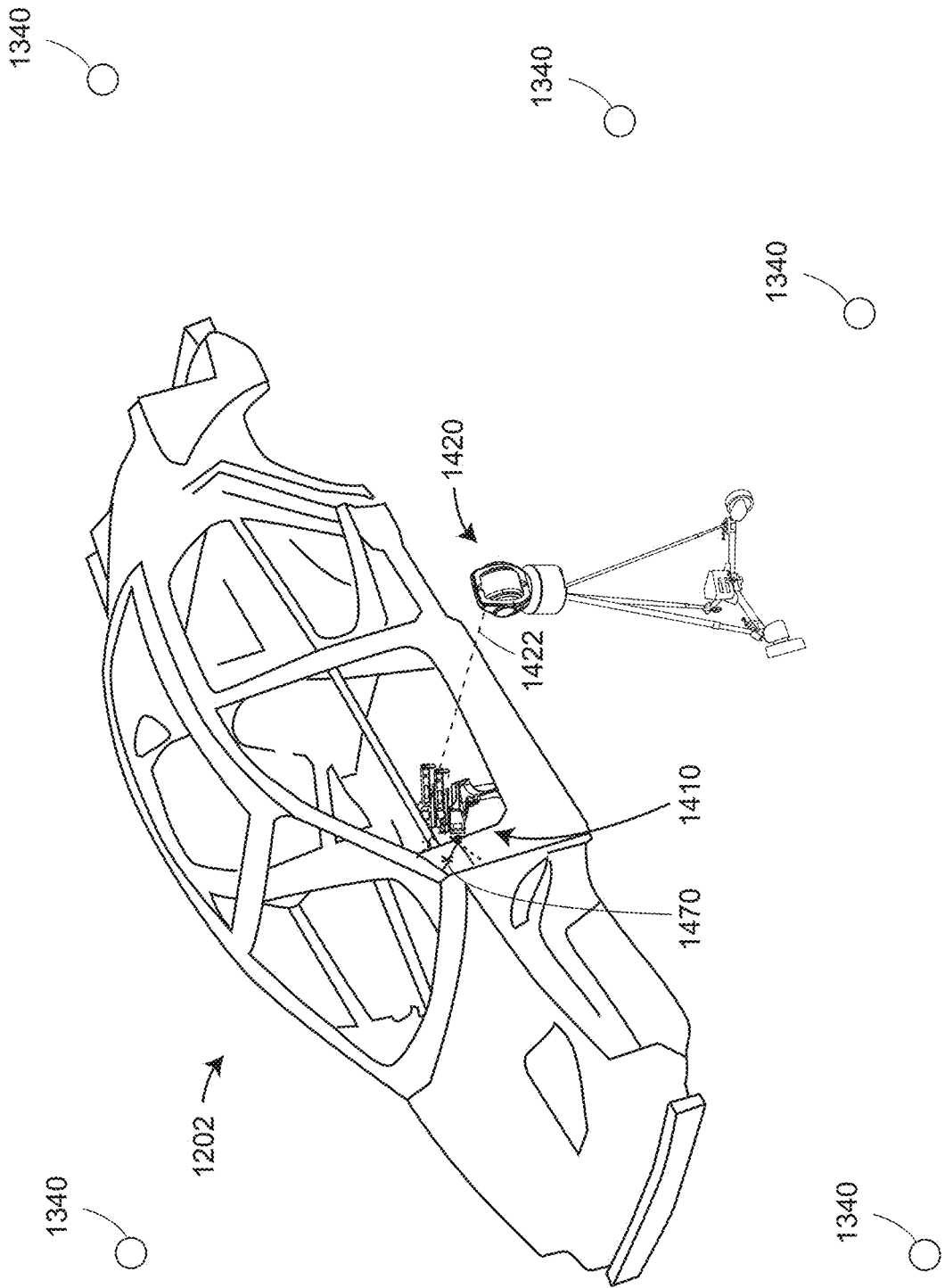
FIG. 14C shows the laser tracker tracking the 3D measurement device on an interior of the object according to an embodiment.

FIG. 14C shows the 3D measuring device 1410 measuring a portion of the object in a transition region between an exterior portion of the object 1202 and an interior portion of the object 1202. In this transition region, the 3D measuring device collects data registered both in the global frame of reference by the global registration device 1420 (six-DOF measuring device) and also in a local frame of reference by the local registration device, which in this case is the camera assembly 1850. The beam of light 1422 from the laser tracker is intercepted by a retroreflector on the six-DOF probe to obtain the global registration. The camera assembly 1850 determines 3D coordinates of at least one cardinal point 1470 in the local frame of reference of the 3D measurement device 1410. A cardinal point may be a natural feature, a target marker, or a projected spot of light, as explained herein above. A commonly used but general category for identifying cardinal points associated with natural features is referred to as interest point detection, with the detected points referred to as interest points. According to the usual definition, an interest point has a mathematically well-founded definition, a well-defined position in space, an image structure around the interest point that is rich in local information content, and a variation in illumination level that is relatively stable over time. A particular example of an interest point is a corner point, which might be a point corresponding to an intersection of three planes, for example. Another example of signal processing that may be used is scale invariant feature transform (SIFT), which is a method well known in the art and described in U.S. Pat. No. 6,711,293 to Lowe. Other common feature detection methods for finding cardinal points include edge detection, blob detection, and ridge detection. For the example of FIG. 14C, the FOV 1481 of the camera assembly 1850 encompasses the cardinal point 1470. The stereo cameras of camera assembly 1850 are sufficient to determine the 3D coordinates of the cardinal point 1470 in the frame of reference of the 3D measuring device 1410.

Figure 14D:
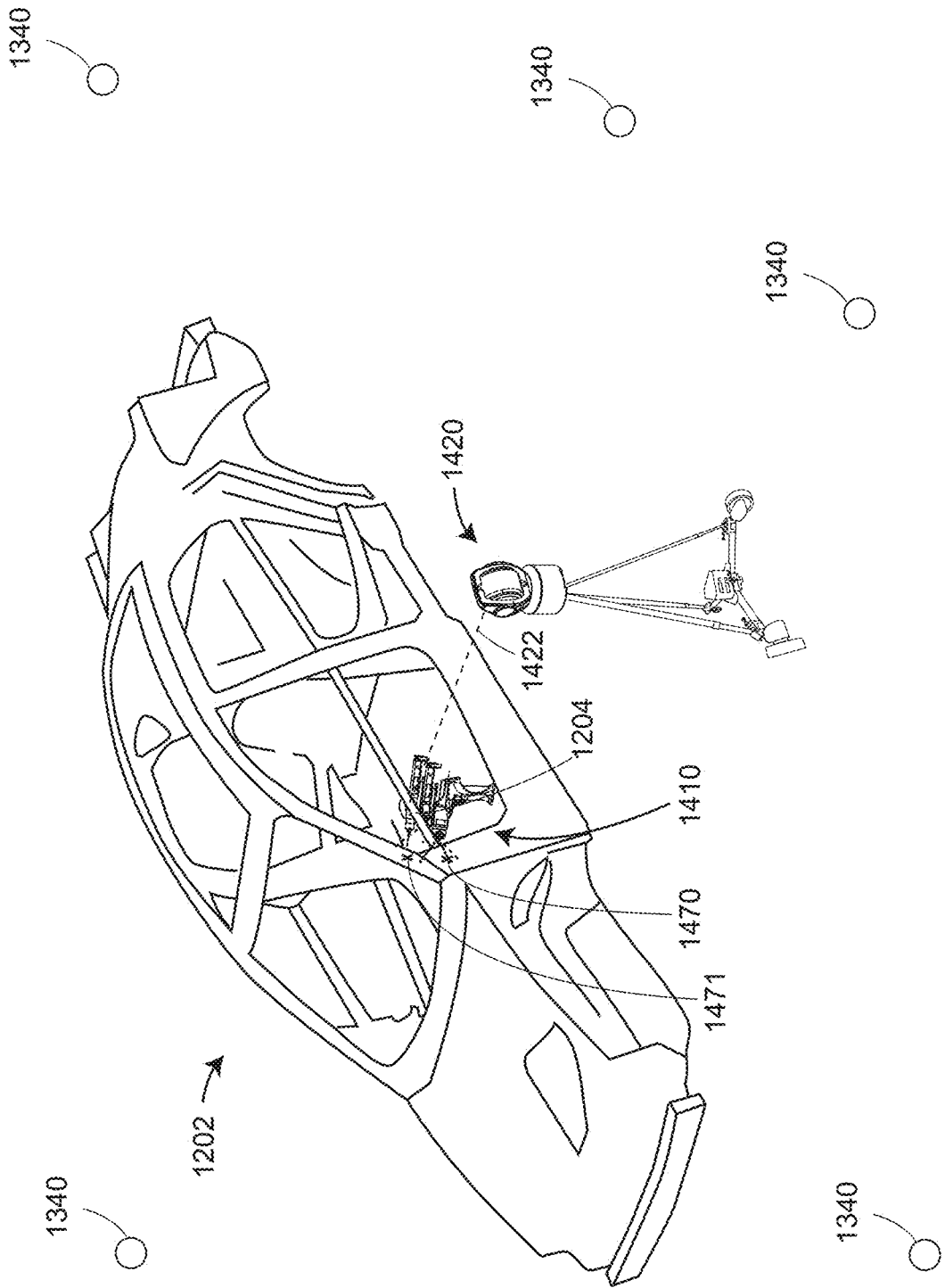
FIG. 14D shows the laser tracker having lost tracking of the 3D measurement device while the 3D measurement device continues to measure 3D coordinates of the interior of the object through the use of overlapping cardinal points according to an embodiment.

FIG. 14D shows the 3D measuring device placed out of the line-of-sight of the six-DOF measuring device 1420. The beam of light 1422 is blocked by an exterior portion 1204 of the object 1202. The 3D measuring device 1410 determines coordinates of the first cardinal point 1470 observed in FIG. 14C. In some cases, described herein below with respect to FIGS. 14L-R, continued use of the method described herein at further locations within the interior region requires at least a second cardinal point 1471.

Figure 14E:
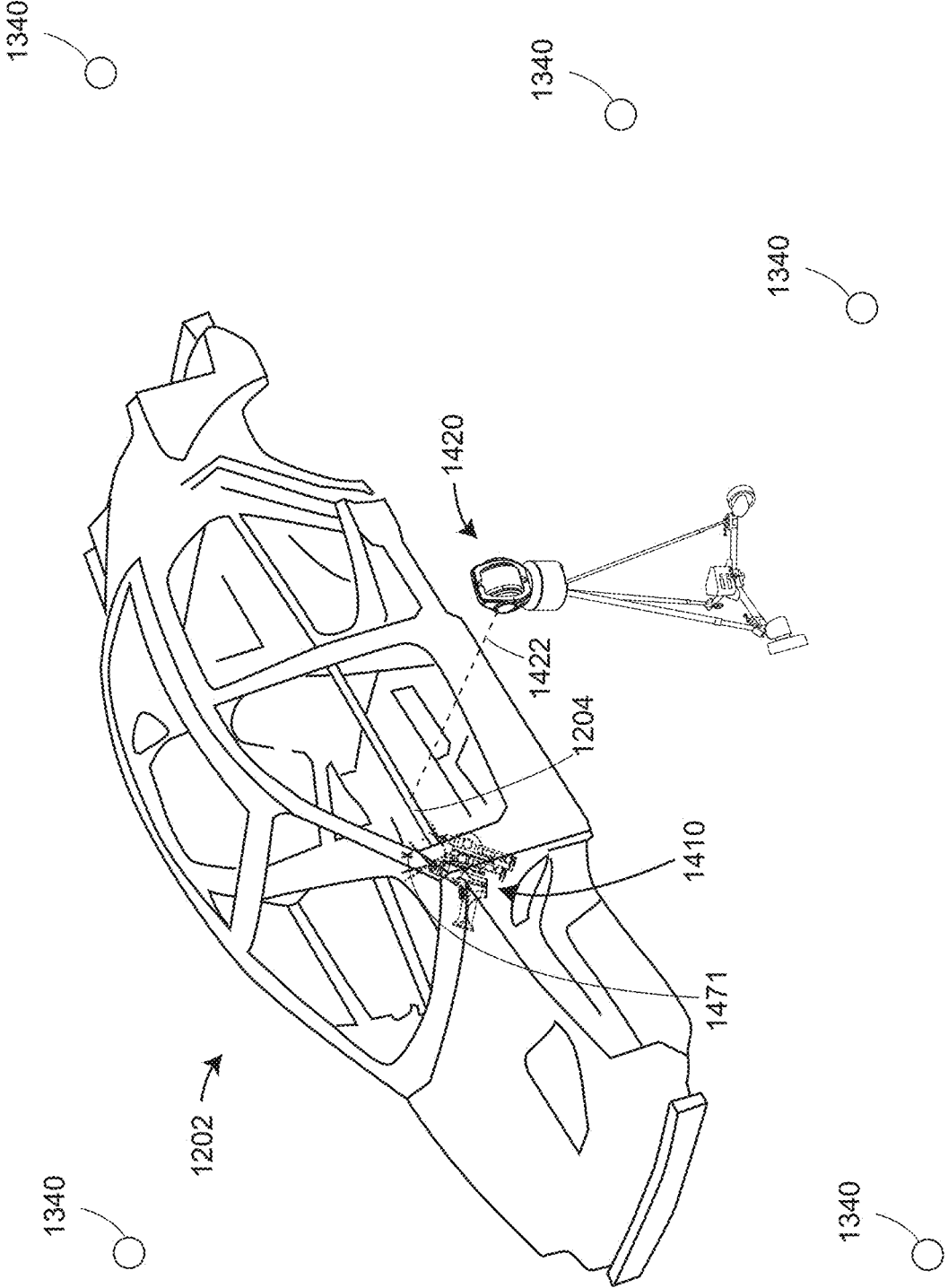
FIG. 14E shows the 3D measurement device continuing to measure the interior of the object according to an embodiment.
Figure 14F:
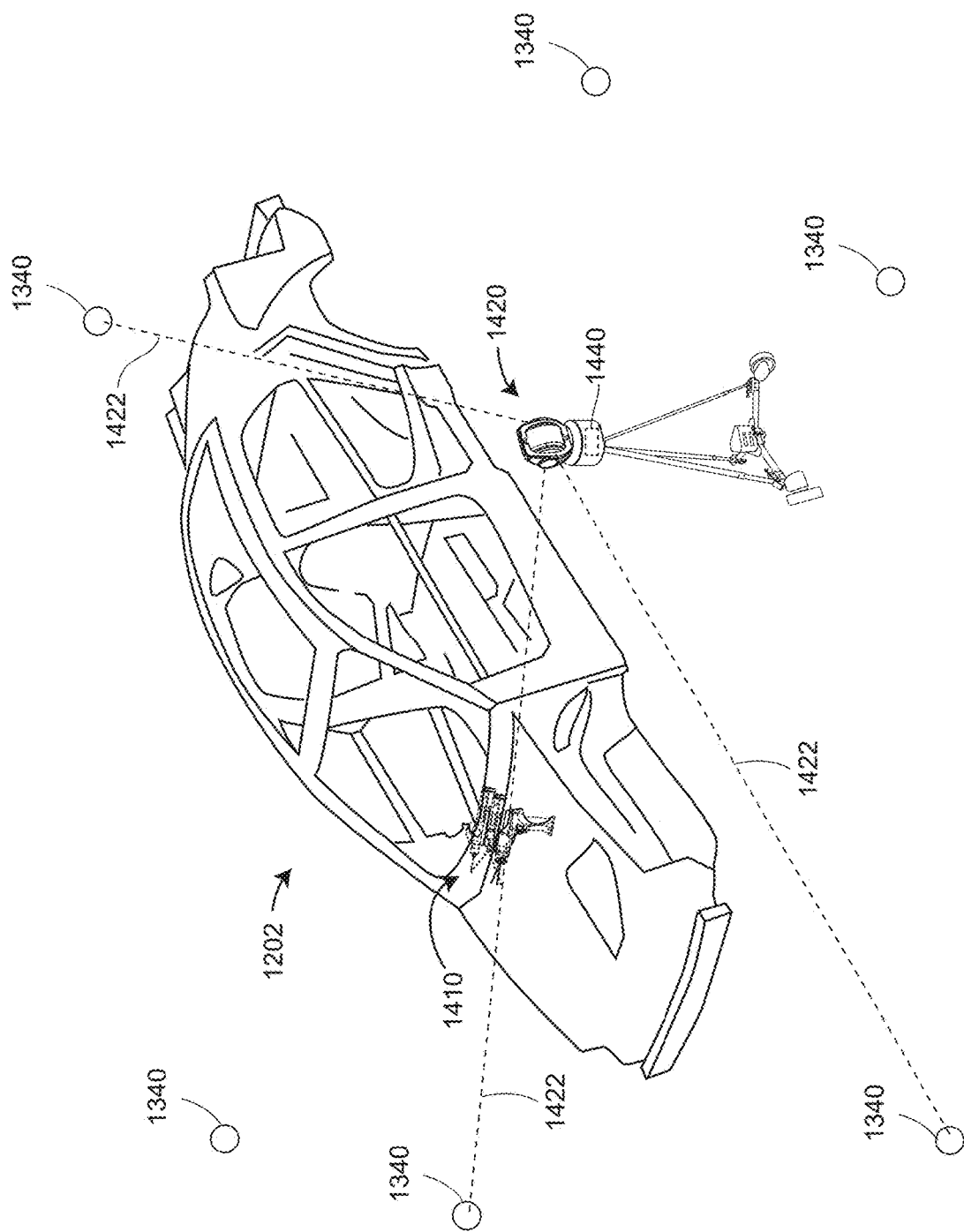
FIGS. 14F and 14G show the laser tracker measuring three common retroreflector targets in a first location and a second location according to an embodiment.
Figure 14G:
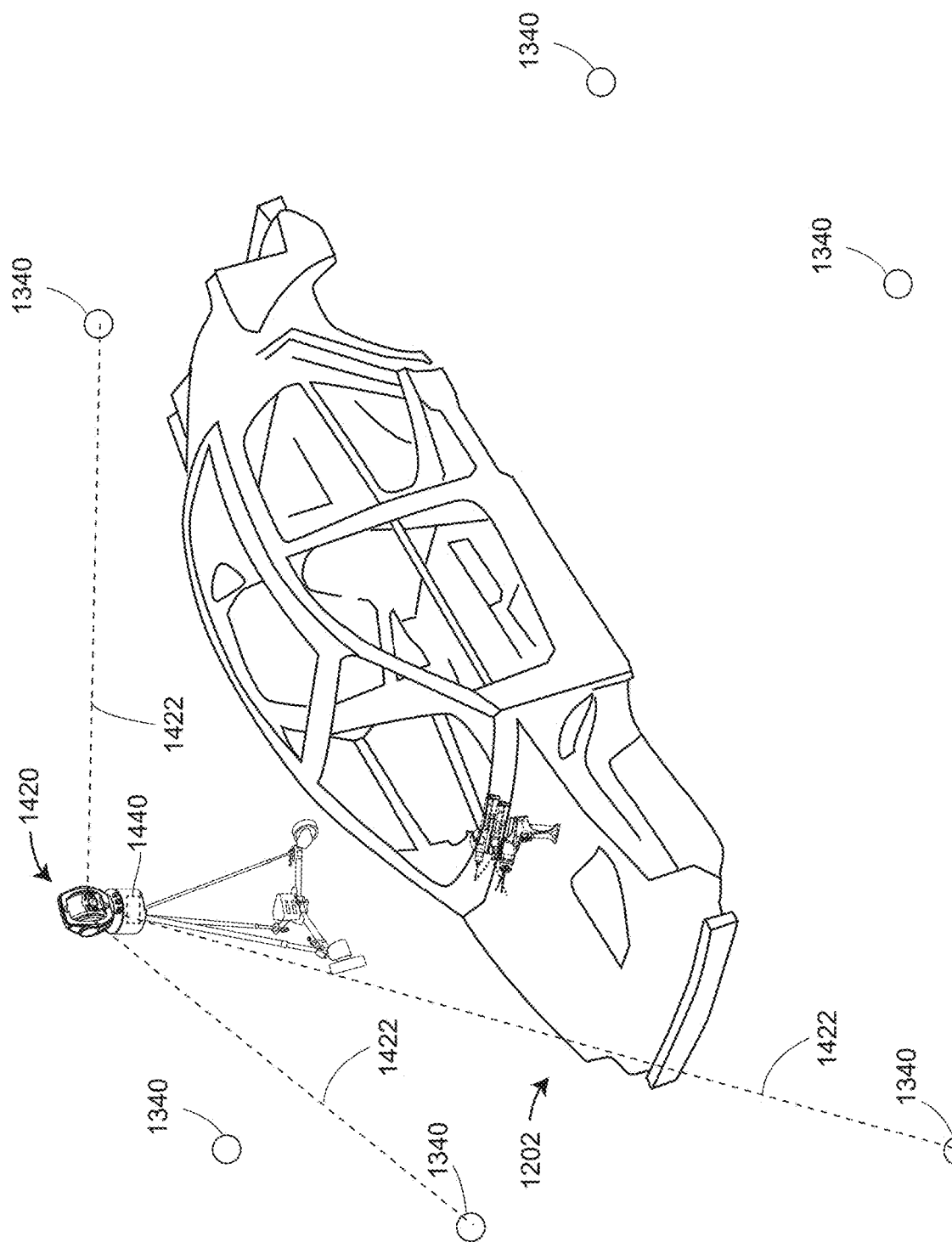
Figure 14H:
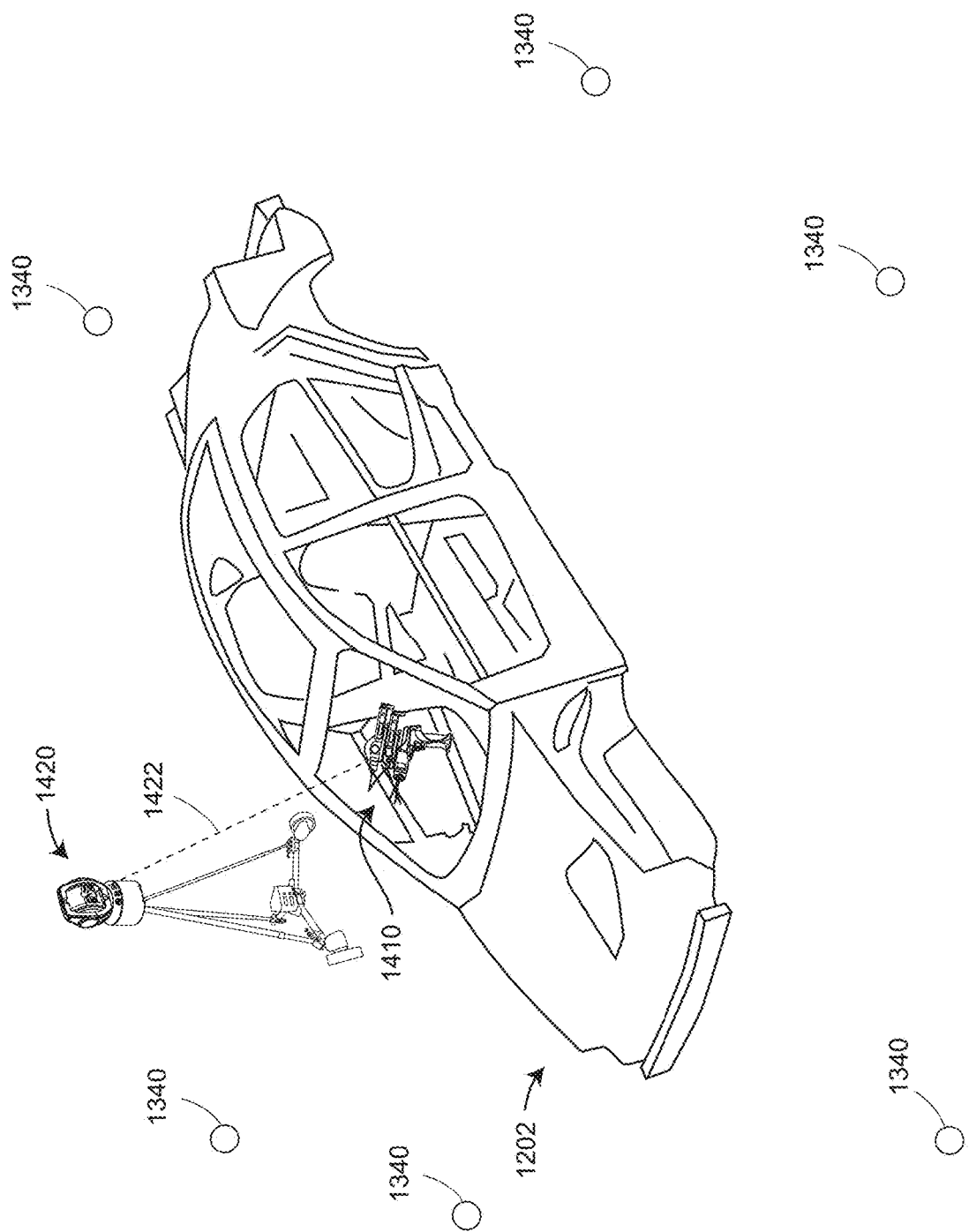
FIGS. 14H and 14I show the laser tracker re-establishing tracking of the 3D measuring device in the interior and exterior of the object, respectively, according to an embodiment.
Figure 14I:
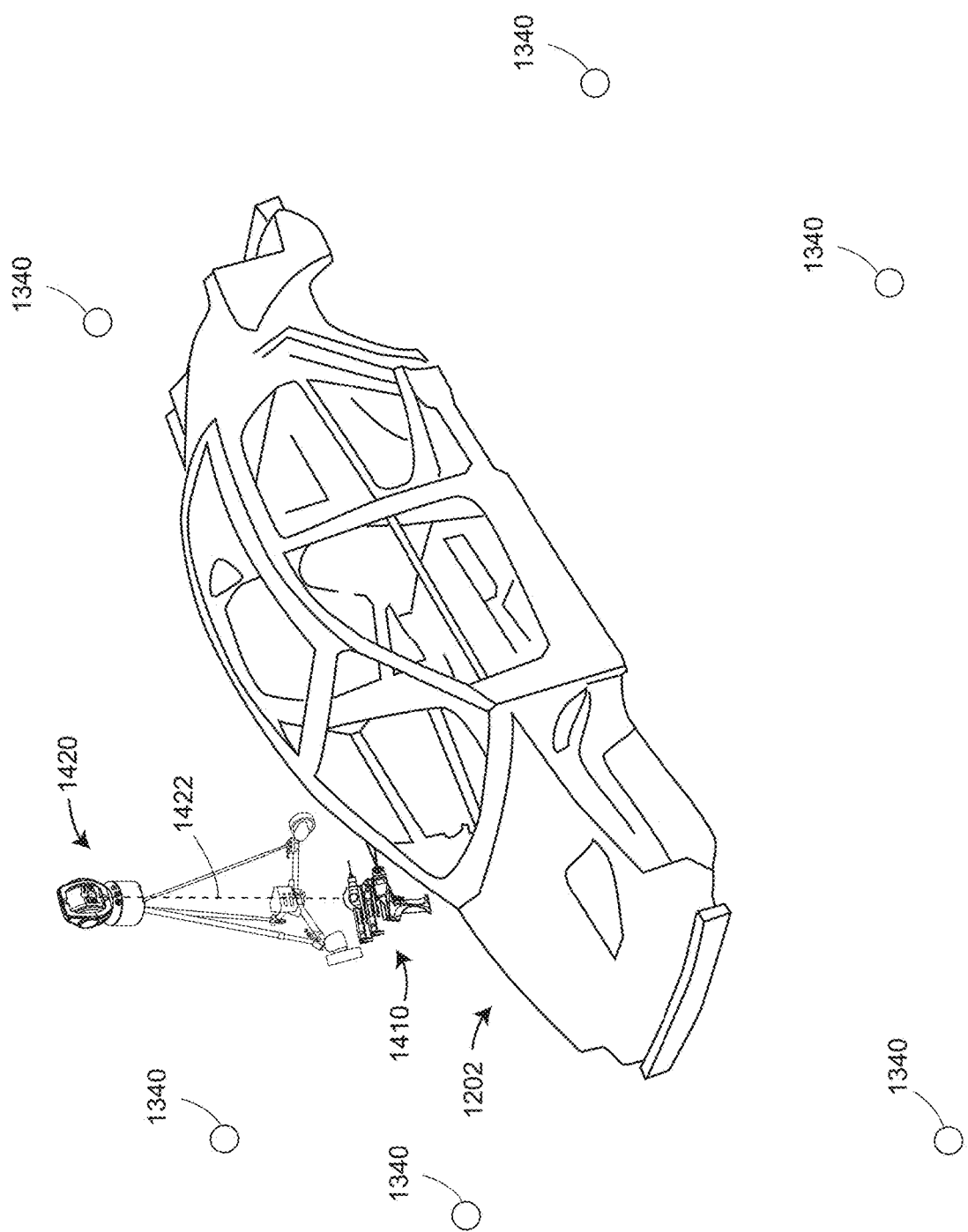
Figure 14J:
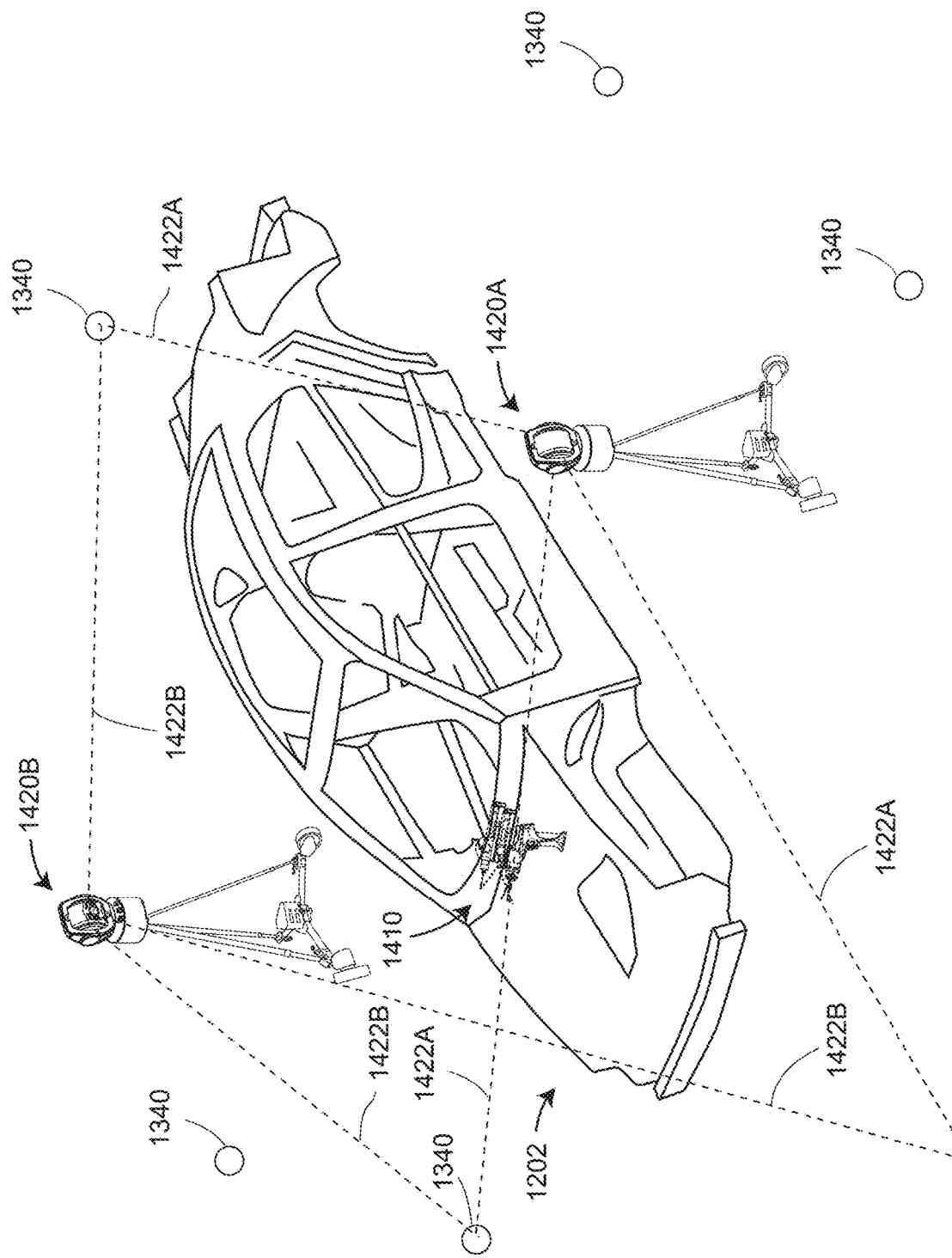
FIG. 14J shows two laser trackers establishing a common frame of reference by measuring three common retroreflector targets.
Figure 14K:
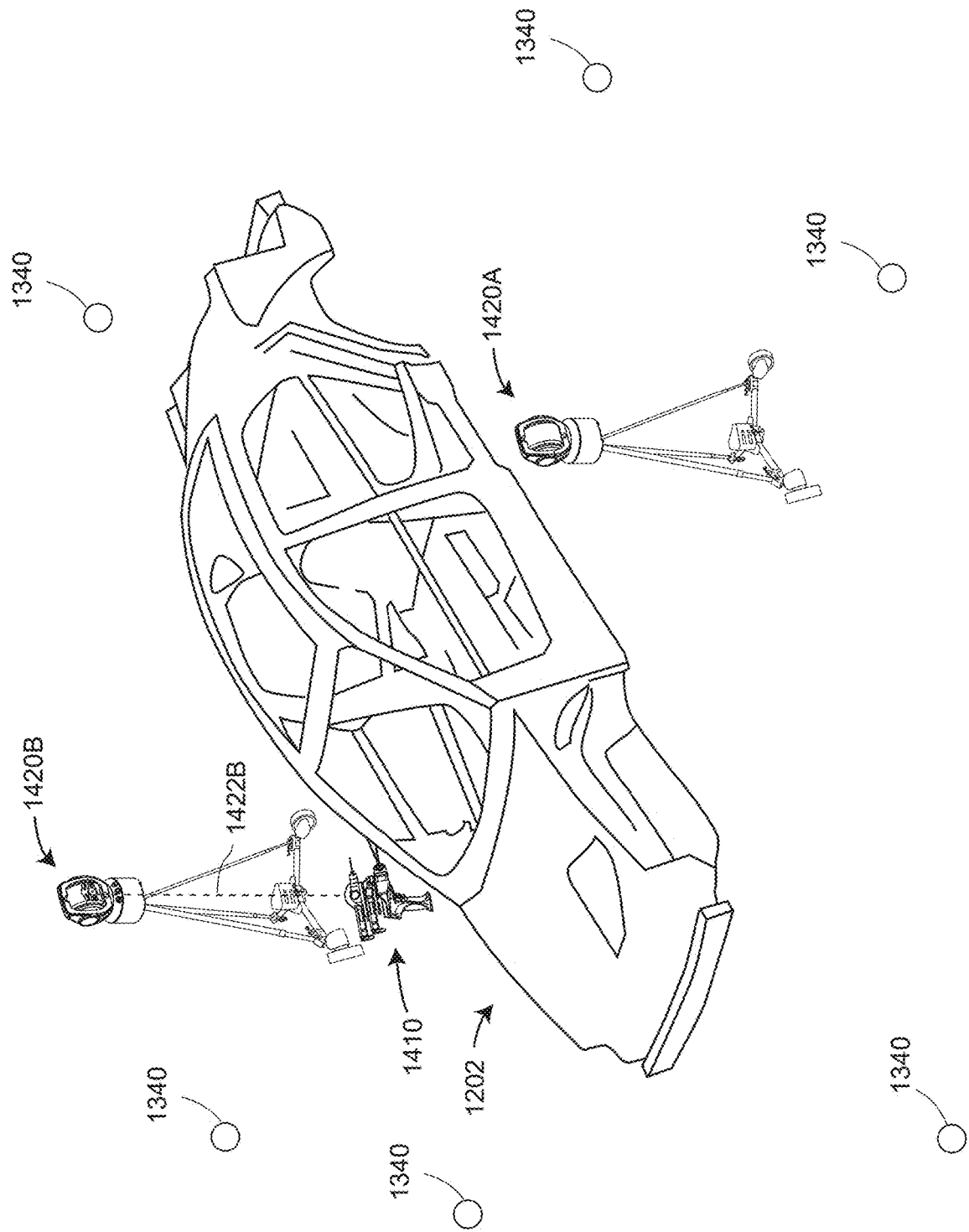
FIG. 14K shows one of the two laser trackers of FIG. 14J tracking the 3D measurement device.
Figure 14M:
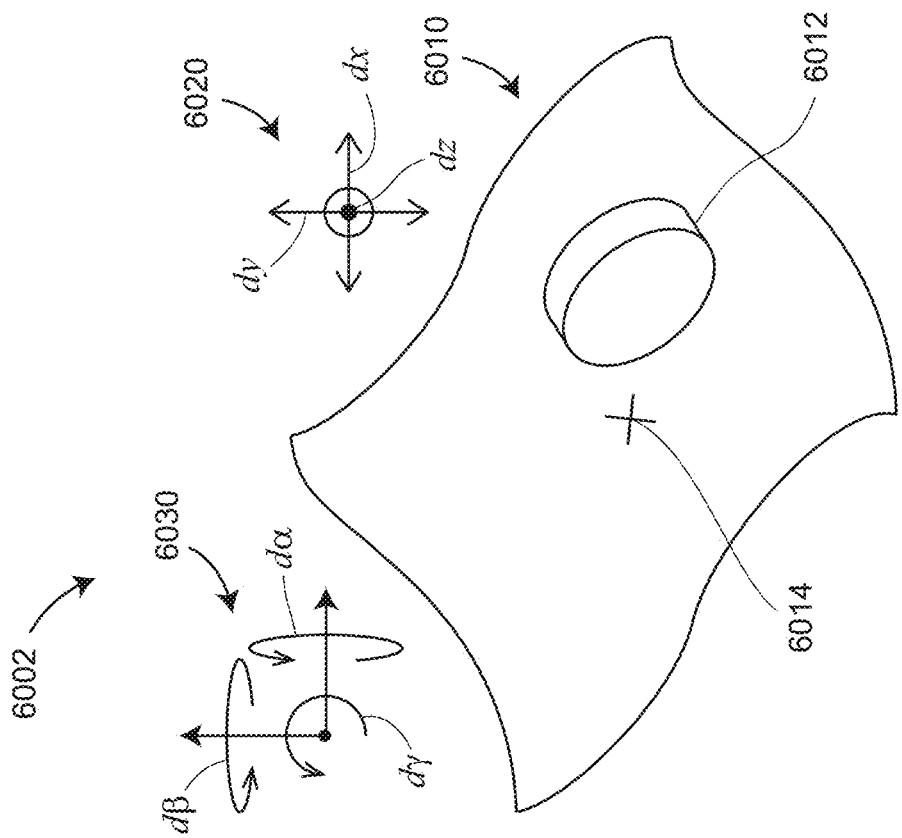
FIGS. 14L and 14M illustrate the matching of 3D area scans matched with a cardinal point combined with the scanned 3D coordinates of a feature according to an embodiment.
Figure 14L:
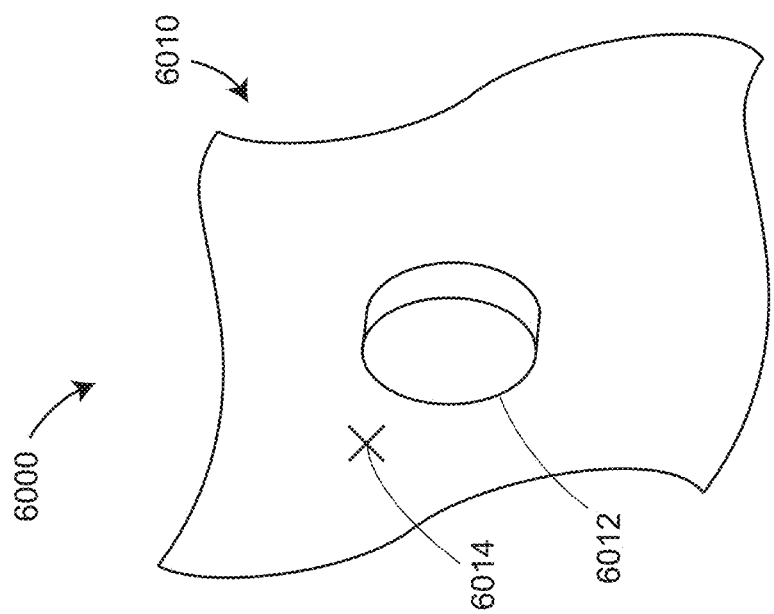

Consider now FIGS. 14L and 14M. FIG. 14L illustrates a measurement 6000 that includes a collection of 3D coordinates 6010 obtained by a triangulation scanner 210 configured to illuminate an area of the object with patterned light. In the illustrated example, the object surface includes a feature 6012 having 3D coordinates captured as a part of 3D coordinates 6010. The measurement 6000 further includes at least one cardinal point 6014, which might be measured by a camera assembly 1850 having two cameras 1853A and 1853B or by a camera assembly 1850B having a single camera 1853C. The captured 3D coordinates 6010 and either 2D or 3D coordinates of the cardinal point 6014 is representative of the situation in FIG. 14C, where the cardinal point in FIG. 14C is the point 1470.

In the situation illustrated in FIG. 14D, the 3D measuring device 1850 or 1850B may be translated and rotated relative to its position in FIG. 14C. The resulting 3D representation 6010 and cardinal point 6014 are shown in FIG. 14M. To place the 3D coordinates measured in FIGS. 14L and 14M, it is necessary to determine the amount of translation dx, dy, dz, as indicated in the coordinate system 6020, and rotation dα, dβ, dγ, as in the coordinate system 6030. The rotation angles dα, dβ, dγ are sometimes referred to as pitch, yaw, and roll angles, respectively. Other types of rotation angles may alternatively be used.

For the case illustrated in FIGS. 14L and 14M, where the 3D coordinates are measured by an area scanner, a single cardinal point 6014 obtained with a single camera 1853C may be sufficient to determine the translation values dx, dy, dz and rotation values dα, dβ, dγ. This can be understood in the following way. The cardinal point 6014 is the same point on the object in the camera images obtained in FIGS. 14L and 14M. Because the 3D coordinates 6010 include 3D coordinates of at least one feature 6012 having some structure, it is possible to determine mathematically the optimum translation and rotation to align the object measured in FIG. 14L to the object measured in 14M. For example, while keeping the points 6014 aligned in the two cases, the 3D coordinates 6010 of FIG. 14M may be shifted and rotated until an optimization criterion has been satisfied. An example of such an optimization criterion is the "least squares" criterion in which translation and rotation values are selected to minimize the sum of squared errors of the difference in 3D coordinates of the 3D surface points 6010 of FIGS. 14L and 14M. Other optimization criteria may alternatively be used.

Figure 14P:
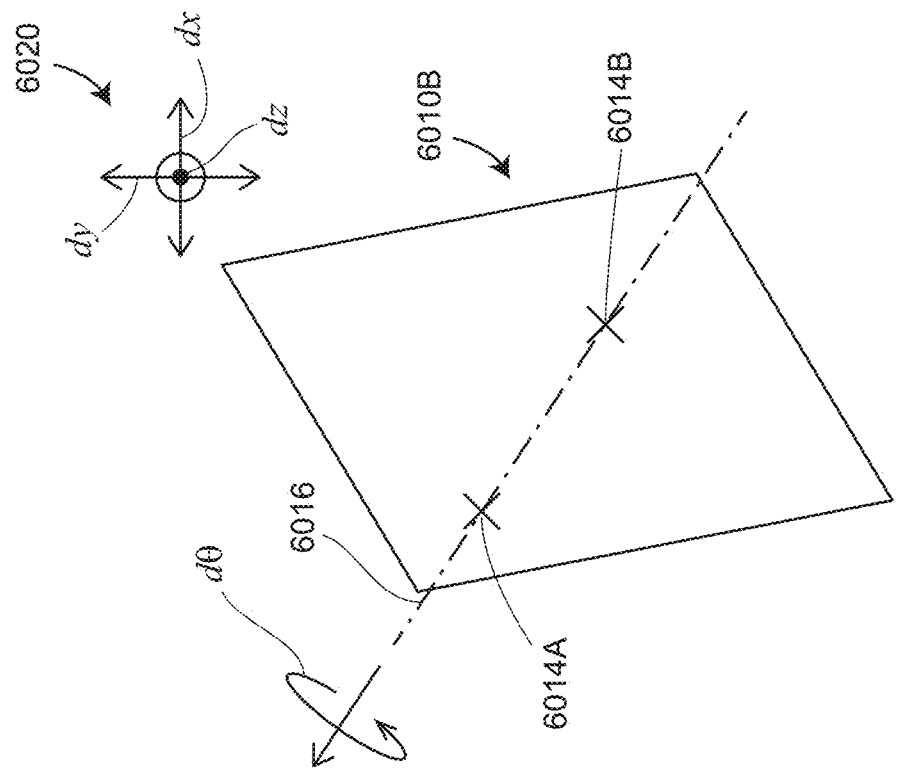
FIGS. 14N and 14P illustrate the matching of 3D area scans matched through the use of two cardinal points combined with scanned 3D coordinates of a relatively featureless area according to an embodiment.
Figure 14N:
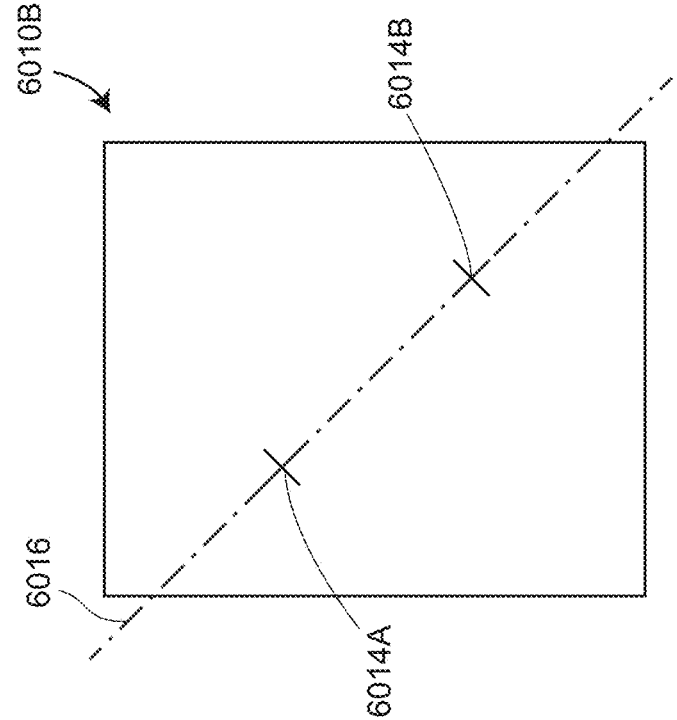

FIGS. 14N and 14P illustrate the situation in which an area scanner 210 is used to obtain 3D coordinates 6010B for a surface that is essentially flat and featureless. In this case, two cardinal points 6014A and 6014B are needed. A line 6016 may be drawn between the corresponding cardinal points 6014A, 6014B. The rotation dθ and translations dx, dy, dz are selected according to an optimization criterion. For the case illustrated in FIGS. 14C and 14D, it appears that there is considerable object structure within the FOV of the area scanner 210, and so a single cardinal point 1470 may be sufficient to align the 3D coordinates obtained in FIGS. 14C and 14D. In other measurements made by an area scanner 210, the lack of object structure, as in the case of FIGS. 14N and 14P, may require the use of two cardinal points (6014A, 6014B).

Figure 14R:
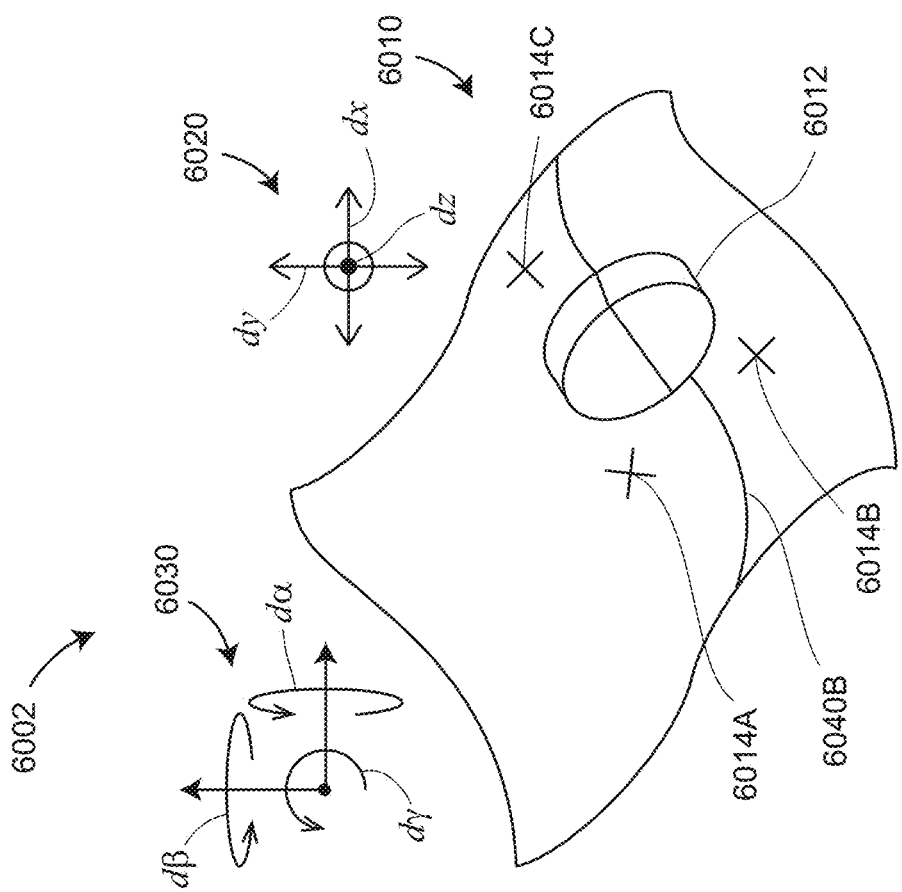
FIGS. 14Q and 14R illustrate the matching of 3D line scans through the use of three cardinal points according to an embodiment.
Figure 14Q:
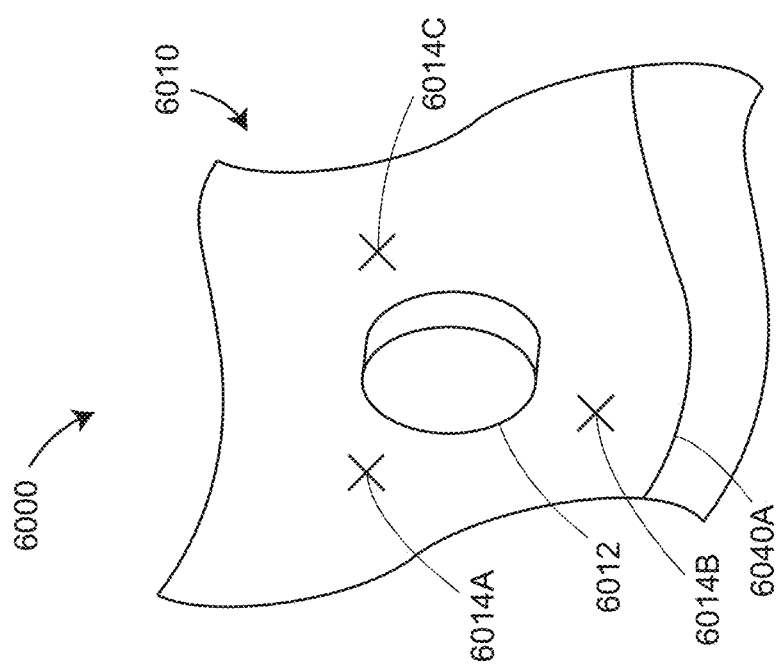

FIGS. 14Q and 14R illustrate the situation in which a line scanner 210 is used to obtain 3D coordinates. For the case illustrated in FIG. 14Q and FIG. 14R, the 3D coordinates are obtained along the paths 6040A and 6040B, respectively. These paths 6040A and 6040B indicate where the projected line intersects the object surface. A way to get the 3D coordinates for points along these paths 6040A and 6040B is to align three cardinal points 6014A, 6014B, and 6014C for the two cases. Although it is possible to use a single camera 1853C in a camera assembly 1850B or two cameras 1853A, 1853B in a camera assembly 1850, for this case illustrated in FIGS. 14Q and 14R, somewhat greater accuracy may be obtained for the two-camera case of the camera assembly 1850 as this provides for the matching of the 3D coordinates of the cardinal points.

FIG. 14E is a further measurement in which the 3D measuring device 1850 or 1850B is measuring the interior of an object. The tracker 1420 is unable to track on the retroreflector 720 of the six-DOF measuring device 710 and instead the beam of light 1422 remains fixed at its earlier position from FIG. 14D blocked by an exterior portion 1204. In the example of FIG. 14E, the cardinal point 1470 is no longer in the FOV of the camera assembly 1850 or 1850B. To retain continuity between the 3D image of FIGS. 14D and 14E, the second cardinal point 1471 is needed. By retaining at least one common cardinal point among successive scans, the 3D measuring device 1410/1410B may move from position to position within the interior of the object 1202 while retaining a common frame of reference among the scans. As explained in reference to FIGS. 14N, 14P, 14Q, and 14R, in some cases, two or three cardinal points, rather than a single cardinal point, may be needed to register multiple 3D data sets.

While the 3D measuring device 1410/1410B continues to measure the interior of the object 1202, the six-DOF measuring device 1420 may be repositioned and registered to the global frame of reference. FIG. 14F shows the six-DOF measuring device 1420 measuring a plurality of targets 1340. In an embodiment, the six-DOF measuring device 1420 is a laser tracker that measures three or more retroreflector targets such as SMRs. These measured 3D coordinates are sufficient to determine the pose of the six-DOF measuring device 1420 within a global frame of reference as long as the retroreflectors do not reside on a common plane. In an embodiment, the frame of reference is established in relation to an initial frame of reference of the six-DOF measuring device 1420. In another embodiment, the frame of reference is established in relation to the three or more targets measured by the six-DOF measuring device 1420.

In another embodiment, the six-DOF measuring device 1420 further includes a two-axis inclinometer 1440, which gives the tilt angle of the six-DOF measuring device 1420 in relation to a gravity vector. The two-axis inclinometer 1440 may further assist in locating the six-DOF measuring device 1420 in the global frame of reference.

FIG. 14G shows the six-DOF measuring device 1420 moved to a second location in the measuring volume. In this case, the six-DOF measuring device 1420 is moved to the opposite side of the object 1202. In an embodiment, the six-DOF measuring device 1420 measures the 3D coordinates of the same three targets measured by the six-DOF measuring device in the first position of FIG. 14F. These measurements are sufficient to place the six-DOF measuring device 1420 in FIGS. 14F and 14G in a common frame of reference. In an embodiment, the six-DOF measuring device 1420 is moved under computer control using motorized wheels as discussed in reference to FIG. 13A.

FIGS. 14H and 14I shows the six-DOF measuring device 1420 used to determine the position and orientation of the measuring device 1410 in the global frame of reference. At this point, a further optimization calculation may be performed to match the internal measurements made by the 3D measuring device 1410/1410B in the interior of the object to measurements made by the device of the object exterior or transition region as illustrated in FIGS. 14A, 14B, 14H, and 14I. The further optimization may use a weighting function that accounts for the relative accuracy of the measurements performed in the interior of the object to those performed in the exterior or transition regions. A comparison may also be made between the global and transition measurements made at the position illustrated in FIGS. 14H and 14I. If the discrepancy is too large, further action may be taken to resolve the discrepancy, or a warning may be given to the system or to an operator. The mathematical procedure of optimizing internal and external 3D measurements in interior and exterior portions of an object, with the 3D measuring device entering and exiting through two different openings may be considered an example of a procedure to obtain closure in the collected 3D measurement results.

FIG. 14J illustrates a method of establishing the poses of two six-DOF measuring devices 1420A, 1420B within a global frame of reference by measuring 3D coordinates of common targets 1340 with the devices 1420A, 1420B. These six-DOF measuring devices may be used to track the pose of the 3D measuring device 1410, thereby providing the same capability as the six-DOF measuring device 1340 moved to two different locations, as shown in FIGS. 14F and 14G. FIG. 14K shows the measuring device 1420B being used to track the 3D measuring device 1410.

Figure 14S:
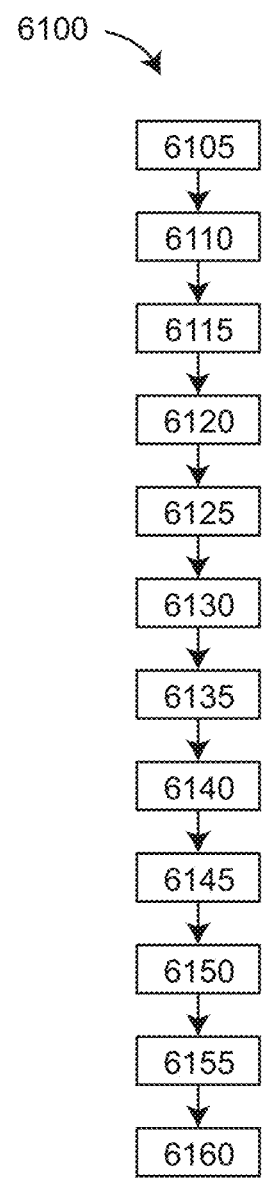
FIG. 14S is a flow chart illustrating elements of a method for registering 3D coordinates measured in an interior and an exterior of an object according to a method.

FIG. 14S is a flow chart illustrating elements of a method 6100 for determining 3D coordinates of an object according to an embodiment. An element 6105 provides a dimensional measuring device that includes a body, an overview camera, and a triangulation scanner. The triangulation scanner includes a projector and a triangulation camera with a baseline distance separating a projector perspective center of the projector from a triangulation-camera perspective center of the triangulation camera. The triangulation scanner is configured to determine 3D coordinates of the object surface by projecting a pattern of light onto the object and capturing images of the projected light with the triangulation camera. The projected light may be a two-dimensional pattern of light, either projected as a single pattern or as a sequence of patterns, for example, as a sequence of phase-shifted sinusoidal patterns. Alternatively, the projected pattern of light may be projected as a line of light. The overview camera is configured to capture 2D images of the object and, in some cases, of the object surroundings. In some cases, the overview camera is a wide-FOV camera. In some cases, the overview camera is a color camera. In some cases, the overview camera is configured to respond to wavelengths different than the wavelength of the projected pattern of light. For example, the projector may be configured to emit blue light and the overview camera configured to respond to other visible colors or to infrared light. In another case, the projector may be configured to emit infrared light and the overview camera configured to respond to a full range of visible wavelengths. The triangulation scanner and overview camera are both coupled to body. The dimensional measuring device has a device frame of reference to which measurements made by the dimensional measuring device may be referenced.

An element 6110 involves determining with a six-DOF tracking system a first position and a first orientation of the dimensional measuring device. Examples of six-DOF measuring systems include six-DOF laser trackers and six-DOF camera bars. The six-DOF tracking system is separate from the dimensional measuring device. In some cases, a combination of separate devices may be included in the six-DOF measuring system. For example, a camera bar having two or more cameras may be configured to measure the six degrees-of-freedom of the dimensional measuring device, and a laser tracker may be configured to determine the six degrees-of-freedom of the camera bar by measuring three non-collinear retroreflector targets affixed to the camera bar. In another example, two rotating cameras may be used cooperatively to determine the six degrees-of-freedom of a dimensional measuring device. The six-DOF tracking system makes measurements associated with a system frame of reference. In most cases, the system frame of reference is a stationary frame of reference, at least during the completion of a measurement depicted by the flow chart 6100.

The element 6110 is part of three elements that occur in a first instance. The second element 6115 of the first instance involves projecting with the projector a first pattern of light onto a first portion of an object and capturing with the triangulation camera a first triangulation-camera image of the projected first pattern of light on the object. The element 6120 of the first instance involves determining in the device frame of reference first 3D coordinates of a first 3D-coordinates point on the object. In most cases, the triangulation scanner will determine 3D coordinates of a large collection of points on the object, but it will determine the 3D coordinates of at least one point on the object. The term "3D-coordinates point" is used here to distinguish this type of point from an "overview point" as explained herein below with respect to later elements of the method 6100.

The elements 6125 to 6140 occur during a second instance. The element 6125 involves determining with the six-DOF tracking system a second position and a second orientation of the dimensional measuring device. By tracking the dimensional measuring device with the six-DOF tracking system, the 3D coordinates obtained by the dimensional measuring device may be registered in a common frame of reference, which in this case is the system frame of reference. Of course, the measurements in the system frame of reference may be transformed into other frames of reference having a known position and orientation relative to the six-DOF tracking system.

The element 6130 involves capturing with the overview camera a second overview-camera image of a second portion of the object and in response determining second 2D coordinates of a first cardinal point in the second overview-camera image. An overview-camera image is an image obtained by the overview camera. As explained herein above, a cardinal point may be obtained from an image of a natural feature, an artificial mark (such as an LED or a reflective target), or a projected spot of light. A cardinal point may be a type of interest point, for example, obtained using edge detection, blob detection, ridge detection, corner detection, or scale invariant feature transform (SIFT) detection.

The element 6135 involves projecting with the projector a second pattern of light onto the second portion of the object and capturing with the triangulation camera a second triangulation-camera image of the projected second pattern of light on the object.

The element 6140 involves determining in the device frame of reference second 3D coordinates of a second 3D-coordinates point on the object based at least in part on the projected second pattern of light and the second triangulation-camera image. This element is similar to the element 6120 but as a part of the second instance rather than the first instance.

The elements 6145 to 6160 occur during a third instance. The element 6145 involves positioning the dimensional measuring device so as to be inaccessible to measurement by the six-DOF tracking system. This situation occurs when the dimensional measuring device is moved to the interior of the object, thereby breaking its contact with the six-DOF measuring system. This situation is illustrated, for example, in FIGS. 14D-14G.

The element 6150 involves capturing with the overview camera a third overview-camera image of a third portion of the object and in response determining third 2D coordinates of the first cardinal point in the second overview-camera image and third 2D coordinates of a second cardinal point in the second overview-camera image. Note that the second cardinal point is observed in both the second portion of the object and the third portion of the object. Such joint observations enable registration of the 2D and 3D coordinates in the second and third portions of the object by using methods such as those discussed herein above with regard to FIGS. 14L-14R.

The element 6155 involves projecting with the projector a third pattern of light onto the third portion of the object and capturing with the triangulation camera a third triangulation-camera image of the projected third pattern of light on the object. The element 6155 involves determining in the device frame of reference third 3D coordinates of a third 3D-coordinates point on the object based at least in part on the projected third pattern of light and the third triangulation-camera image. As explained herein above with regard to FIGS. 14L-14R, the collected 3D coordinates may be used in conjunction with the identified cardinal points in registering the 3D object coordinates in the second and third portions.

The element 6160 involves determining in the system frame of reference first system 3D coordinates of the first 3D-coordinates point, second system 3D coordinates of the second 3D-coordinates point and third system 3D coordinates of the third 3D-coordinates point, the determining based at least in part on the first 3D coordinates in the device frame of reference, the second 3D coordinates in the device frame of reference, the third 3D coordinates in the device frame of reference, the second 2D coordinates of the first cardinal point, the third 2D coordinates of the first cardinal point, and the third 2D coordinates of the second cardinal point. This step takes the 3D measurements obtained by the triangulation scanner in first, second, and third portions of the object and registers them together into a common frame of reference (the system frame of reference) further based, at least in part, on the first 2D coordinates of the first cardinal point, the second 2D coordinates of the second cardinal point, and the third 2D coordinates of the third cardinal points. If sufficient 2D cardinal points are available, these 2D cardinal points may alone be used to provide the registration among successive frames. Further improvement in registration may be obtained by further matching 3D coordinate data obtained from the triangulation scanner.

Cardinal points obtained with the overview camera may be combined with the 3D coordinates obtained with the triangulation scanner to register multiple successive frames in an interior of the object. Here the term "interior of the object" is taken to mean that part of the object for which measurement of the dimensional measuring device by the six-DOF scanner has been lost because of an obstruction or other problem.

In an embodiment, the dimensional measuring device captures data for a number of portions in the interior of the object before emerging from an opening and being again measured by the six-DOF tracking device at the exterior of the object. A mathematical bundle-adjustment method may be used to optimize the data obtained in the interior and exterior of the object. Such an optimization may give measurements in the interior of the object less weight than measurements in the exterior of the object because of the relatively smaller amount of available measurement information. In a case of the dimensional measuring device entering a first opening as illustrated in FIGS. 14A-14C and exiting through a second opening as illustrated in FIGS. 14H and 14I, the mathematical method of using all the available information obtained on the interior and exterior of the object may be considered to be a type of closure measurement in which self-consistency constraints give further strength to the determined 3D coordinates.

In another method closely related to that illustrated in the flow chart of FIG. 14S, a dimensional measuring device is provided without an overview camera. In this case, the single camera in the device is used to perform both roles— (1) obtaining 2D camera images from which are extracted cardinal points for use in registration and (2) determining 3D object coordinates based on the projected pattern of light and on the image of the projected pattern of light on the object.

FIG. 15A illustrates an embodiment in which two coordinate measuring devices are used cooperatively to track a 3D measuring device 1510. The device 5110 A is a camera bar 5110 that includes a first camera 5120 and a second camera 5124, each camera having a lens and a photosensitive array, with the distance between the perspective centers of the first camera 5120 and the second camera 5124 being a stereo-camera baseline distance. The first and second cameras of the camera bar image a collection of light points, as shown in FIG. 15B, which in an embodiment includes light points 922 mounted to a structure 912 and light points 924 mounted on pedestals 926. Any pattern of light points may be used. For example, the light points may be directly attached to the triangulation scanner 210, the camera assembly 1850, or any other part of a 3D measuring device 1510. In an embodiment, the six-DOF pose (position and orientation) of the six-DOF target assembly 210 is determined based at least in part on the 3D coordinates of the light points 922 and 924, the first camera image, the second camera image, and the stereo-camera baseline image. The 3D coordinates of points on the surface of the object 1202, in the frame of reference of the six-DOF target assembly, are further determined based at least in part on a projected pattern and captured image by the triangulation scanner 210. The optional third camera 5122 may be used for a variety of purposes. In an embodiment, the camera 5122 has a wider FOV than the first camera 5120 and the second camera 5124 and is used to track the 3D measuring device 1510 outside the range of the first and second cameras.

In an embodiment illustrated in FIG. 15A, a laser tracker 1420 determines the position and orientation of the camera bar 5110 by measuring three or more non-collinear targets 5112 on the camera bar 5110. In an embodiment, the 3D targets are cube-corner retroreflectors, which may be embedded in SMRs. The 3D coordinates of the targets 5112 define the position and orientation of the camera bar within a frame of reference of the tracker 1420. The frame of reference of the laser tracker 1420 may be re-established following a move of the tracker 1420 from a first location to a second location by measuring 3D coordinates of three or more targets 1340 from the first location and the second location, as illustrated in FIGS. 14F and 14G. Alternatively, the tracker 1420 may be a six-DOF tracker and the targets 1420 six-DOF targets so that, following a move by the tracker, the tracker may re-establish its position and orientation by measuring a single six-DOF target from each of two tracker locations.

The 3D measuring device 1510 may be used in the same manner as the 3D measurement device 1410 to measure points on the exterior and interior of the object 1202, as illustrated in FIGS. 14A-14I. In an embodiment, a mobile platform 1220 that holds the laser tracker 1420 may be motorized to move the tracker under computer control. Using such a motorized mechanism the tracker may periodically move and re-establish its frame of reference to follow the camera bar 5110 as it moves around an object 1202. In this way, surface points on the exterior of the object 1202 may be collected and combined with points measured on the interior of the object through an optimization algorithm to obtain optimized 3D coordinates for the exterior and interior of the object 1202.

Figure 15C:
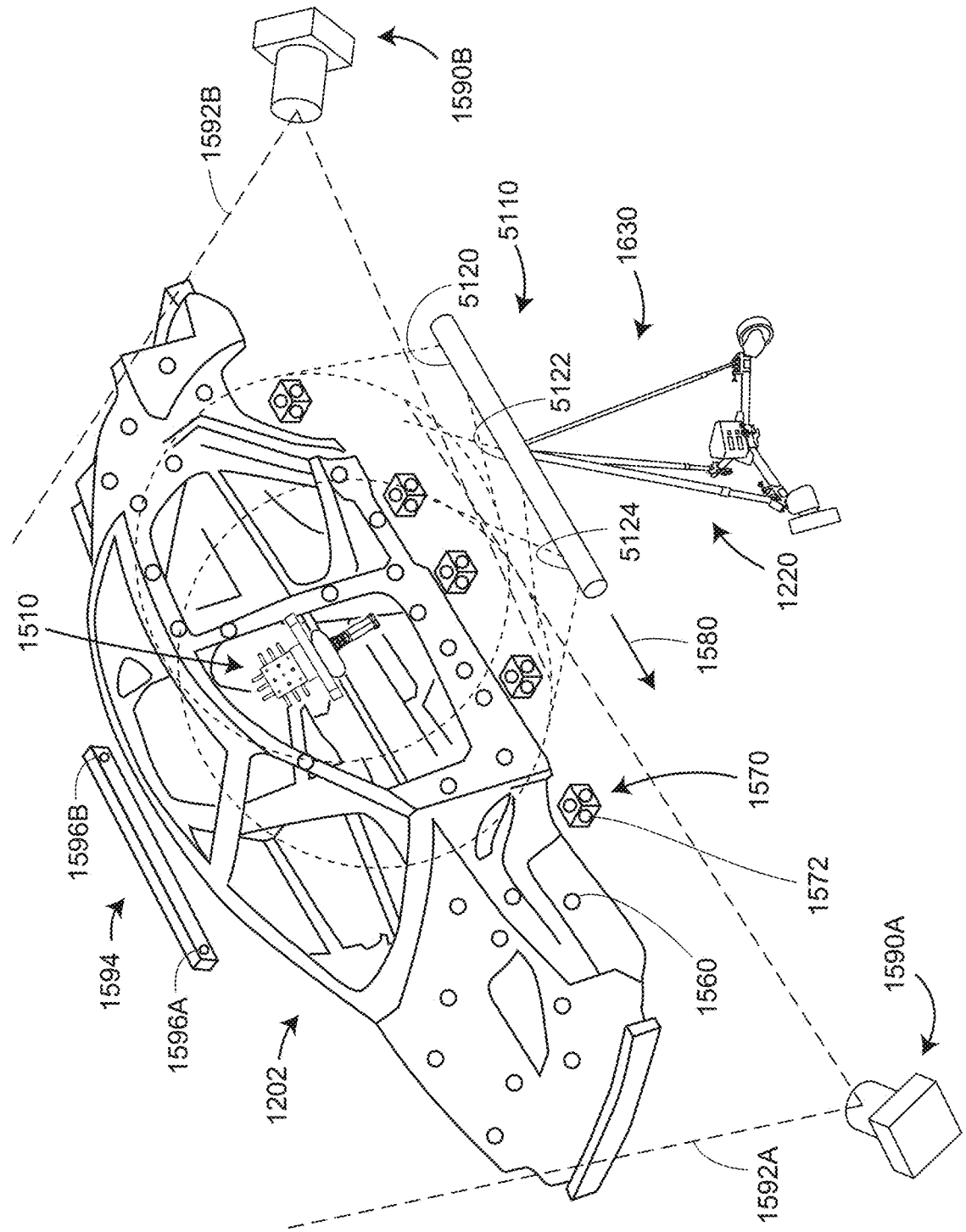
FIG. 15C shows a camera bar that establishes its frame of reference by measuring targets on or near the object, with the targets placed in a common frame of reference by two photogrammetry cameras that also measure a reference length.

In an alternative embodiment illustrated in FIG. 15C, the frame of reference of the camera bar 5110 is established at least in part by images of the target points 1560, 1572 captured by the cameras 5120, 5124. Target points 1572 may be mounted on stands 1570. In the example of FIG. 15C, some targets 1560 are located on the object and other targets are located off the object. In addition, the camera bar 5110 images the points of light 922, 924 on the 3D measuring device 1510 to obtain the 3D coordinates of points on the object 1202.

In one approach, the camera bar 5110 re-establishes its frame of reference as it moves along a path 1580 by registering the measured markers captured in successive positions. This approach relies on the overlap of successive images to piece together the complete set of targets.

In another approach, the targets 1560, 1572 are first registered together as a group using one or more photogrammetry cameras. If a single photogrammetry camera is used to obtain this registered group of targets, the photogrammetry camera is moved to a plurality of positions, and the targets combined mathematically at the end using a bundle-adjust algorithm. In a related approach, two or more cameras are used to image the targets 1560, 1572, 1596A, 1596B to obtain the registered group of targets. With either approach, a scale bar 1594 having a calibrated length between two targets is included in each image of the one or more photogrammetry cameras to provide proper scaling for the captured targets.

The camera bar 5110 may be mounted on a mobile platform 1220. The mobile platform may be pushed along by an operator along a path 1580 or moved under computer control using motorized wheels.

Figure 16:
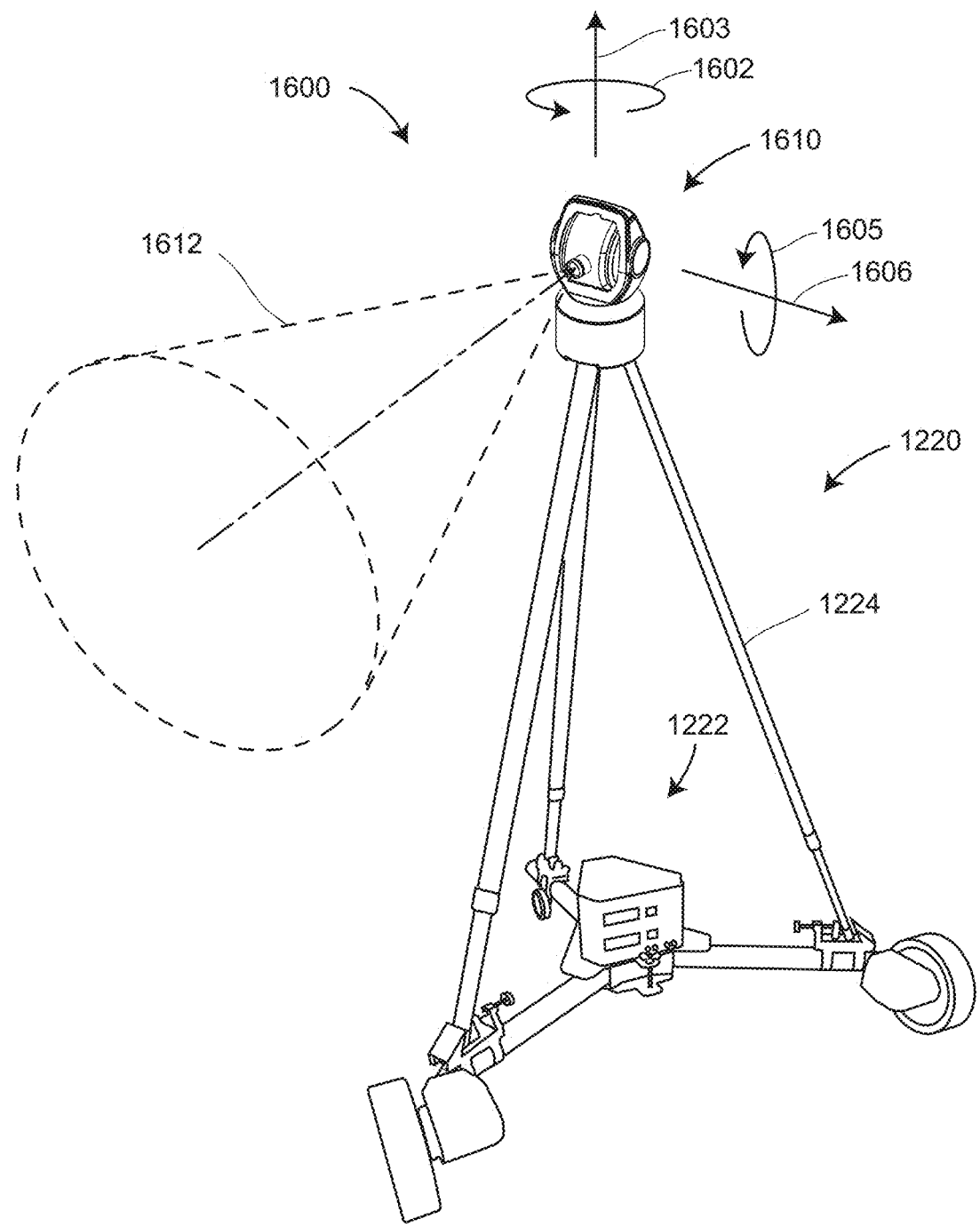
FIG. 16 is an orthographic view of a rotating camera assembly according to an embodiment.

FIG. 16 is a perspective view of a 2D imaging assembly 1600 that includes a rotating camera assembly 1610 mounted on a mobile platform 1220. In an embodiment, the mobile platform 1220 includes tripod legs 1224 and wheels 1222, which may be motorized. In an embodiment, the 2D imaging assembly 1600 is moved under computer control by motorized wheels. In an embodiment, the camera assembly 1610 is configured to rotate by a first rotation angle 1602 about a first axis 1603 and by a second rotation angle 1605 about a second axis 1606. In an embodiment, a first motor and a second motor rotate the camera about the first axis and the second axis, respectively. In an embodiment, the first rotation angle is measured by a first angle transducer and the second rotation angle is measured by a second angle transducer. In an embodiment, the first angle transducer and the second angle transducers are angular encoders having an accuracy of approximately 5 microradians. The rotating camera assembly 1610 has a FOV 1612 that may be aimed into a variety of directions using the first motor and the second motor.

Figure 17A:
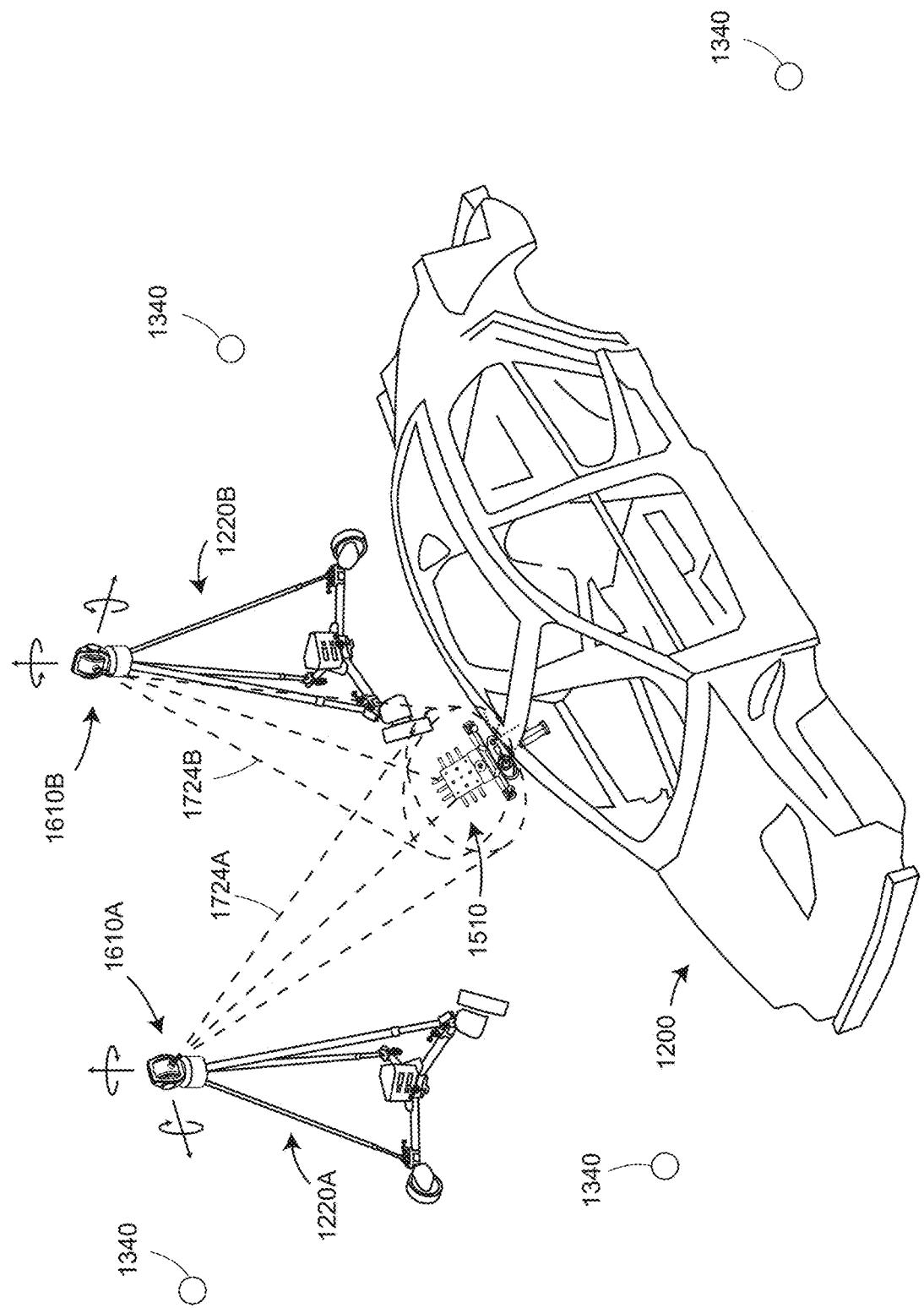
FIG. 17A illustrates two rotating cameras used to track the pose of a 3D measuring device that includes light marks according to an embodiment.

FIG. 17A shows a first rotating-camera assembly 1610A and a second rotating-camera assembly 1610B being used in a stereo configuration to determine the pose (position and orientation) of the 3D measuring assembly 1510. To have enough information to perform the stereo triangulation calculation, it is necessary to determine the pose of the first rotating-camera assembly 1610A relative to the second rotating-camera assembly 1610B. The pose may be determined using a variety of methods. Three such methods are illustrated in FIGS. 17E, 17F, and 17G.

In FIG. 17E, the 2D imaging assemblies 1600A, 1600B include target markers 1740, which may be light source such as LEDs or reflective markers, for example. The markers 1740 on each of the 2D imaging assemblies are non-coplanar. Each of camera assemblies 1610A, 1610B measures the 3D coordinates of each of the markers on its opposite 2D imaging assembly. If needed, the camera assemblies 1610A, 1610B may rotate the cameras to view each of the markers 1740. The combined images obtained by the first and second camera assemblies, 1610A and 1610B, respectively, are used to determine the relative pose of the camera assemblies. This relative pose will provide the baseline distance between the perspective centers of the first and second camera assemblies, as well as the relative orientations of the first and second camera assemblies. With the relative pose of the first and second camera assemblies known, the two camera assemblies may be used to make 3D stereo camera measurements. If desired, the first and second camera assemblies 1610A, 1610B may be placed in a common frame of reference by using the cameras to measure three or more of the targets 1340, as in FIG. 17B.

In FIG. 17F, the rotating camera assemblies 1610A, 1610B are used to measure a collection of targets 1752 on a target plate 1750. The targets may be reflective dots or LEDs, for example. In an embodiment, the target plate 1750 is mounted on a mobile platform 1220, which is moved under computer control using motorized wheels to a plurality of locations to enable greater accuracy in determining the relative pose of the rotating camera assemblies 1610A, 1610B.

In FIG. 17G, a light bar 1760 has a base 1762 on which are mounted two or more targets 1766, which might be reflective spots or LEDs, for example. The light bar 1760 is moved by a robotic arm 1764 of a mobile measurement platform 100 into a variety of locations and positions to determine the relative pose of the rotating camera assemblies 1610A, 1610B.

Figure 17B:
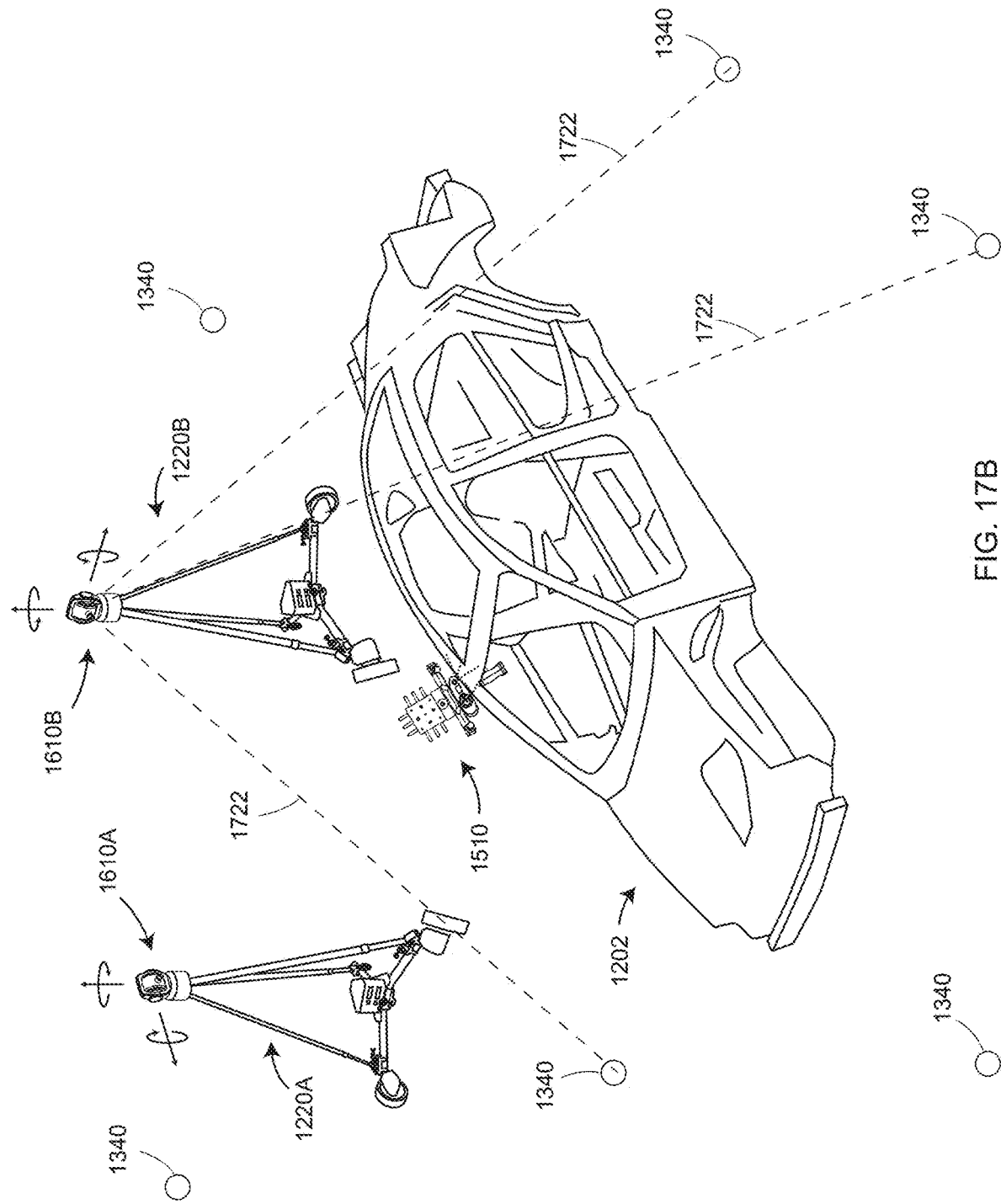
FIGS. 17B and 17C illustrate two rotating cameras used to measure three or more targets having known 3D coordinates to re-establish the frame of reference of the rotating camera in moving to the location of FIG. 17C according to an embodiment.

If the 3D coordinates of targets 1340, as in FIG. 17B, are known within a frame of reference, then it would be possible to use two rotating camera assemblies 1610A, 1610B to determine their relative pose by measuring three or more targets with each of the rotating camera assemblies 1610A, 1610B. The 3D coordinates of such targets 1340 may be initially determined, for example, by a laser tracker or by two stereo cameras having a known relative pose.

The use of two rotating-camera assemblies 1610A, 1610B has some advantages compared to cameras placed on a fixed camera bar. The cameras 1610A, 1610B may each have a relatively small FOV 1612 while maintaining a relatively large measurement volume since the rotating-camera assemblies can be rotated to any desired direction. This improves the lateral resolution of measured objects. In addition, the rotating camera assemblies can be placed relatively far apart, which provides a relatively large baseline that allows 3D measurements to be made at relatively large distances with relatively high accuracy. A potential advantage is that a pair of rotating camera assemblies 1610A, 1610B may cover a relatively large measurement volume without the need to move the assemblies.

In FIG. 17A, the two rotating camera assemblies 1610A, 1610B capture images of the lights 922, 924 on the 3D measuring device 1510. A triangulation calculation is performed to determine the position and orientation of the 3D measuring device 1510. The rotating-camera assemblies 1610A, 1610B track the 3D measuring device 1510 over the camera FOVs 1724A, 1724B. At the same time, the triangulation scanner 210 projects a pattern onto the object that enable 3D coordinates of the object surface to be determined.

Figure 17C:
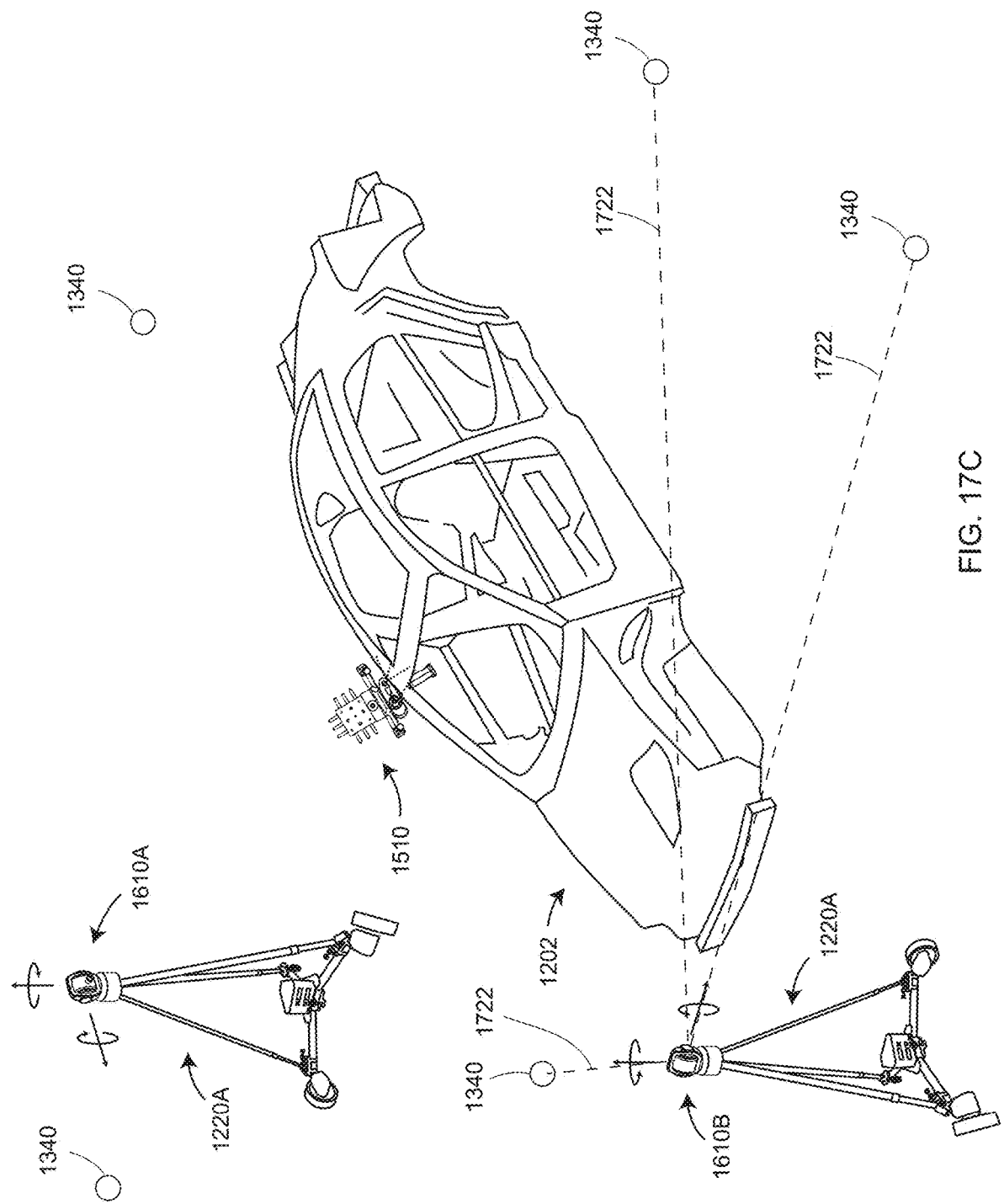
Figure 17D:
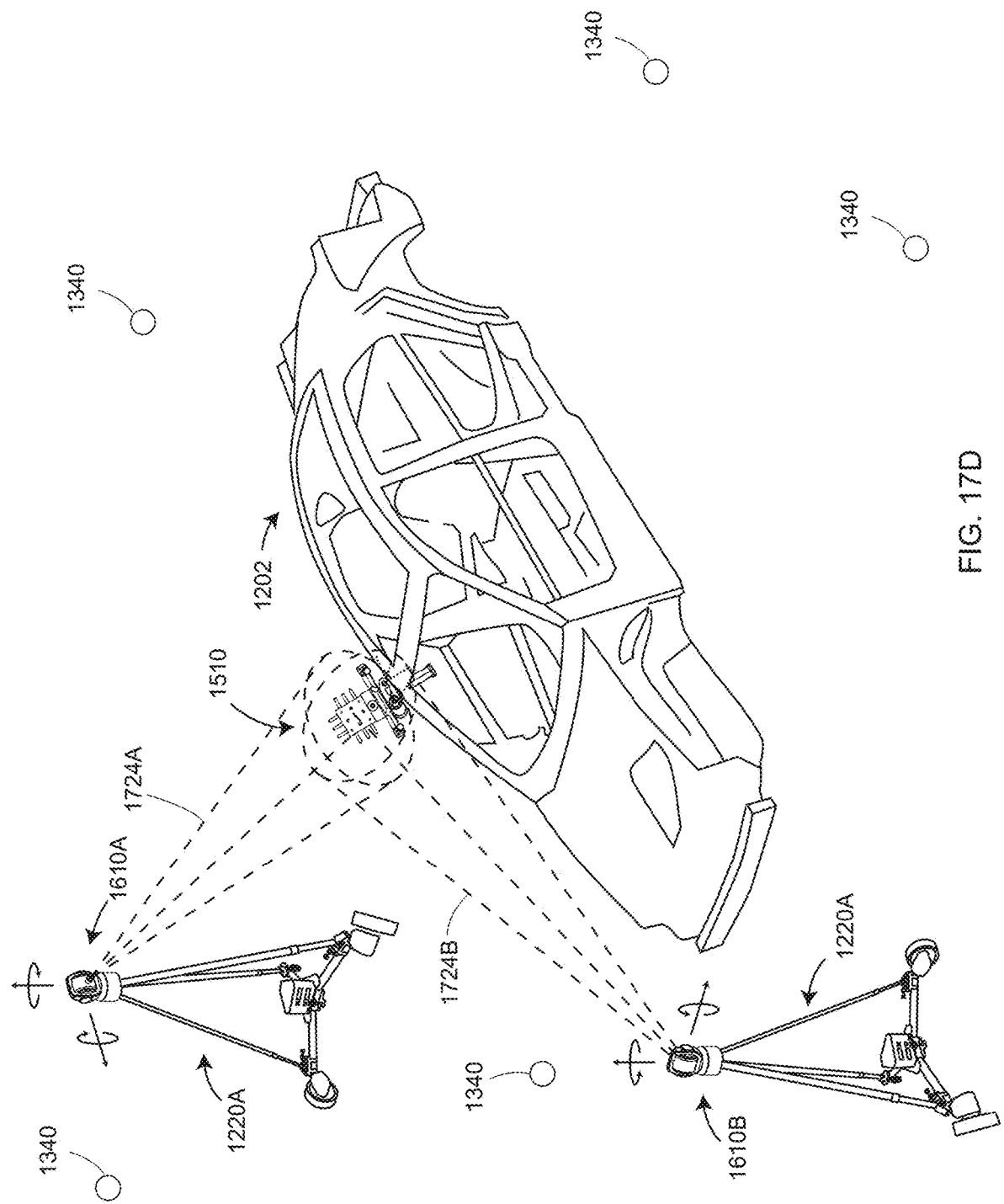
FIG. 17D shows the two rotating cameras again tracking the 3D measuring device following the move according to an embodiment.

The 3D coordinates of the targets 1340 may be found using methods described herein above. The rotating cameras 1610A, 1610B may then be relocated from the positions of FIGS. 17A, 17B to the positions of FIGS. 17C, 17D while staying in a common frame of reference. This may be done by measuring three common targets 1340 with the rotating camera 1610B as illustrated in FIGS. 17B, 17C. Using this method, the measurements of the object by the 3D measuring device 1510 in FIG. 15A may be resumed in the same frame of reference in FIG. 15D.

FIG. 18A illustrates a handheld area scanner 7000. In an embodiment, the scanner 7000 includes a handle 7004 and a body 7002 in which are embedded a first camera 7010A, a second camera 7010B, a projector 7020, and an auxiliary camera 7012. In an embodiment, the first camera 7010A, the second camera 7010B, and the projector 7020 are arranged in a triangle 7025. In an embodiment, the projector 7020 projects light through a diffractive optical element to form a collection of spots, at least some of which may be indistinguishable from the other spots. In an embodiment, geometrical epipolar constraints obtained from the triangular pattern 7025 of the first camera, second camera, and projector provide three sets of equations that are solved simultaneously to assist in identifying the spots, which may otherwise be indistinguishable. Such an approach enables a high density of points to be projected onto an object, thereby improving measurement resolution and accuracy. In an embodiment, the projected spots are in the infrared region of the optical spectrum, in other words, at a wavelength longer than 700 nm. In an embodiment, the auxiliary camera 7012 is configured to capture images in the visible region, at wavelengths between 400 and 700 nm. In an embodiment, the auxiliary camera has a wider FOV than the first and second cameras. In an embodiment, the auxiliary camera identifies cardinal points to enable registration of successive images from the scanner 7000.

In an embodiment, one or more tactile probes are added to the scanner 7000B. FIG. 18B shows an embodiment in which two tactile probes 7030A and 7030B are added to the scanner 7000B. The probes 7030A, 7030B include a probe tip 7032A, 7032B, respectively, and a probe shaft 7034A, 7034B, respectively. The probe shafts 7034A, 7034B are attached to the probe body with probe connectors 7036A, 7036B (not shown) which may enable the probes to be removed and reinstalled as needed.

Figure 18C:
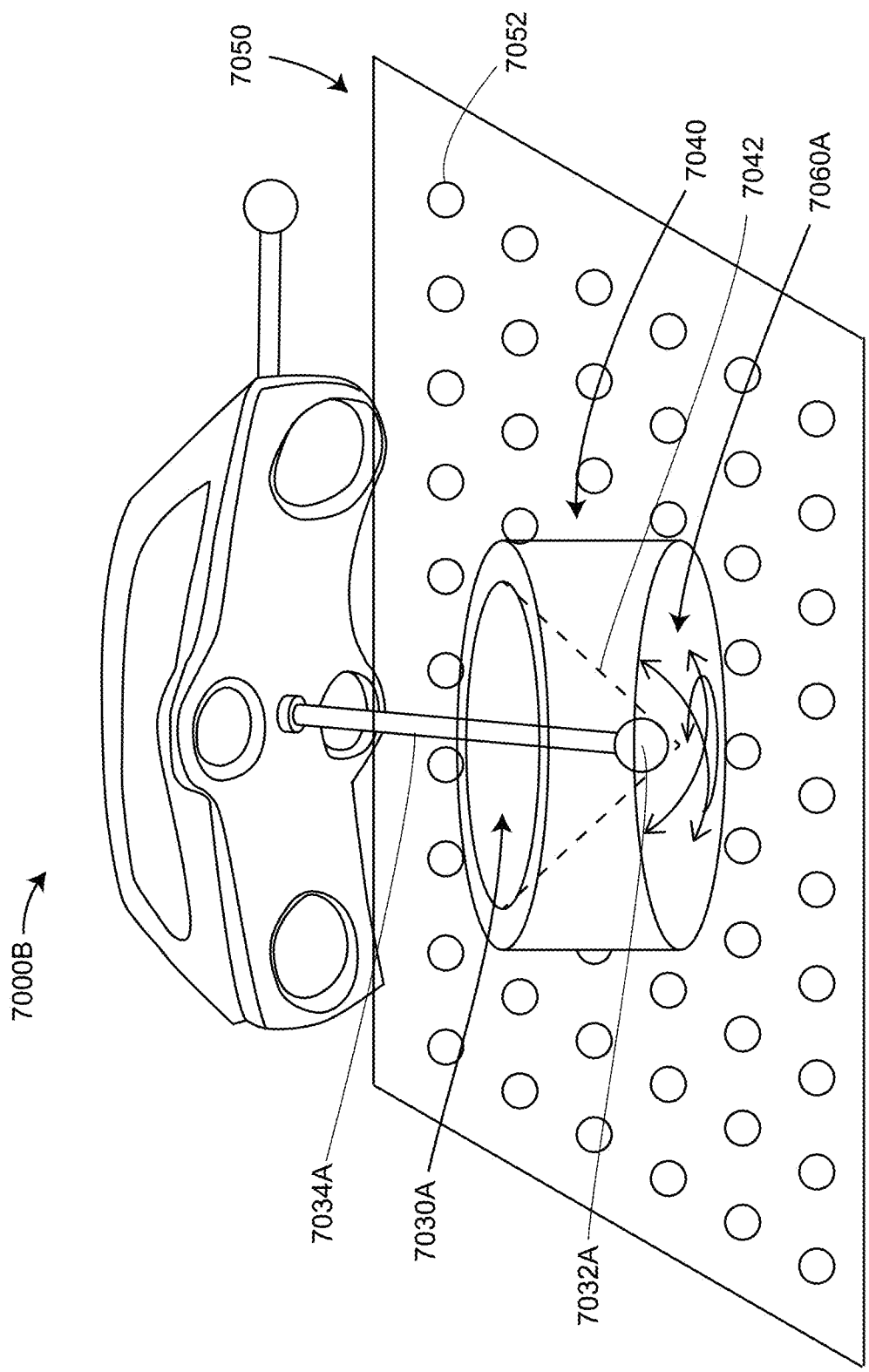
FIGS. 18C and 18D show an area scanner having first and second probes, respectively, compensated through the use of a kinematic nest and a background pattern according to an embodiment.

FIG. 18C illustrates a method of compensating or calibrating the probe 7030A. Such compensation (calibration) places the probe tip 7032A within the frame of reference of the scanner 7000B. In an embodiment, a kinematic nest 7040 is provided. With the probe tip 7032A seated in the kinematic nest 7040, the probe may be rotated into any direction without changing the center of probe tip 7032A. In an embodiment, the kinematic nest 7040 is placed on a surface 7050 that includes pattern of marks 7052 that may be viewed by auxiliary camera 7012. In another embodiment, the surface 7050 is unmarked and received spots projected by the projector 7020. In another embodiment, the surface 7050 may only be seen by the auxiliary camera 7012 so that all three cameras 7010A, 7010B, 7012 and the projector 7020 may all be used in the compensation procedure. By viewing the position of the marks on the surface as the probe shaft is rotated to different angles 7060A, the relative position of the probe tip may be determined.

The kinematic nest may be constructed in several different ways. It may include three small spheres on which the probe tip 7042 sits. It may be a trihedral hollow, consisting of three flat angled surfaces configured in a conical arrangement to make contact with the probe tip 7032. It may be a simple cone 7042 as illustrated in FIG. 18C. Other types of nests are also possible.

Figure 18D:
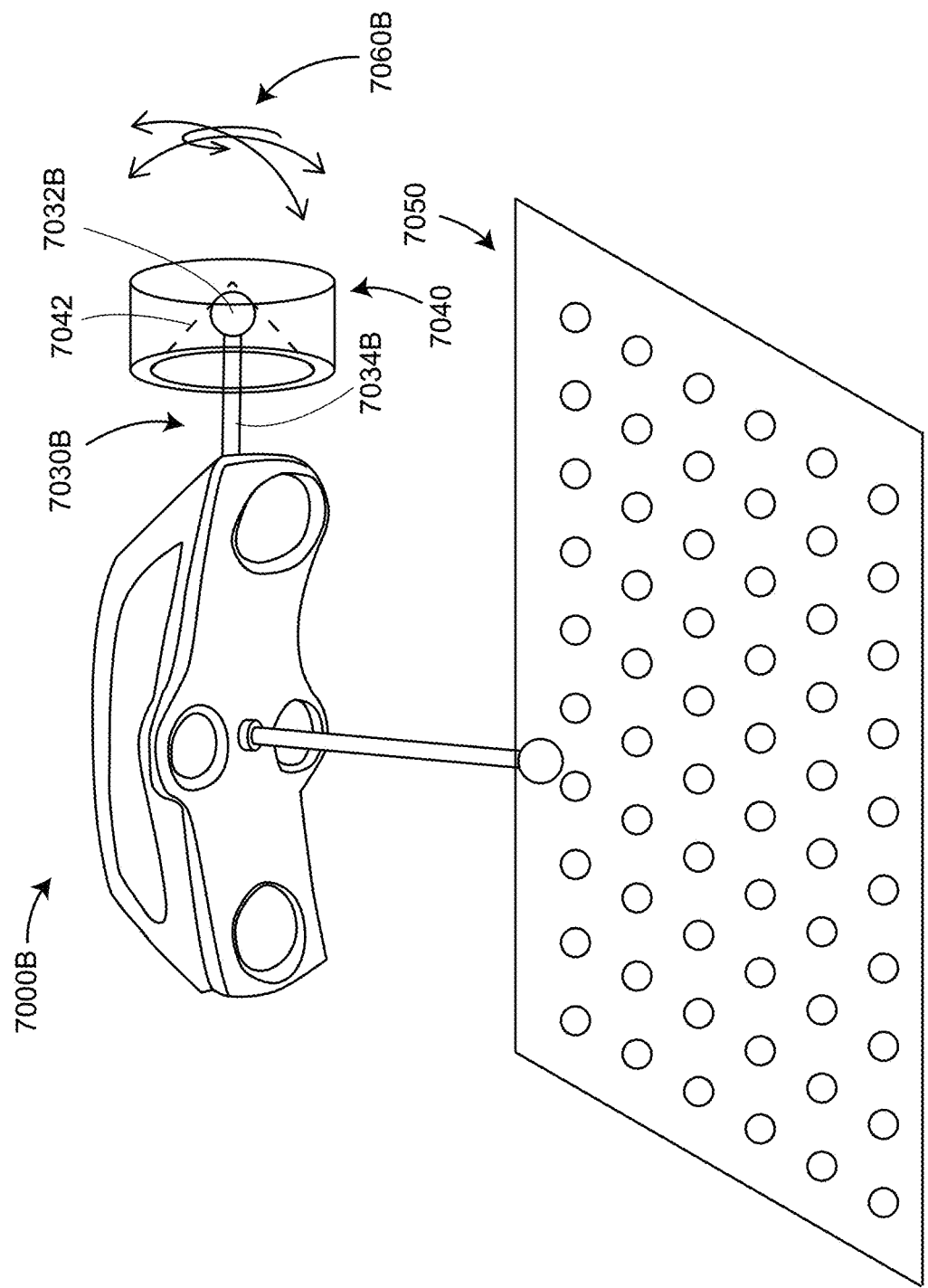

A way to compensate (calibrate) the probe 7030B is illustrated in FIG. 18D. In an embodiment, the scanner views the same surface 7050, while the kinematic nest 7040 is rotated by 90 degrees to come in contact with the probe tip 7032B. By rotating the shaft 7034B to different directions 7060B, the 3D coordinates of the probe tip 7032B may be determined in the frame of reference of the scanner 7000B.

An important use for a tactile probe tip is to enable measurement of regions that are in the FOV of the first camera, second camera, and projector. An example of such a region is a hole, especially a deep and narrow hole, or a crevice. Measuring edges of holes or crevices, for example the edge 7057 in FIG. 18E, may also be more accurate when carried out with a tactile probe than with a triangulation scanner.

Figure 18E:
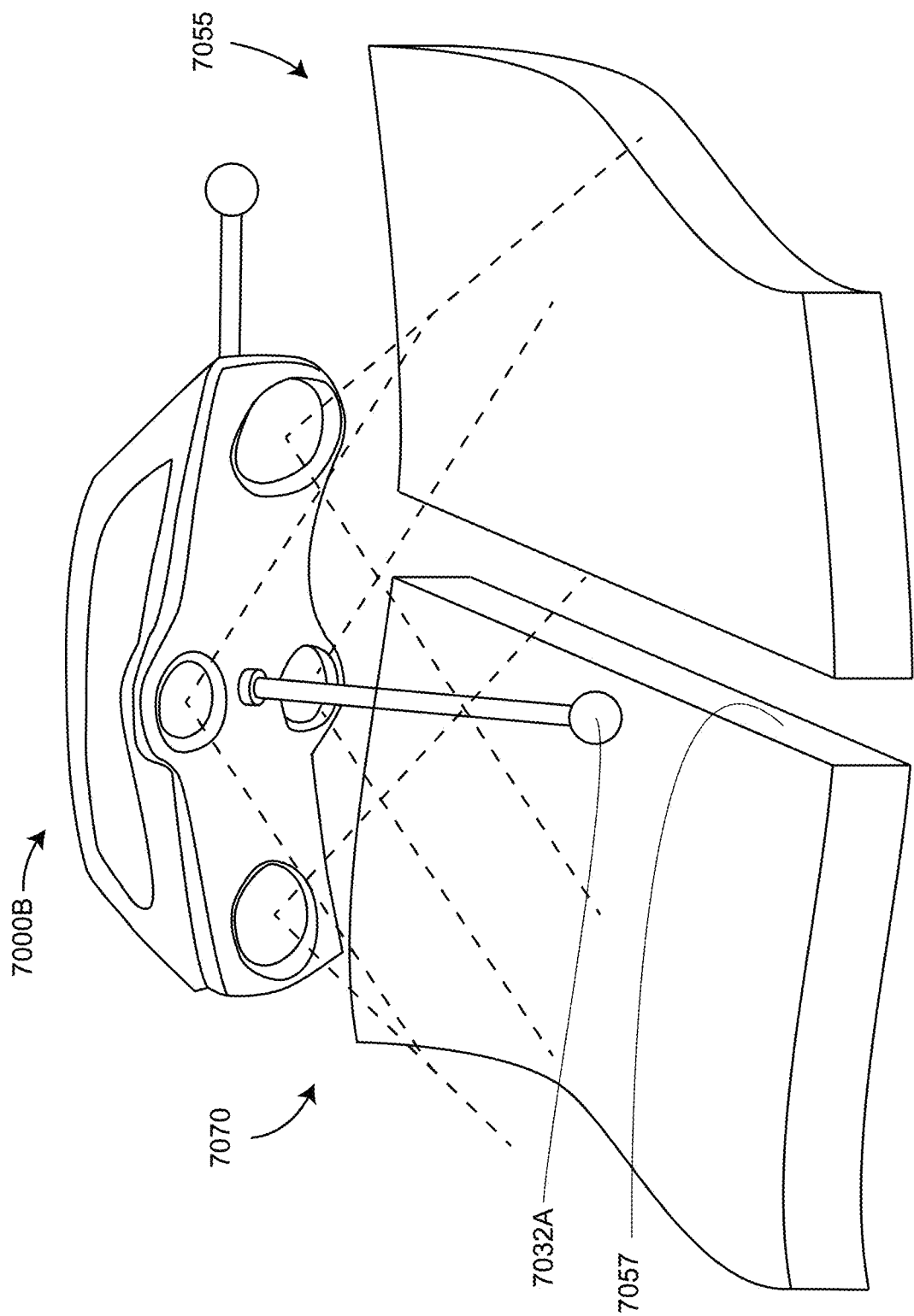
FIG. 18E illustrates a method of compensating a probe through the measurement of natural features and also a method of measuring, with the probe, hidden features according to an embodiment.

As illustrated in FIG. 18E, if the probe tip 7032A is within the fields-of-view 7070 of one or more of the cameras, it may be possible to directly calibrate the probe tip, either by direct observation of the probe tip or by observation of surfaces to which the probe tip is brought into contact.

Figure 18G:
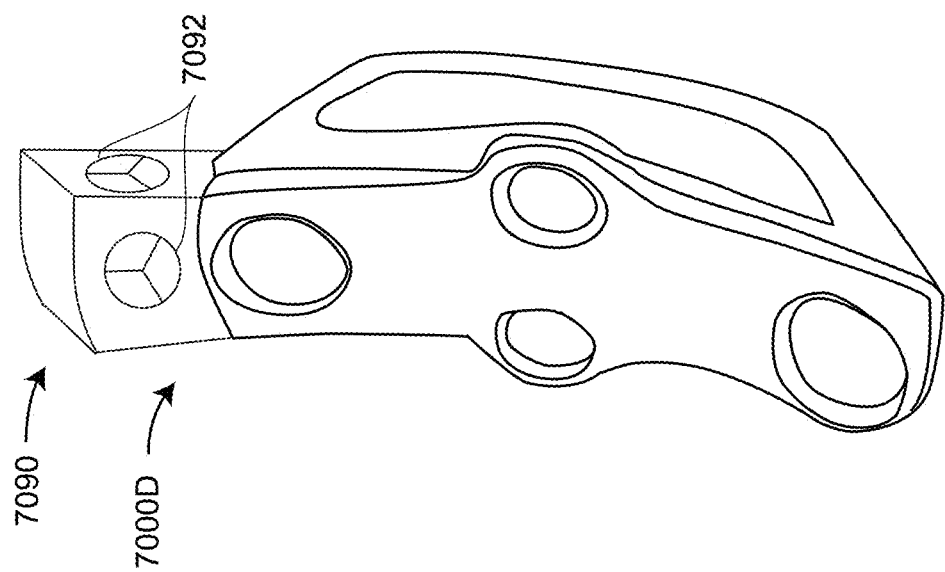
FIG. 18G shows an area scanner having a six-DOF target for tracking the pose of the scanner according to an embodiment.
Figure 18F:
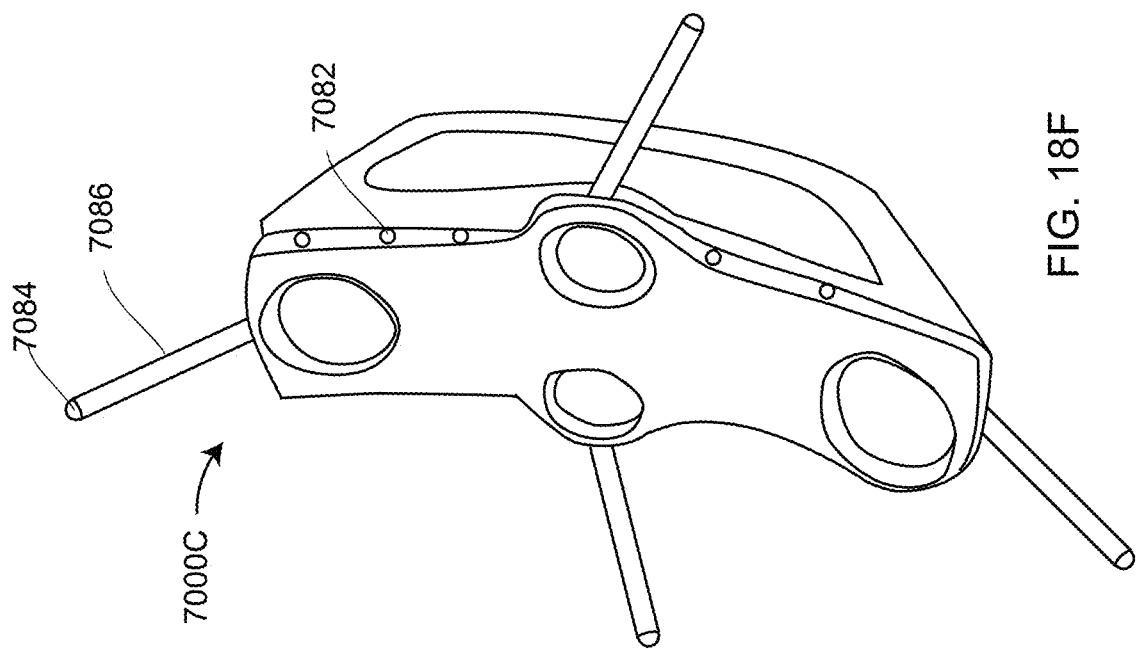
FIG. 18F shows an area scanner having visible targets for tracking the pose of the scanner according to an embodiment.

A handheld scanner 7000C in FIG. 18F may include visible target markers 7082 mounted on the scanner body or markers 7084 mounted on pedestals attached to the body. The visible target markers might be LEDs or reflective spots, for example. In an embodiment, the scanner 7000C is used in place of the 3D measuring device 1510 as described herein above. A handheld scanner 7000D in FIG. 18G may include six-DOF targets 7090 attached to the scanner. In an embodiment, the scanner 7000D is used in place of the 3D measuring device 1410 as described herein above.

FIGS. 19A, 19B show front and top views, respectively, of a coordinate measuring system 1900 that includes a coordinate measuring device 1910 configured to be positioned by a cable robot 1915, also referred to as a wire robot or tendon robot. In an embodiment illustrated in FIGS. 19A, 19B, the cable robot is a class 2T robot, which indicates that the robot may translate the device 1910 in two dimensions (up-down and left-right). In an embodiment, the device 1910 is attached to three cables 1040, 1942, 1944 (also referred to as wires or tendons). The cables may be attached to drums 1940, 1942, 1944, respectively, which coil the cables to change the position of the device 1910. In an embodiment, the drums are supported on frame elements 1924, 1926, and 1922 that are part of a rectangular frame that further includes frame element 1920. In alternative embodiments, cable robots are constructed using different numbers and arrangements of cables, drums, and frame elements. In some embodiments, the frame elements are configured to form a 3D frame, with cables attached to a platform that holds a dimensional measuring device 1910. With this configuration, the device 1910 may be rotated about one or more axes and also translated in a third dimension. The dimensional measuring device may be a 3D or six-DOF measuring device. Examples of possible devices 1910 include a 3D laser tracker, a six-DOF laser tracker, a camera bar having two cameras separated by a baseline distance, a triangulation scanner, and a time-of-flight (TOF) scanner (which may include a phase-based TOF scanner. In an embodiment, two cable robots are placed side by side, each used to carry a dimensional measuring device, for example, a rotating camera assembly 1610.

In an embodiment shown in FIGS. 19C and 19D, the coordinate measuring system 1950 includes a cable robot 1955 in which the dimensional measuring device 1910 is attached to an electromagnet 1962, which when activated with an electrical current is drawn to a ferromagnetic plate 1960, which might be a steel plate, for example. In an embodiment, the steel plate is attached to a rigid structure 1964, which may be integrated into structural elements in a work environment. When the electromagnetic 1962 is activated, the dimensional measuring device is rigidly constrained in three translational dimensions.

In an embodiment shown in FIGS. 19E and 19F, the coordinate measuring system 1970 has the dimensional measuring device 1910 attached to a vacuum mount. When the vacuum mount is activated to produce a vacuum, the vacuum mount is pulled against a flat surface 1980, thereby rigidly constraining the dimensional measuring device in three translational dimensions.

Figure 20A:
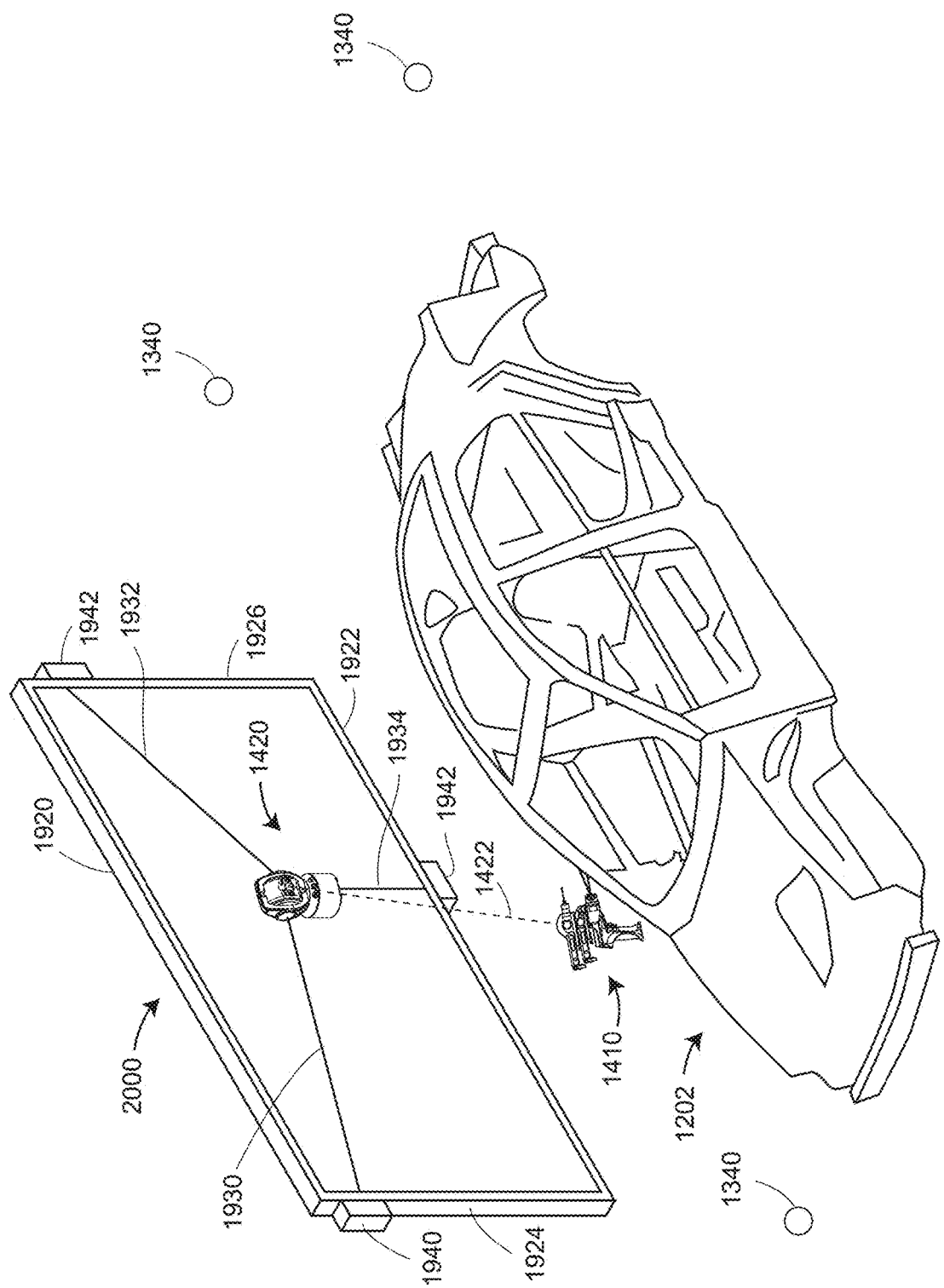
FIG. 20A shows the cable robot being used to position a laser tracker that measures a 3D measurement assembly that includes a six-DOF probe according to an embodiment.

FIG. 20A illustrates an embodiment in which a six-DOF laser tracker 1420 is the dimensional measuring device 1910 in a coordinate measuring system 2000. In various embodiments, the coordinate measuring system includes one of the systems 1900, 1950, or 1970. In embodiments, the coordinate measuring system is stabilized by an electromagnet (system 1950) or by a vacuum mount (system 1970). In an embodiment, the six-DOF laser tracker measures a six-DOF measuring device 1410, which in turn measures an object 1202.

An important potential advantage provided by the system 2000 is the ability of the system to accurately determine the pose (position and orientation) of the laser tracker 1420 without requiring relatively expensive positioning elements. The pose may be determined by measuring three or more retroreflector targets 1340 in a first position of the tracker and a second position of the tracker. These 3D measurements are sufficient to place the laser tracker 1420 in the first position and the second position in the same frame of reference. (Alternatively, the tracker can make one or more six-DOF measurements of six-DOF targets 1340.) This registration procedure can be carried out automatically using an absolute distance meter (ADM) of the laser tracker in addition to two angular encoders. The laser tracker can be brought into a common frame of reference for the tracker moved to any number of positions within the cable robot of the system 2000. For the measurement of both exterior and interior portions of an object 1202, a further advantage of a cable robot used in a system 2000 is the ability to position the laser tracker 1420 to avoid obstructions to directly point at the 3D measuring device 1410.

FIG. 20B illustrates an embodiment that is similar to the embodiment of FIG. 15A except that the laser tracker is positioned by the cable robot of the system 2000 rather than by the mobile platform 1220. The laser tracker 1420 measures the 3D coordinates of the retroreflectors 5112 to determine the pose of the camera bar 5110. The camera bar 5110 in turn measures the six degrees-of-freedom of the 3D measuring device 1510, which measures the object 1202. FIGS. 20A and 20B illustrate the use of six-DOF and 3D laser trackers, respectively, but many other types of dimensional measuring devices may be used instead of a laser tracker, as explained herein above.

In accordance with one or more embodiments, a method for measuring three-dimensional (3D) coordinates is provided. The method includes providing a dimensional measuring device that includes a body, an overview camera, and a triangulation scanner, the triangulation scanner having a projector and a triangulation camera, the overview camera and the triangulation scanner being coupled to the body, the dimensional measuring device having a device frame of reference. In a first instance the method includes: determining with a six degree-of-freedom (six-DOF) tracking system a first position and a first orientation of the dimensional measuring device, the six-DOF tracking system being separate from the dimensional measuring device, the six-DOF tracking system having a system frame of reference; projecting with the projector a first pattern of light onto a first portion of an object and capturing with the triangulation camera a first triangulation-camera image of the projected first pattern of light on the object; and determining in the device frame of reference first 3D coordinates of a first 3D-coordinates point on the object based at least in part on the projected first pattern of light and the first triangulation-camera image. In a second instance the method includes: determining with the six-DOF tracking system a second position and a second orientation of the dimensional measuring device; capturing with the overview camera a second overview-camera image of a second portion of the object and in response determining second 2D coordinates of a first cardinal point in the second overview-camera image; projecting with the projector a second pattern of light onto the second portion of the object and capturing with the triangulation camera a second triangulation-camera image of the projected second pattern of light on the object; and determining in the device frame of reference second 3D coordinates of a second 3D-coordinates point on the object based at least in part on the projected second pattern of light and the second triangulation-camera image. In a third instance the method includes positioning the dimensional measuring device so as to be inaccessible to measurement by the six-DOF tracking system; capturing with the overview camera a third overview-camera image of a third portion of the object and in response determining third 2D coordinates of the first cardinal point in the second overview-camera image and third 2D coordinates of a second cardinal point in the second overview-camera image; projecting with the projector a third pattern of light onto the third portion of the object and capturing with the triangulation camera a third triangulation-camera image of the projected third pattern of light on the object; determining in the device frame of reference third 3D coordinates of a third 3D-coordinates point on the object based at least in part on the projected third pattern of light and the third triangulation-camera image; and determining in the system frame of reference first system 3D coordinates of the first 3D-coordinates point, second system 3D coordinates of the second 3D-coordinates point and third system 3D coordinates of the third 3D-coordinates point, the determining based at least in part on the first 3D coordinates in the device frame of reference, the second 3D coordinates in the device frame of reference, the third 3D coordinates in the device frame of reference, the second 2D coordinates of the first cardinal point, the third 2D coordinates of the first cardinal point, and the third 2D coordinates of the second cardinal point.

In accordance with one or more embodiments, the six-DOF tracking system includes a six-DOF laser tracker. In accordance with one or more embodiments, the triangulation scanner further includes a six-DOF target configured for measurement by the six-DOF laser tracker. In accordance with one or more embodiments, the six-DOF tracking system includes a camera bar having a plurality of camera-bar cameras. In accordance with one or more embodiments, the triangulation scanner further includes a collection of marks visible to the plurality of camera-bar cameras. In one or more embodiments, in providing a dimensional measuring device that includes a body, an overview camera, and a triangulation scanner, a first mark in the collection of marks is selected from the group consisting of: a light source and a reflective spot.

In accordance with one or more embodiments, the six-DOF tracking system includes a plurality of rotating cameras, each rotating camera in the plurality of rotating cameras having an angular transducer configured to measure an angle of rotation. In accordance with one or more embodiments, the triangulation scanner further includes a collection of marks visible to the plurality of rotating cameras. In accordance with one or more embodiments, the camera bar is coupled to a plurality of retroreflector targets fixed in a camera-bar frame of reference of the camera bar, the laser tracker configured to measure 3D coordinates of the plurality of retroreflector targets.

In accordance with one or more embodiments, in the second instance, the first cardinal point is selected from the group consisting of: a natural feature, an artificial mark, and a projected spot of light. In accordance with one or more embodiments, in the third instance, the second cardinal point is selected from the group consisting of: a natural feature, an artificial mark, and a projected spot of light. In accordance with one or more embodiments, in the second instance and the third instance, the first cardinal point and the second cardinal point are interest points. In accordance with one ore more embodiments, in the second instance and the third instance, the interest points are determined based on a method selected from the group consisting of: edge detection, blob detection, ridge detection, corner detection, and scale invariant feature transform (SIFT) detection.

In accordance with one or more embodiments, the triangulation scanner further includes a tactile probe having a probe tip. In accordance with one or more embodiments, the method further comprises determining 3D coordinates of the probe tip touched to a surface of the object, the determining further based on a position of the probe tip in the scanner frame of reference.

In accordance with one or more embodiments, the method further comprises in a fourth instance: positioning the dimensional measuring device so as to be inaccessible to measurement by the six-DOF tracking system; capturing with the overview camera a fourth overview-camera image of a fourth portion of the object and in response determining fourth 2D coordinates of a fourth cardinal point in the fourth overview-camera image and fifth 2D coordinates of a fifth cardinal point in the fourth overview-camera image; projecting with the projector a fourth pattern of light onto the fourth portion of the object and capturing with the triangulation camera a fourth triangulation-camera image of the projected fourth pattern of light on the object; determining in the device frame of reference fourth 3D coordinates of a fourth 3D-coordinates point on the object based at least in part on the projected fourth pattern of light and the fourth triangulation-camera image. In accordance with one or more embodiments, the method comprises in a fifth instance: determining with the six-DOF tracking system a fifth position and a fifth orientation of the dimensional measuring device; capturing with the overview camera a fifth overview-camera image of a fifth portion of the object and in response determining fifth 2D coordinates of the fifth cardinal point in the fifth overview-camera image; projecting with the projector a fifth pattern of light onto the fifth portion of the object and capturing with the triangulation camera a fifth triangulation-camera image of the projected fifth pattern of light on the object; and determining in the device frame of reference fifth 3D coordinates of a fifth 3D-coordinates point on the object based at least in part on the projected fifth pattern of light and the fifth triangulation-camera image. In accordance with one or more embodiments, the method comprises in a sixth instance: determining with the six-DOF tracking system a sixth position and a sixth orientation of the dimensional measuring device; projecting with the projector a sixth pattern of light onto a sixth portion of the object and capturing with the triangulation camera a sixth triangulation-camera image of the projected sixth pattern of light on the object; and determining in the device frame of reference sixth 3D coordinates of a sixth 3D-coordinates point on the object based at least in part on the projected sixth pattern of light and the sixth triangulation-camera image.

In accordance with one or more embodiments, in the determining of the system frame of reference first system 3D coordinates of the first 3D-coordinates point, second system 3D coordinates of the second 3D-coordinates point and third system 3D coordinates of the third 3D-coordinates point further includes determining in the system frame of reference fourth system 3D coordinates of the fourth 3D-coordinates point, fifth system 3D coordinates of the fifth 3D-coordinates point and sixth system 3D coordinates of the sixth 3D-coordinates point, the determining further based on the fourth 3D coordinates in the device frame of reference, the fifth 3D coordinates in the device frame of reference, the sixth 3D coordinates in the device frame of reference, the fourth 2D coordinates of the fourth cardinal point, the fourth 2D coordinate of the fifth cardinal point, and the fifth 2D coordinate of the fifth cardinal point.

In accordance with one or more embodiments, the method includes: in the first instance, the first portion is on an exterior of the object; in the second instance, the second portion is contiguous to a first opening, the first opening connecting the first portion to the third portion; in the third instance, the third portion is on an interior of the object; in the fourth instance, the fourth portion is the interior of the object; and in the fifth instance, the fifth portion is contiguous to a second opening, the second opening connecting the fourth portion to the sixth portion, the second opening being distinct from the first opening, the sixth portion being on the exterior of the object.

In accordance with one or more embodiments, the six-DOF tracking system includes a six-DOF laser tracker located in a first tracker location. In accordance with one or more embodiments, the six-DOF tracking system includes the six-DOF laser tracker located in a second tracker location different than the first tracker location.

In accordance with one or more embodiments, in the step of determining with the six-DOF tracking system a sixth position and a sixth orientation of the dimensional measuring device further comprises: with the six-DOF laser tracker in the first tracker location, measuring with the six-DOF laser tracker first 3D coordinates of a first retroreflector location, second 3D coordinates of a second retroreflector location, and third 3D coordinates of a third retroreflector location; with the six-DOF laser tracker in the second tracker location, measuring with the six-DOF laser tracker fourth 3D coordinates of the first retroreflector location, fifth 3D coordinates of the second retroreflector location, and sixth 3D coordinates of the third retroreflector location; and determining the sixth position and sixth orientation of the dimensional measuring device further based on the first 3D coordinates of the first retroreflector location, the second 3D coordinates of the second retroreflector location, the third 3D coordinates of the third retroreflector location, the fourth 3D coordinates of the first retroreflector location, the fifth 3D coordinates of the second retroreflector location, and the sixth 3D coordinates of the third retroreflector location.

In one or more embodiments, the method further comprises mounting the six-DOF laser tracker on a motorized mobile stand, the motorized mobile stand configured to be moved under computer control. In one or more embodiments, the method further comprises moving, under computer control, the six-DOF laser tracker from the first tracker location to the second tracker location. In one or more embodiments, the six-DOF tracking system includes a laser tracker located in a first tracker location and a camera bar located in a first camera-bar location, the laser tracker being configured to measure 3D coordinates of a plurality of camera-bar retroreflectors, the plurality of camera-bar retroreflectors being fixed in a camera-bar frame of reference. In one or more embodiments, the six-DOF tracking system includes the laser tracker located in a second tracker location and the camera bar located in a second camera-bar location.

In one or more embodiments, in the step of determining with the six-DOF tracking system a sixth position and a sixth orientation of the dimensional measuring device, the step further comprises: with the laser tracker in the first tracker location, measuring with the laser tracker first 3D coordinates of the first retroreflector location, second 3D coordinates of the second retroreflector location, and third 3D coordinates of the third retroreflector location; with the laser tracker in the first tracker location, measuring with the laser tracker first camera-bar 3D coordinates of the plurality of camera-bar retroreflectors; with the laser tracker in the second tracker location, measuring with the laser tracker fourth 3D coordinates of the first retroreflector location, fifth 3D coordinates of the second retroreflector location, and sixth 3D coordinates of the third retroreflector location; with the laser tracker in the second tracker location, measuring with the laser tracker second camera-bar 3D coordinates of the plurality of camera-bar retroreflectors; and determining the sixth position and sixth orientation of the dimensional measuring device further based on the first 3D coordinates of the first retroreflector location, the second 3D coordinates of the second retroreflector location, the third 3D coordinates of the third retroreflector location, the fourth 3D coordinates of the first retroreflector location, the fifth 3D coordinates of the second retroreflector location, and the sixth 3D coordinates of the third retroreflector location.

In accordance with an embodiment, a method for measuring three-dimensional (3D) coordinates is provided. The method includes providing a dimensional measuring device that includes a body and a triangulation scanner coupled to the body, the triangulation scanner having a projector and a camera, the dimensional measuring device having a device frame of reference. The method further includes in a first instance: determining with a six degree-of-freedom (six-DOF) tracking system a first position and a first orientation of the dimensional measuring device, the six-DOF tracking system being separate from the dimensional measuring device, the six-DOF tracking system having a system frame of reference; projecting with the projector a first pattern of light onto a first portion of an object and capturing with the camera a first triangulation image of the projected first pattern of light on the object; determining in the device frame of reference first 3D coordinates of a first 3D-coordinates point on the object based at least in part on the projected first pattern of light and the first triangulation image. The method further includes in a second instance: determining with the six-DOF tracking system a second position and a second orientation of the dimensional measuring device; capturing with the camera a second overview image of a second portion of the object and in response determining second 2D coordinates of a first cardinal point in the second overview image; projecting with the projector a second pattern of light onto the second portion of the object and capturing with the camera a second triangulation image of the projected second pattern of light on the object; determining in the device frame of reference second 3D coordinates of a second 3D-coordinates point on the object based at least in part on the projected second pattern of light and the second triangulation image. The method further includes in a third instance: positioning the dimensional measuring device so as to be inaccessible to measurement by the six-DOF tracking system; capturing with the camera a third overview image of a third portion of the object and in response determining third 2D coordinates of the first cardinal point in the second overview image and third 2D coordinates of a second cardinal point in the second overview image; projecting with the projector a third pattern of light onto the third portion of the object and capturing with the camera a third triangulation image of the projected third pattern of light on the object; determining in the device frame of reference third 3D coordinates of a third 3D-coordinates point on the object based at least in part on the projected third pattern of light and the third triangulation image; and determining in the system frame of reference first system 3D coordinates of the first 3D-coordinates point, second system 3D coordinates of the second 3D-coordinates point and third system 3D coordinates of the third 3D-coordinates point, the determining based at least in part on the first 3D coordinates in the device frame of reference, the second 3D coordinates in the device frame of reference, the third 3D coordinates in the device frame of reference, the second 2D coordinates of the first cardinal point, the third 2D coordinates of the first cardinal point, and the third 2D coordinates of the second cardinal point.

In one or more embodiments, the six-DOF tracking system includes a six-DOF laser tracker. In one or more embodiments, the triangulation scanner further includes a six-DOF target configured for measurement by the six-DOF laser tracker. In one or more embodiments, the six-DOF tracking system includes a camera bar having a plurality of camera-bar cameras. In one or more embodiments, the triangulation scanner further includes a collection of marks visible to the plurality of camera-bar cameras. In one or more embodiments, a first mark in the collection of marks is selected from the group consisting of: a light source and a reflective spot.

In one or more embodiments, the six-DOF tracking system includes a plurality of rotating cameras, each rotating camera in the plurality of rotating cameras having an angular transducer configured to measure an angle of rotation. In one or more embodiments, the triangulation scanner further includes a collection of marks visible to the plurality of rotating cameras. In one or more embodiments, the camera bar is coupled to a plurality of retroreflector targets fixed in a camera-bar frame of reference of the camera bar, the laser tracker configured to measure 3D coordinates of the plurality of retroreflector targets.

In one or more embodiments, the first cardinal point is selected from the group consisting of: a natural feature, an artificial mark, and a projected spot of light. In one or more embodiments, the second cardinal point is selected from the group consisting of: a natural feature, an artificial mark, and a projected spot of light. In one or more embodiments, in the second instance and the third instance, the first cardinal point and the second cardinal point are interest points. In one or more embodiments, the interest points are determined based on a method selected from the group consisting of: edge detection, blob detection, ridge detection, corner detection, and scale invariant feature transform (SIFT) detection.

In one or more embodiments, the triangulation scanner further includes a tactile probe having a probe tip. In one or more embodiments, the method further comprises determining 3D coordinates of the probe tip touched to a surface of the object, the determining further based on a position of the probe tip in the scanner frame of reference.

In one or more embodiments, the method further comprises in a fourth instance: positioning the triangulation scanner so as to be inaccessible to measurement by the six-DOF tracking system; capturing with the camera a fourth overview image of a fourth portion of the object and in response determining fourth 2D coordinates of a fourth cardinal point in the fourth overview image and fifth 2D coordinates of a fifth cardinal point in the fourth overview image; projecting with the projector a fourth pattern of light onto the fourth portion of the object and capturing with the camera a fourth triangulation image of the projected fourth pattern of light on the object; determining in the device frame of reference fourth 3D coordinates of a fourth 3D-coordinates point on the object based at least in part on the projected fourth pattern of light and the fourth triangulation image. In one or more embodiments, in a fifth instance the method further comprises: determining with the six-DOF tracking system a fifth position and a fifth orientation of the dimensional measuring device; capturing with the camera a fifth overview image of a fifth portion of the object and in response determining fifth 2D coordinates of the fifth cardinal point in the fifth overview image; projecting with the projector a fifth pattern of light onto the fifth portion of the object and capturing with the camera a fifth triangulation image of the projected fifth pattern of light on the object; and determining in the device frame of reference fifth 3D coordinates of a fifth 3D-coordinates point on the object based at least in part on the projected fifth pattern of light and the fifth triangulation image. In one or more embodiments, in a sixth instance the method further comprises: determining with the six-DOF tracking system a sixth position and a sixth orientation of the dimensional measuring device; projecting with the projector a sixth pattern of light onto a sixth portion of the object and capturing with the camera a sixth triangulation image of the projected sixth pattern of light on the object; and determining in the device frame of reference sixth 3D coordinates of a sixth 3D-coordinates point on the object based at least in part on the projected sixth pattern of light and the sixth triangulation image.

In one or more embodiments, in the step of determining in the system frame of reference first system 3D coordinates of the first 3D-coordinates point, second system 3D coordinates of the second 3D-coordinates point and third system 3D coordinates of the third 3D-coordinates point further comprises determining in the system frame of reference fourth system 3D coordinates of the fourth 3D-coordinates point, fifth system 3D coordinates of the fifth 3D-coordinates point and sixth system 3D coordinates of the sixth 3D-coordinates point, the determining further based on the fourth 3D coordinates in the device frame of reference, the fifth 3D coordinates in the device frame of reference, the sixth 3D coordinates in the device frame of reference, the fourth 2D coordinates of the fourth cardinal point, the fourth 2D coordinate of the fifth cardinal point, and the fifth 2D coordinate of the fifth cardinal point.

In one or more embodiments, the method includes: in the first instance, the first portion is on an exterior of the object; in the second instance, the second portion is contiguous to a first opening, the first opening connecting the first portion to the third portion; in the third instance, the third portion is on an interior of the object; in the fourth instance, the fourth portion is the interior of the object; and in the fifth instance, the fifth portion is contiguous to a second opening, the second opening connecting the fourth portion to the sixth portion, the second opening being distinct from the first opening, the sixth portion being on the exterior of the object.

In one or more embodiments, the six-DOF tracking system includes a six-DOF laser tracker located in a first tracker location. In one or more embodiments, the six-DOF tracking system includes the six-DOF laser tracker located in a second tracker location different than the first tracker location. In one or more embodiments, in the step of determining with the six-DOF tracking system a sixth position and a sixth orientation of the dimensional measuring device further comprises: with the six-DOF laser tracker in the first tracker location, measuring with the six-DOF laser tracker first 3D coordinates of a first retroreflector location, second 3D coordinates of a second retroreflector location, and third 3D coordinates of a third retroreflector location; with the six-DOF laser tracker in the second tracker location, measuring with the six-DOF laser tracker fourth 3D coordinates of the first retroreflector location, fifth 3D coordinates of the second retroreflector location, and sixth 3D coordinates of the third retroreflector location; and determining the sixth position and sixth orientation of the dimensional measuring device further based on the first 3D coordinates of the first retroreflector location, the second 3D coordinates of the second retroreflector location, the third 3D coordinates of the third retroreflector location, the fourth 3D coordinates of the first retroreflector location, the fifth 3D coordinates of the second retroreflector location, and the sixth 3D coordinates of the third retroreflector location.

In one or more embodiments, the method further comprises mounting the six-DOF laser tracker on a motorized mobile stand, the motorized mobile stand configured to be moved under computer control. In one or more embodiments, the method further comprises moving, under computer control, the six-DOF laser tracker from the first tracker location to the second tracker location.

In one or more embodiments, the six-DOF tracking system includes a laser tracker located in a first tracker location and a camera bar located in a first camera-bar location, the laser tracker being configured to measure 3D coordinates of a plurality of camera-bar retroreflectors, the plurality of camera-bar retroreflectors being fixed in a camera-bar frame of reference. In one or more embodiments, the six-DOF tracking system includes the laser tracker located in a second tracker location and the camera bar located in a second camera-bar location.

In one or more embodiments, the dimensional measuring device further comprises: with the laser tracker in the first tracker location, measuring with the laser tracker first 3D coordinates of the first retroreflector location, second 3D coordinates of the second retroreflector location, and third 3D coordinates of the third retroreflector location; with the laser tracker in the first tracker location, measuring with the laser tracker first camera-bar 3D coordinates of the plurality of camera-bar retroreflectors; with the laser tracker in the second tracker location, measuring with the laser tracker fourth 3D coordinates of the first retroreflector location, fifth 3D coordinates of the second retroreflector location, and sixth 3D coordinates of the third retroreflector location; with the laser tracker in the second tracker location, measuring with the laser tracker second camera-bar 3D coordinates of the plurality of camera-bar retroreflectors; and determining the sixth position and sixth orientation of the dimensional measuring device further based on the first 3D coordinates of the first retroreflector location, the second 3D coordinates of the second retroreflector location, the third 3D coordinates of the third retroreflector location, the fourth 3D coordinates of the first retroreflector location, the fifth 3D coordinates of the second retroreflector location, and the sixth 3D coordinates of the third retroreflector location.

In accordance with another embodiment, a method for measuring three-dimensional (3D) coordinates is provided. The method comprises in a first instance: placing a camera bar in a first camera-bar location; measuring with the camera bar first reference-mark 3D coordinates of a first plurality of reference marks from among a collection of reference marks, the first reference-mark 3D coordinates being given in a camera-bar frame of reference, the camera bar including a plurality of cameras; measuring with the camera bar first scanner-mark 3D coordinates of a first plurality of scanner marks from among a collection of scanner marks on a triangulation scanner; and measuring with the triangulation scanner first scanner-points 3D coordinates of a first point on a first portion of an object, the first scanner-points 3D coordinates being in a scanner frame of reference fixed with respect to the triangulation scanner, the triangulation scanner including a projector, a camera, and the collection of scanner marks, the projector configured to project a pattern of light onto the object, the camera configured to image the pattern of light projected on the object. The method further comprises in a second instance: moving the camera bar to a second camera-bar location; measuring with the camera bar second reference-mark 3D coordinates of a second plurality of reference marks from among the collection of reference marks, the first plurality of reference marks and the second plurality of reference marks having at least three reference marks in common, the second reference-mark 3D coordinates being given in the camera-bar frame of reference; measuring with the camera bar second scanner-mark 3D coordinates of a second plurality of the scanner marks; and measuring with the triangulation scanner second scanner-points 3D coordinates of a second point on a second portion of the object, the second scanner-points 3D coordinates being in the scanner frame of reference, the second point being a first cardinal point. The method further comprises in a third instance: measuring with the triangulation scanner third scanner-points 3D coordinates of the second point and a third point, the third scanner-points 3D coordinates being in the scanner frame of reference, the second point and the third point being on a third portion of the object, the third point being a second cardinal point, the triangulation scanner being positioned so as to make the scanner marks inaccessible to measurement by the camera bar; and determining global 3D coordinates of the first point, the second point, and the third point, the global 3D coordinates being given in a global frame of reference, the determining based at least in part on the first reference-mark 3D coordinates, the second reference-mark 3D coordinates, the first scanner-mark 3D coordinates, the second scanner-mark 3D coordinates, the first scanner-points 3D coordinates, the second scanner-points 3D coordinates, and the third scanner-points 3D coordinates.

In accordance with one or more embodiments, at least one reference mark from among the collection of reference marks is selected from the group consisting of: a light source and a reflective spot. In accordance with one or more embodiments, at least one scanner mark from among the first plurality of scanner marks is selected from the group consisting of: a light source and a reflective spot. In accordance with one or more embodiments, the pattern of light includes a line of light. In accordance with one or more embodiments, the pattern of light covers a two-dimensional area.

In accordance with one or more embodiments, the method further comprises locating a photogrammetry camera in a first photogrammetry location and measuring with the photogrammetry camera first-photogrammetry 3D coordinates of the first plurality of reference marks, the second plurality of reference marks, and a first reference length; In accordance with one or more embodiments, the method further comprises locating the photogrammetry camera in a second photogrammetry location different than the first photogrammetry location and measuring with the photogrammetry camera second-photogrammetry 3D coordinates of the first plurality of reference marks and the second plurality of reference marks.

In accordance with one or more embodiments, the photogrammetry camera further measures the first reference length. In accordance with one or more embodiments, the photogrammetry camera further measures a second reference length. In accordance with one or more embodiments, the step of determining global 3D coordinates of the first point, the second point, and the third point, the determining is further based on the first-photogrammetry 3D coordinates and the second-photogrammetry 3D coordinates.

In accordance with one or more embodiments, the method further comprises locating a first photogrammetry camera in a first photogrammetry location and measuring with the first photogrammetry camera first-photogrammetry 3D coordinates of the first plurality of reference marks, the second plurality of reference marks, and a first reference length. In accordance with one or more embodiments, the method further comprises locating a second photogrammetry camera in a second photogrammetry location and measuring with the second photogrammetry camera second-photogrammetry 3D coordinates of the first plurality of reference marks, the second plurality of reference marks, and the first reference length.

In accordance with one or more embodiments, in the step of determining global 3D coordinates of the first point, the second point, and the third point, the determining is further based on the first-photogrammetry 3D coordinates and the second-photogrammetry 3D coordinates. In accordance with one or more embodiments, some reference marks from the collection of reference marks are on the object. In accordance with one or more embodiments, some reference marks from the collection of reference marks are placed off the object.

In accordance with one or more embodiments, in the second instance, the first cardinal point is selected from the group consisting of: a natural feature, an artificial mark, and a projected spot of light. In accordance with one or more embodiments, in the third instance, the second cardinal point is selected from the group consisting of: a natural feature, an artificial mark, and a projected spot of light. In accordance with one or more embodiments, in the second instance and the third instance, the first cardinal point and the second cardinal point are interest points.

In accordance with one or more embodiments, the interest points are determined based on a method selected from the group consisting of: edge detection, blob detection, ridge detection, corner detection, and scale invariant feature transform (SIFT) detection. In accordance with one or more embodiments, in measuring with a triangulation scanner, the triangulation scanner further includes a tactile probe having a probe tip. In accordance with one or more embodiments, the method further comprises determining 3D coordinates of the probe tip, the probe tip is touched to a surface of the object, the determining being further based on a position of the probe tip in the scanner frame of reference.

In accordance with one or more embodiments, the method further comprises in a fourth instance: measuring with the triangulation scanner fourth scanner-points 3D coordinates of a fourth point and a fifth point, the fourth scanner-points 3D coordinates being in the scanner frame of reference, the fourth point and the fifth point being on a fourth portion of the object, the fourth point being a third cardinal point and the fifth point being a fourth cardinal point, the triangulation scanner being positioned so as to make the scanner marks inaccessible to measurement by the camera bar. In accordance with one or more embodiments, the method further comprises in a fifth instance: moving the camera bar to a fourth camera-bar location; measuring with the triangulation scanner fifth scanner-points 3D coordinates of the fifth point on a fifth portion of the object, the fifth scanner-points 3D coordinates being in the scanner frame of reference; measuring with the camera bar third reference-mark 3D coordinates of a third plurality of reference marks from among the collection of reference marks, the third reference-mark 3D coordinates being in the camera-bar frame of reference; and measuring with the camera bar third scanner-mark 3D coordinates of a third plurality of the scanner marks on the triangulation scanner. In accordance with one or more embodiments, the method further comprises in a sixth instance: measuring with the triangulation scanner sixth scanner-points 3D coordinates of a sixth point on the sixth portion of the object, the sixth portion being in the scanner frame of reference; measuring with a camera bar fourth reference-mark 3D coordinates of a fourth plurality of reference marks from among a collection of reference marks, the third plurality of reference marks and the fourth plurality of reference marks having at least three reference marks in common, the fourth reference-mark 3D coordinates being given in the camera-bar frame of reference; measuring with the camera bar fourth scanner-mark 3D coordinates of a fourth plurality of scanner marks on the triangulation scanner; and determining global 3D coordinates of the fourth point, the fifth point, and the sixth point, the global 3D coordinates of the fourth point, the fifth point, and the sixth point being given in the global frame of reference, the determining based at least in part on the third reference-mark 3D coordinates, the fourth reference-mark 3D coordinates, the third scanner-mark 3D coordinates, the fourth scanner-mark 3D coordinates, the fourth scanner-points 3D coordinates, the fifth scanner-points 3D coordinates, and the sixth scanner-points 3D coordinates.

In accordance with one or more embodiments, in the step of determining reference 3D coordinates of the first point, the second point, and the third point further includes determining reference 3D coordinates of the fourth point, the fifth point, and the sixth point, the determining further based on the third reference-mark 3D coordinates, the fourth reference-mark 3D coordinates, the third scanner-mark 3D coordinates, the fourth scanner-mark 3D coordinates, the fourth scanner-points3D coordinates, the fifth scanner-points 3D coordinates, and the sixth scanner-points 3D coordinates.

In accordance with one or more embodiments, the method includes: in the first instance, the first portion is on an exterior of the object; in the second instance, the second portion is contiguous to a first opening, the first opening connecting the first portion to the third portion; in the third instance, the third portion is on an interior of the object; in the fourth instance, the fourth portion is the interior of the object; and in the fifth instance, the fifth portion is contiguous to a second opening, the second opening connecting the fourth portion to a sixth portion, the second opening being distinct from the first opening, the sixth portion being on the exterior of the object.

In accordance with one or more embodiments, the method further comprises mounting the camera bar on a motorized mobile stand, the motorized mobile stand configured to be moved under computer control. In accordance with one or more embodiments, the method further comprises moving, under computer control, the camera bar from the first camera-bar location to the second camera-bar location.

In accordance with another embodiment, a method for compensating a tactile probe of a triangulation scanner is provided. The method includes placing a probe tip of the tactile probe into a kinematic nest, the kinematic nest being configured to hold a center of the probe tip fixed in space during rotation of the tactile probe. A plurality of patterns on a first surface are observed with at least one camera of the triangulation scanner, the plurality of patterns corresponding to a plurality of orientations of the tactile probe in the kinematic nest. Three-dimensional (3D) coordinates of the center of the probe tip are determined in a scanner frame of reference based at least in part on the plurality of patterns, the scanner frame of reference being a frame of reference of the triangulation scanner.

In accordance with one or more embodiments, the patterns are marked onto the first surface. In accordance with one or more embodiments, the at least one camera includes a registration camera. In accordance with one or more embodiments, the at least one camera is configured to respond to visible light.

In accordance with one or more embodiments, the patterns are emitted by a projector of the triangulation scanner onto the first surface. In accordance with one or more embodiments, the at least one camera includes a first triangulation camera configured to capture images of the patterns emitted by the projector on the first surface. In accordance with one or more embodiments, the triangulation scanner is further configured to determine 3D coordinates on the first surface for each of the captured images. In accordance with one or more embodiments, the at least one camera further includes a second triangulation camera. In accordance with one or more embodiments, the projector, the first triangulation scanner, and the second triangulation scanner are arranged in a triangular pattern and the 3D coordinates on the first surface are based at least in part on epipolar constraints imposed by the triangular pattern. In accordance with one or more embodiments, the projector emits light having a wavelength greater than 700 nm. In accordance with one or more embodiments, a registration camera included in the triangulation scanner obtains images of a visible pattern of light on the first surface while the first triangulation camera and the second triangulation scanner capture images of the light emitted by the projector onto the first surface.

In accordance with one or more embodiments, the step of observing a plurality of patterns on a first surface with at least one camera of the triangulation scanner further includes capturing an image of the probe tip with the at least one camera. In accordance with one or more embodiments, In the step of determining three-dimensional (3D) coordinates of the center of the probe tip in a scanner frame of reference based at least in part on the plurality of patterns, the determining is further based on the image of the probe tip.

In accordance with one or more embodiments, the first surface is a natural surface of an object under test. In accordance with one or more embodiments, the body includes a handle configured to be grasped by an operator. In accordance with one or more embodiments, the tactile probe is configured to be removed and re-attached. In accordance with one or more embodiments, the probe tip is configured to measure coordinates of features not visible to the at least one camera. In accordance with one or more embodiments, the probe tip is configured to measure internal dimensions of a hole.

In accordance with another embodiment, a dimensional measuring system is provided. The system includes a coordinate measuring device configured to measure at least three degrees of freedom. A cable robot is operable to hold the coordinate measuring device, the cable robot including a plurality of cables and a corresponding plurality of drums attached to a frame, the drums configured to translate the coordinate measuring device by changing the lengths of the cables.

In accordance with one or more embodiments, the system further comprises a ferromagnetic plate attached to the frame and an electromagnet attached to the coordinate measuring device. The electromagnet is configured to pull the coordinate measuring device against the ferromagnetic plate when activated by an electrical current.

In accordance with one or more embodiments, the system further comprises a flat surface attached to the frame and a vacuum mount attached to the coordinate measuring device. The vacuum mount configured to pull the coordinate measuring device against the flat surface in response to vacuum generation.

In accordance with one or more embodiments, the coordinate measuring device includes a six degree-of-freedom (six-DOF) laser tracker. In accordance with one or more embodiments, the coordinate measuring device includes a six-DOF sensor, the six-DOF sensor including a retroreflector configured to receive a beam of light from the six-DOF laser tracker. In accordance with one or more embodiments, the coordinate measuring device further includes a triangulation scanner configured to measure 3D coordinates of points on an object. In accordance with one or more embodiments, the coordinate measuring device further includes a tactile probe.

In accordance with one or more embodiments, the system further comprises a collection of at least three retroreflector targets. The system is operable to measure at a first position a first set of 3D coordinates of the collection of retroreflector targets and to measure at a second position a second set of 3D coordinates of the collection of retroreflector targets.

In accordance with one or more embodiments, the system is further operable to transform measurements of the six-DOF laser tracker at the first position and the second position into a common frame of reference based at least in part on the first set and the second set. In accordance with one or more embodiments, the system further comprises a triangulation scanner configured to measure 3D coordinates of points on an object, the dimensional measuring system further configured to transform the measured 3D coordinates into a common frame of reference based at least in part on the first set and the second set.

In accordance with one or more embodiments, the coordinate measuring device is a laser tracker. In accordance with one or more embodiments, the laser tracker is operable to measure 3D camera-bar coordinates of a plurality of retroreflectors on a camera bar, the camera bar having a first camera-bar camera and a second camera-bar camera separated by a baseline distance. In accordance with one or more embodiments, the camera bar is operable to measure in a camera-bar frame of reference 3D coordinates of a plurality of scanner marks on a triangulation scanner based at least in part on a first image of the scanner marks by the first camera-bar camera, a second image of the scanner marks by the second camera-bar camera, and the baseline distance.

In accordance with one or more embodiments, the triangulation scanner comprises a projector and a scanner camera. The triangulation scanner is operable to emit a pattern of light from the projector onto the object and to capture with the scanner camera an image of the projected pattern on the object, the triangulation scanner being further configured to determine 3D coordinates of an object point in a scanner frame of reference based at least in part on the projected pattern of light from the projector and the captured image by the scanner camera.

In accordance with one or more embodiments, the system is further operable to determine 3D coordinates of the object point in a laser-tracker frame of reference further based on the measured 3D coordinates of the plurality of retroreflectors on the camera bar, the 3D coordinates of the plurality of scanner marks in the camera-bar frame of reference, and on the 3D coordinates of the point in the scanner frame of reference.

In accordance with one or more embodiments, the triangulation scanner is configured to project a line of light. In accordance with one or more embodiments, the triangulation scanner is configured to project the pattern over an area. In accordance with one or more embodiments, the triangulation scanner further includes a tactile probe having a probe end.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method comprising:
   determining with a six-DOF tracking system a first position and a first orientation of a dimensional measuring device, the dimensional measuring device configured to determine 3D coordinates of an object surface in a device frame of reference, the six-DOF tracking system including a first triangulation camera and a second triangulation camera, the second triangulation camera being spaced apart from the first triangulation camera;
   determining a first 3D coordinates of at least one first point on the object with the dimensional measuring device;
   determining with the six-DOF tracking system a second position and a second orientation of the dimensional measuring device based at least in part on images acquired by the first triangulation camera and second triangulation camera;
   capturing with an overview camera a first overview image of a first portion of the object and determining a first 2D coordinates of a first cardinal point in the first overview image, the overview camera being associated with dimensional measuring device;
   determining, with the dimensional measuring device in the second position and second orientation, a second 3D coordinates of at least one second point on the object with the dimensional measuring device;
   moving the dimensional measuring device to a third position and third orientation, wherein the third position and third orientation cannot be determined by the six-DOF tracking system;
   capturing with the overview camera a second overview image of a second portion of the object and determining a second 2D coordinates of the first cardinal point in the second overview image and a third 2D coordinates of a second cardinal point in the second overview image, the second cardinal point further being viewable in the first overview image;
   determining, with the dimensional measuring device in the third position and third orientation, a third 3D coordinates of at least one third point on the object with the dimensional measuring device; and
   transforming the first 3D coordinates of at least one first point, the second 3D coordinates of at least one second point and the third 3D coordinates of at least one third point into a system frame of reference based at least in part on the first 2D coordinates of the first cardinal point, the second 2D coordinates of the first cardinal point, and the third 2D coordinates of the second cardinal point.

2. The method of claim 1, wherein the dimensional measuring device includes a triangulation scanner having a projector and a camera.

3. The method of claim 2, wherein the capturing of the first 3D coordinates of at least one first point, the second 3D coordinates of at least one second point and the third 3D coordinates of at least one third point includes projecting a light pattern with the projector and acquiring an image of the light pattern with the camera.

4. The method of claim 3, wherein the light pattern is a two-dimensional pattern of light.

5. The method of claim 3, wherein the light pattern is a line of light.

6. The method of claim 1, wherein the six-DOF tracking system includes a color camera disposed between the at least two triangulation cameras.

7. The method of claim 6, wherein the six-DOF tracking system makes measurements in the system frame of reference.

8. The method of claim 1, wherein the first cardinal point is one of a natural feature, an artificial mark, an LED target, a reflective target, or a projected spot of light.

9. The method of claim 8, further comprising obtaining the first cardinal point using one of edge detection, blob detection, ridge detection, corner detection, or scale invariant feature transform (SIFT) detection.

10. The method of claim 1, wherein the moving of the dimensional measuring device to the third position and the third orientation includes moving the dimensional measuring device within an interior of the object.

11. The method of claim 1, wherein the transforming further comprises registering the first 2D coordinates, the second 2D coordinates, the third 2D coordinates, the first 3D coordinates of at least one first point, the second 3D coordinates of at least one second point and the third 3D coordinates of at least one third point in the system frame of reference.

12. The method of claim 1, wherein the dimensional measuring device includes a plurality of marks visible to the six-DOF tracking device.

13. The method of claim 12, wherein the plurality of marks is selected from the group consisting of: a light source and a reflective spot.

14. The method of claim 1, wherein the each of the first triangulation camera and the second triangulation camera rotates, each of the first triangulation camera and the second triangulation camera has an angular transducer configured to measure an angle of rotation.

15. The method of claim 14, wherein the triangulation scanner further includes a plurality of marks visible to the plurality of rotating cameras.

* * * * *